United States Patent
Gagne et al.

(10) Patent No.: US 9,502,874 B2
(45) Date of Patent: Nov. 22, 2016

(54) BRACKET AND SLEEVE ASSEMBLY

(71) Applicant: Brainwave Research Corporation, Woodbridge (CA)

(72) Inventors: Jean-Guy Gagne, Etobicoke (CA); James W. Rogers, Toronto (CA)

(73) Assignee: BRAINWAVE RESEARCH CORPORATION, Woodbridge (CA)

( * ) Notice: Subject to any disclaimer, the term of this patent is extended or adjusted under 35 U.S.C. 154(b) by 1 day.

(21) Appl. No.: 14/488,178

(22) Filed: Sep. 16, 2014

(65) Prior Publication Data

US 2015/0001361 A1 Jan. 1, 2015

Related U.S. Application Data

(63) Continuation-in-part of application No. 14/033,257, filed on Sep. 20, 2013, which is a continuation-in-part of application No. 13/795,538, filed on Mar. 12, 2013.

(60) Provisional application No. 61/878,432, filed on Sep. 16, 2013.

(51) Int. Cl.
| | | |
|---|---|---|
| *H02G 3/08* | (2006.01) | |
| *H02G 3/12* | (2006.01) | |
| *H02G 3/14* | (2006.01) | |

(52) U.S. Cl.
CPC .............. *H02G 3/126* (2013.01); *H02G 3/086* (2013.01); *H02G 3/123* (2013.01); *H02G 3/14* (2013.01)

(58) Field of Classification Search
CPC .......... H02G 3/08; H02G 3/14; H02G 3/081; H02G 3/086; H02G 3/10; H02G 3/12; H02G 3/121; H02G 3/123; H02G 3/126; H02G 3/185; H02G 3/30; H02G 3/125; H01H 9/02; H01H 9/0207

USPC ....... 174/480, 481, 50, 53, 57, 58, 559, 482, 174/490, 503, 502, 535; 220/3.2–3.9, 4.02; 248/343, 906, 205.1, 231.91; 33/528
See application file for complete search history.

(56) References Cited

U.S. PATENT DOCUMENTS

| | | | | |
|---|---|---|---|---|
| 3,260,400 A | * | 7/1966 | Miles ..................... | H02G 3/125 174/535 |
| 4,096,964 A | * | 6/1978 | Glick ....................... | H02G 3/12 33/528 |
| 4,964,525 A | * | 10/1990 | Coffey et al. ................. | 248/906 |
| 5,221,814 A | * | 6/1993 | Colbaugh et al. .............. | 174/58 |
| 5,263,676 A | * | 11/1993 | Medlin et al. ................ | 248/906 |
| 5,646,371 A | * | 7/1997 | Fabian .......................... | 174/58 |
| 6,031,181 A | * | 2/2000 | Jacks .................... | H02G 3/088 174/58 |
| 6,403,883 B1 | * | 6/2002 | Morgan et al. ................. | 174/58 |
| 6,452,813 B1 | | 9/2002 | Gretz | |
| 6,624,355 B1 | * | 9/2003 | Gretz ............................. | 174/59 |
| 6,750,398 B1 | * | 6/2004 | Richardson ............. | H02G 3/14 174/53 |
| 6,812,405 B1 | * | 11/2004 | Hull et al. ...................... | 174/58 |
| 6,867,369 B2 | * | 3/2005 | Wiggins ................... | H02G 3/12 174/58 |
| 7,439,443 B2 | * | 10/2008 | Dinh .............................. | 174/58 |
| 7,549,549 B1 | * | 6/2009 | Kiely ............................ | 220/3.2 |
| 7,902,457 B2 | * | 3/2011 | Johnson ......................... | 174/58 |
| 8,006,401 B1 | * | 8/2011 | Shapiro .................... | H02G 1/00 33/528 |

(Continued)

*Primary Examiner* — Angel R Estrada
(74) *Attorney, Agent, or Firm* — Ditthavong & Steiner, P.C.

(57) ABSTRACT

An assembly includes a bracket mountable directly to a wall. An inner periphery of the bracket defines an opening in the wall substrate. A resilient element, cantilevered from an outer side surface of the sleeve, is retained by a barbed element at the inner periphery of the bracket.

9 Claims, 77 Drawing Sheets

(56) References Cited

U.S. PATENT DOCUMENTS 8,561,312 B2 * 10/2013 Dressel .................. H02G 3/12 33/528

8,658,894 B1 * 2/2014 Witherbee .................. 174/58

2009/0057303 A1 * 3/2009 Oddsen .................. H02G 3/14 220/3.5

* cited by examiner

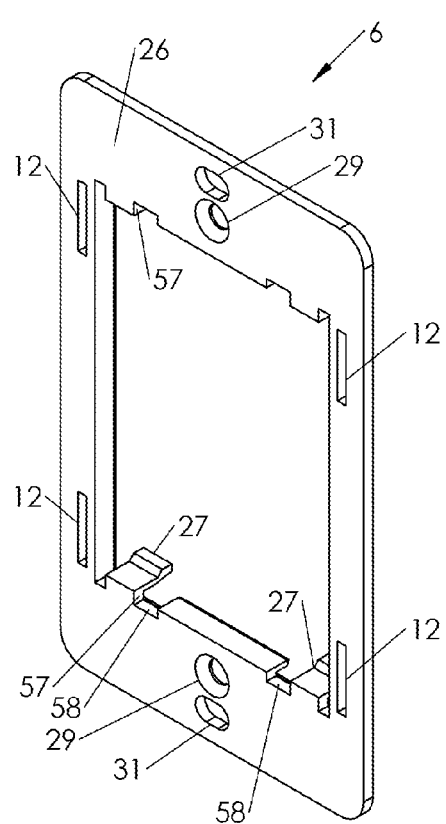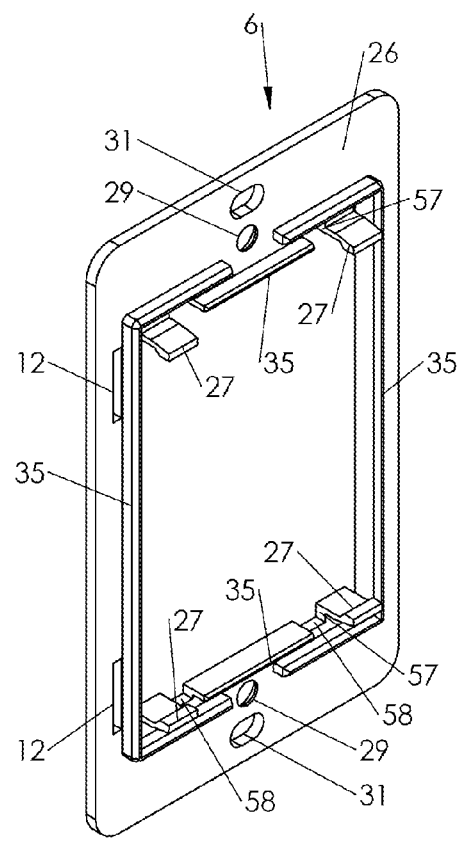
FIG. 3a
FIG. 3b

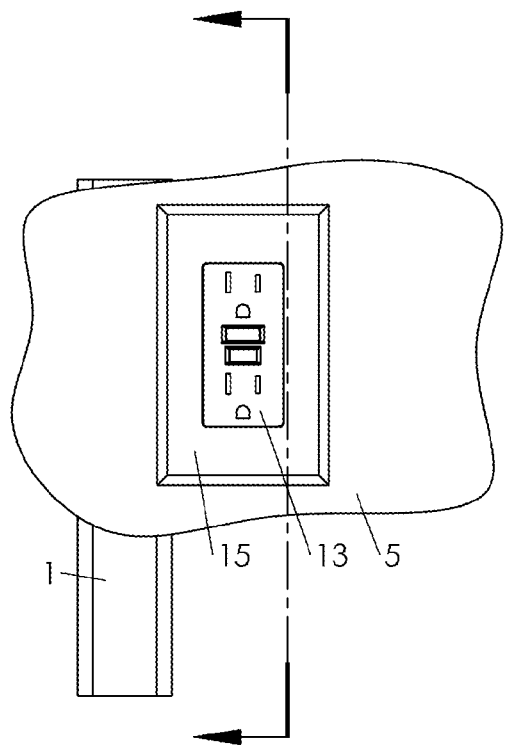
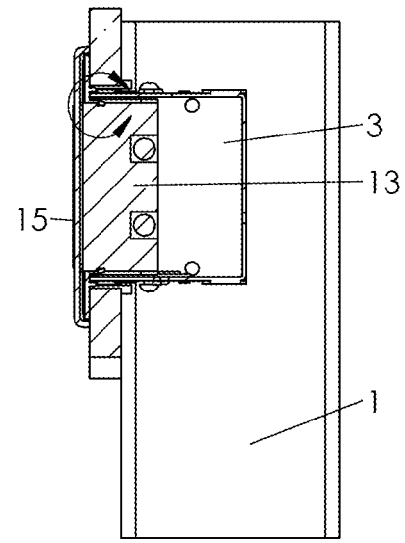
FIG. 4c
FIG. 4d
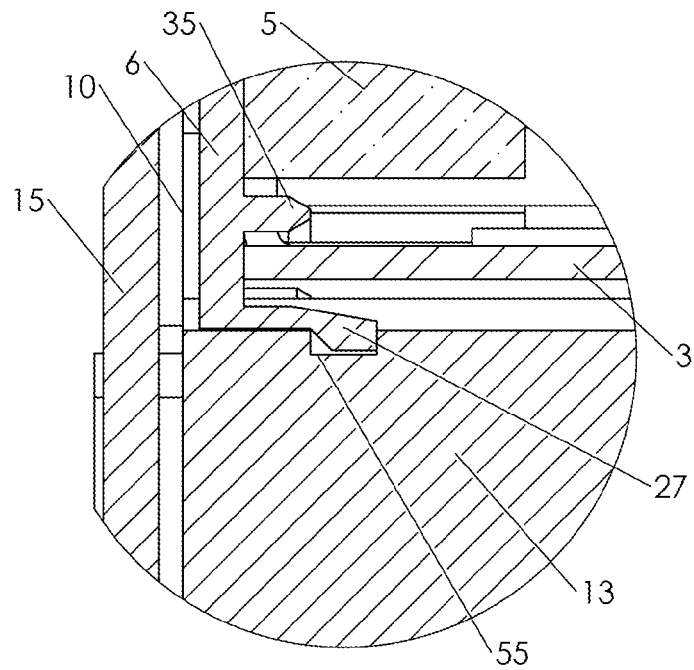
FIG. 4e

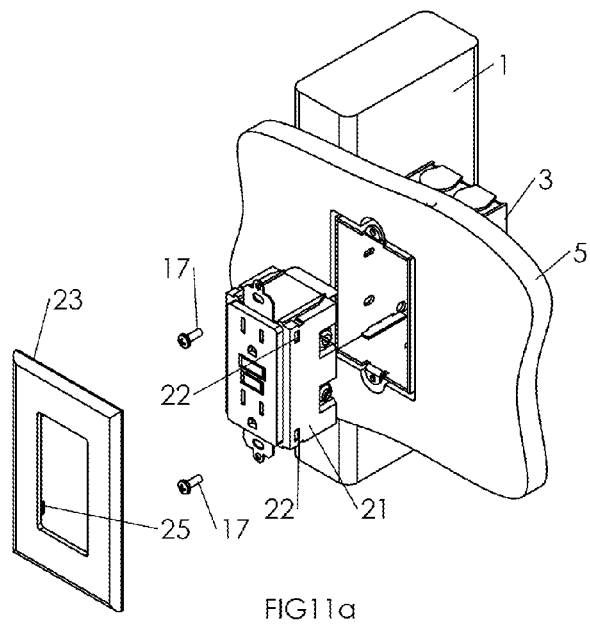
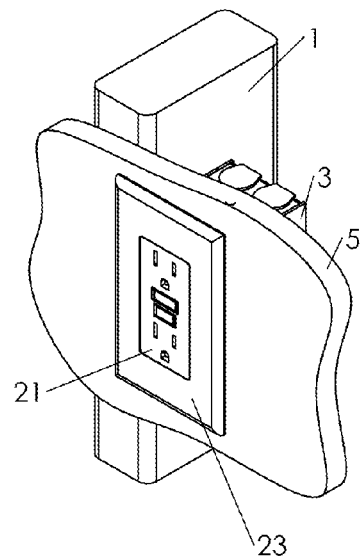
FIG11a
FIG11b
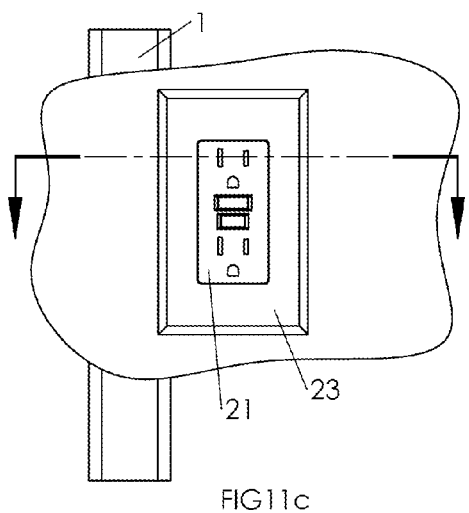
FIG11c
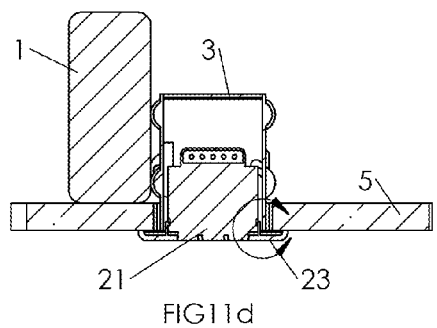
FIG11d
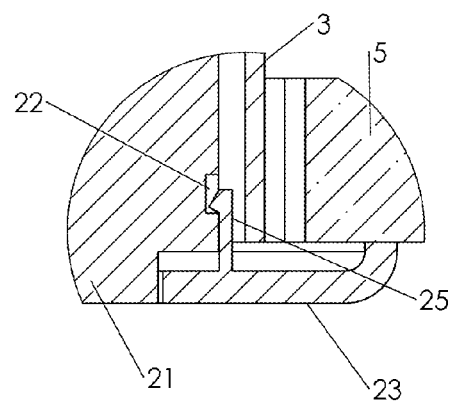
FIG11e

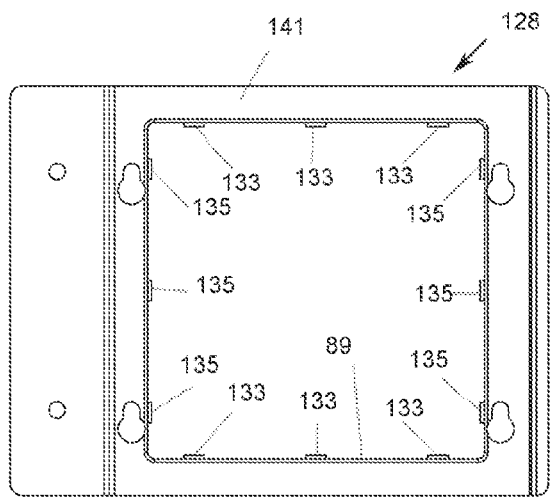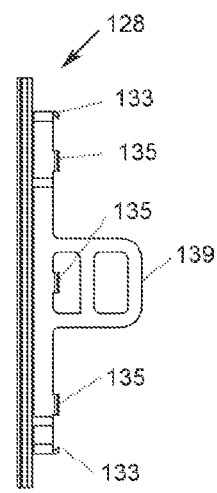
FIG. 24c　　　　　　　　FIG. 24d
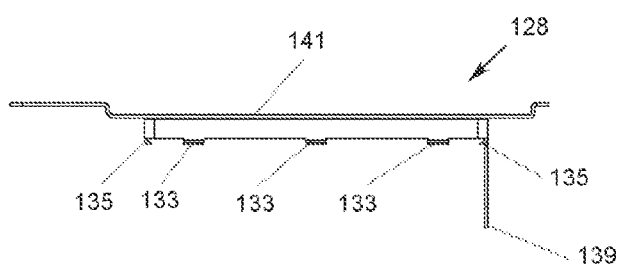
FIG. 24e

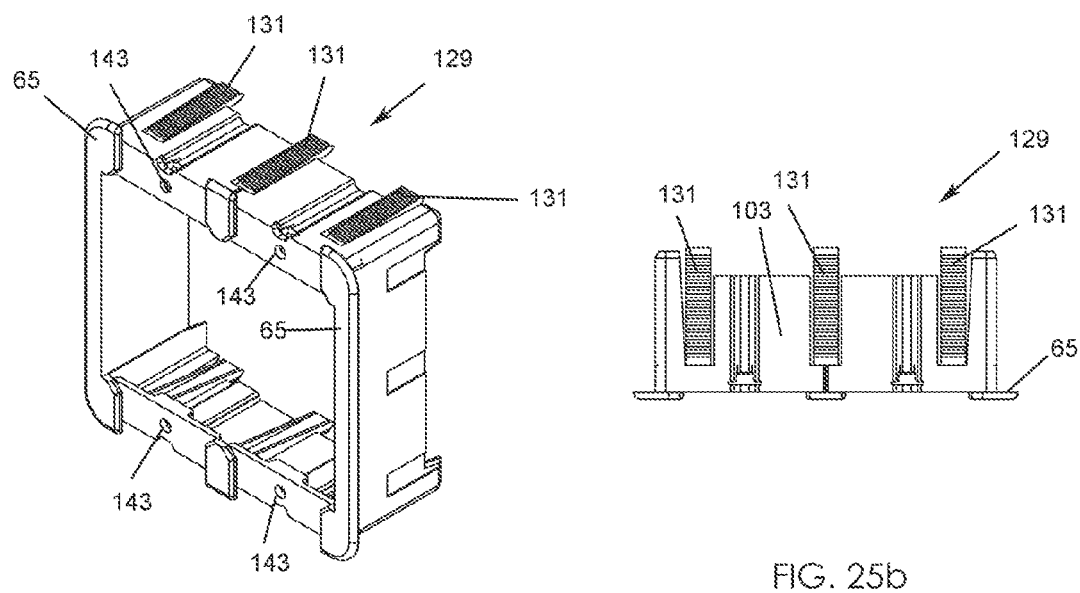
FIG. 25a
FIG. 25b
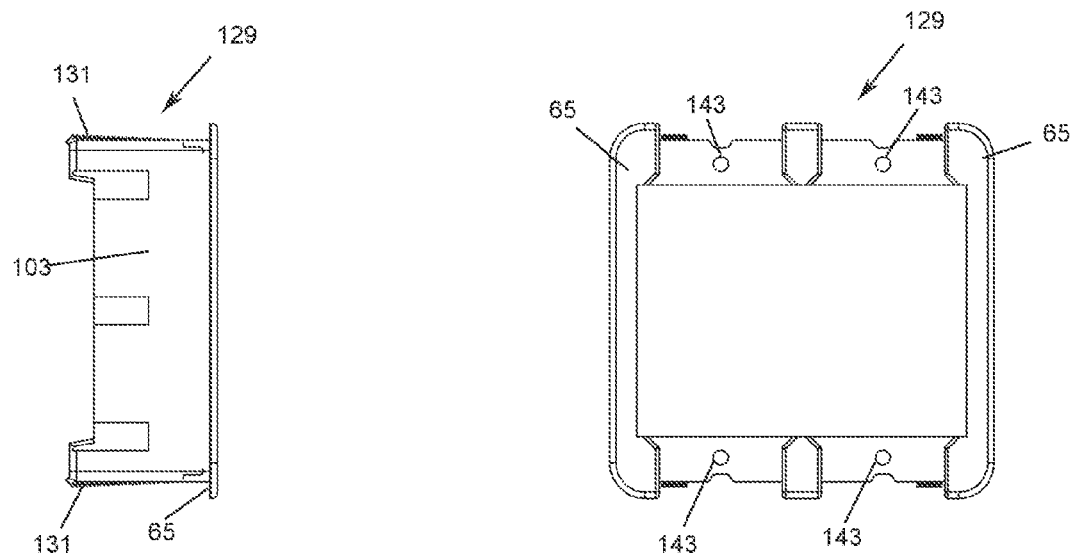
FIG. 25c
FIG. 25d

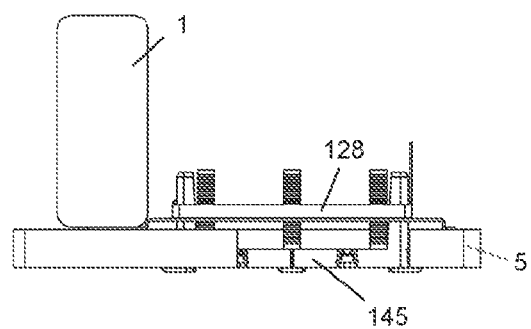
FIG. 26c
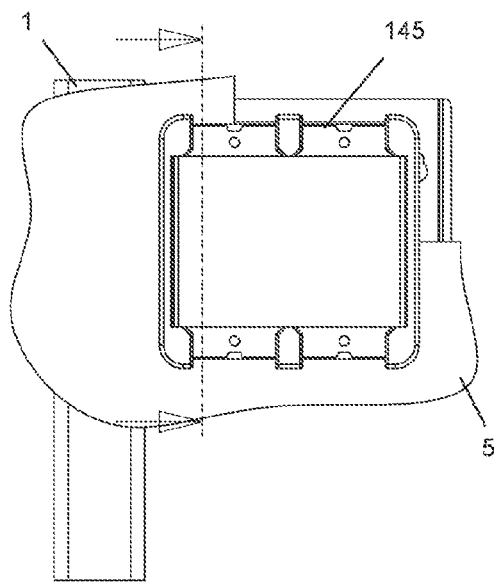 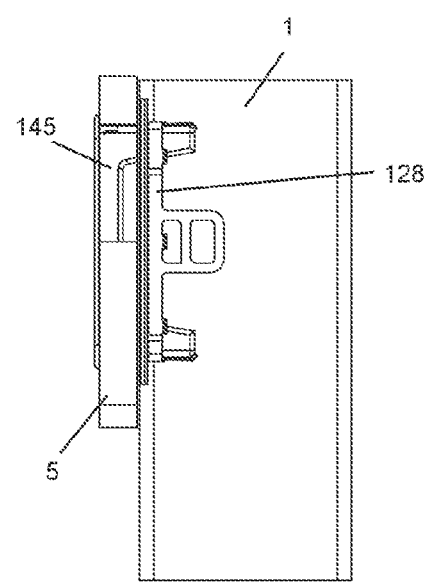
FIG. 26d    FIG. 26e
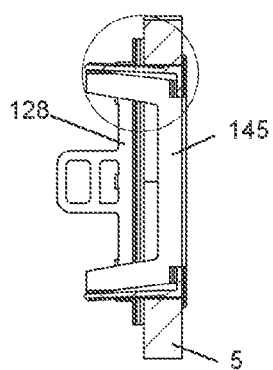 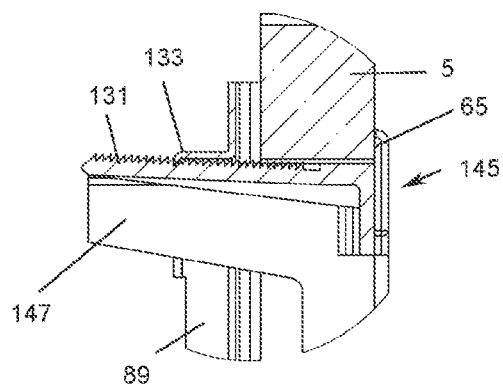
FIG. 26f    FIG. 26g

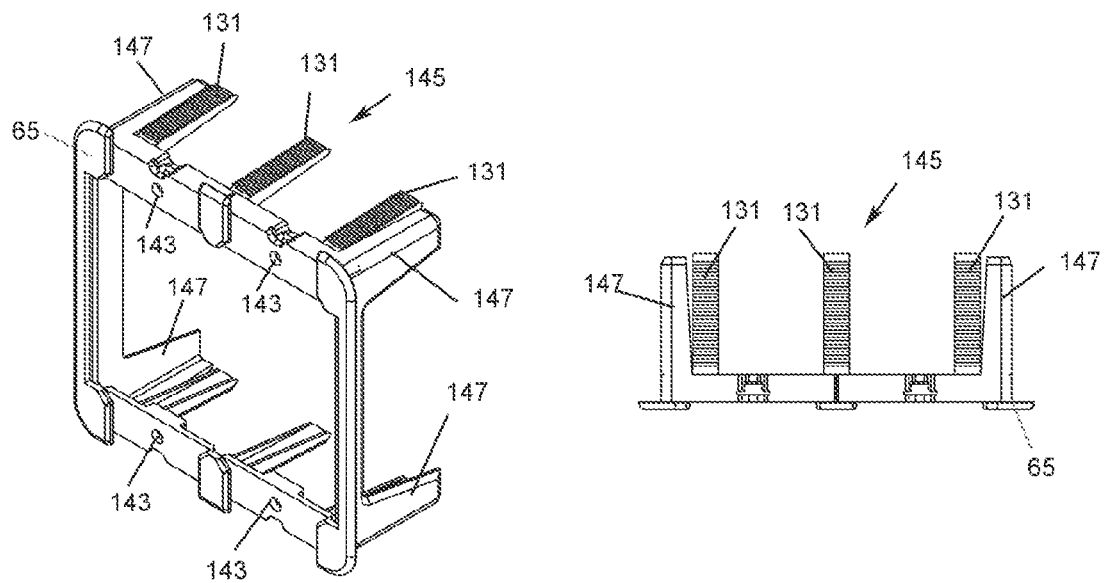
FIG. 27a
FIG. 27b
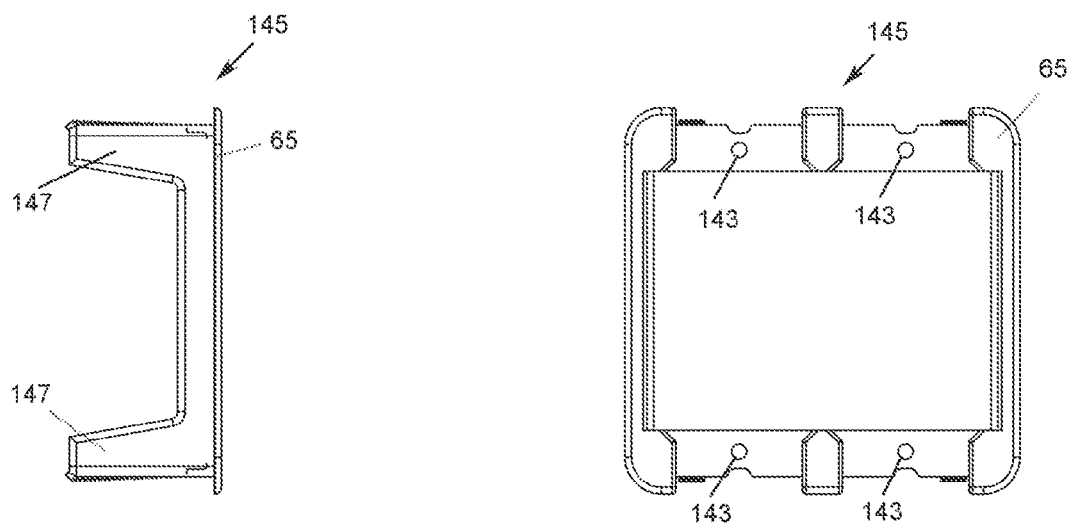
FIG. 27c
FIG. 27d

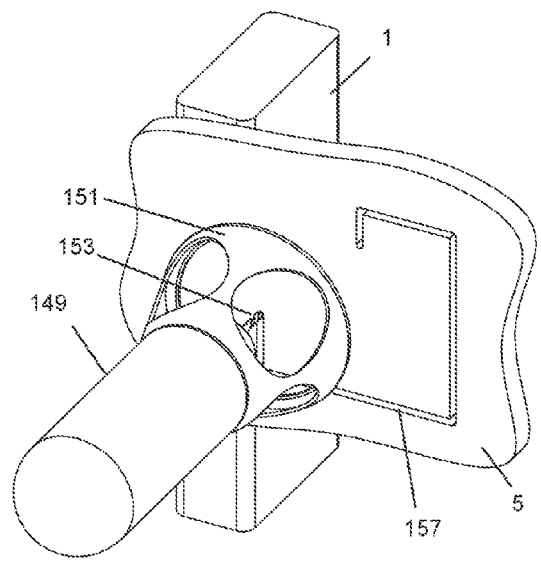
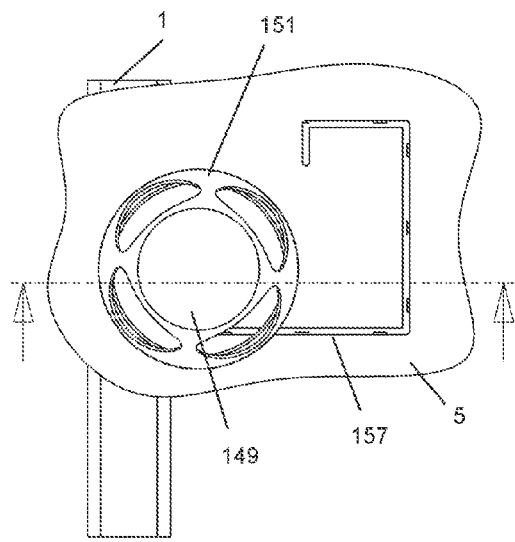
FIG. 28a
FIG. 28b
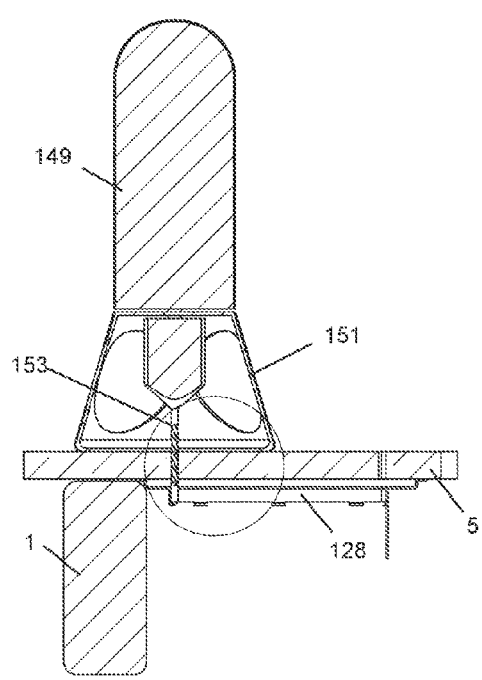
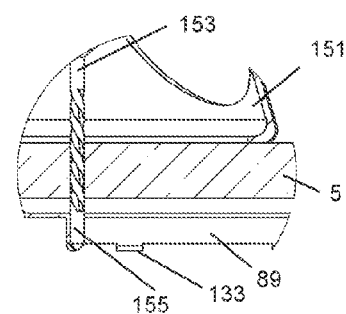
FIG. 28c
FIG. 28d

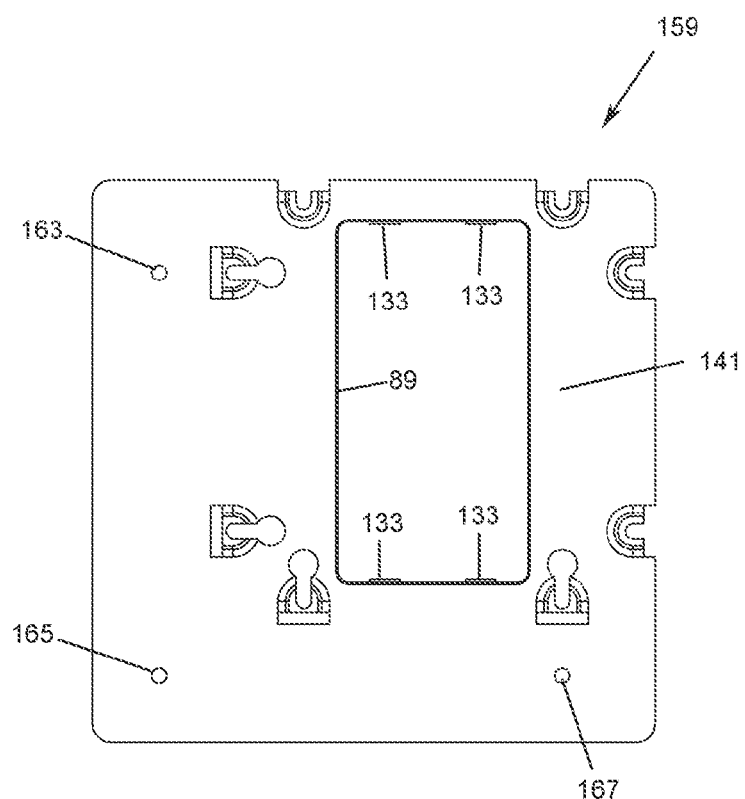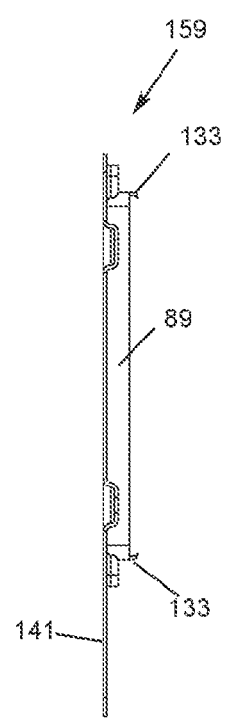
FIG. 30c                FIG. 30d
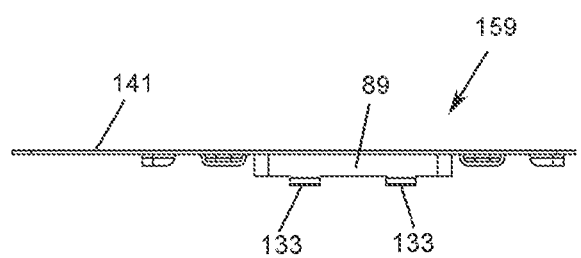
FIG. 30e

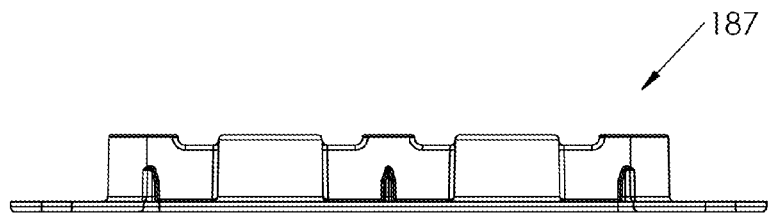
FIG. 38a
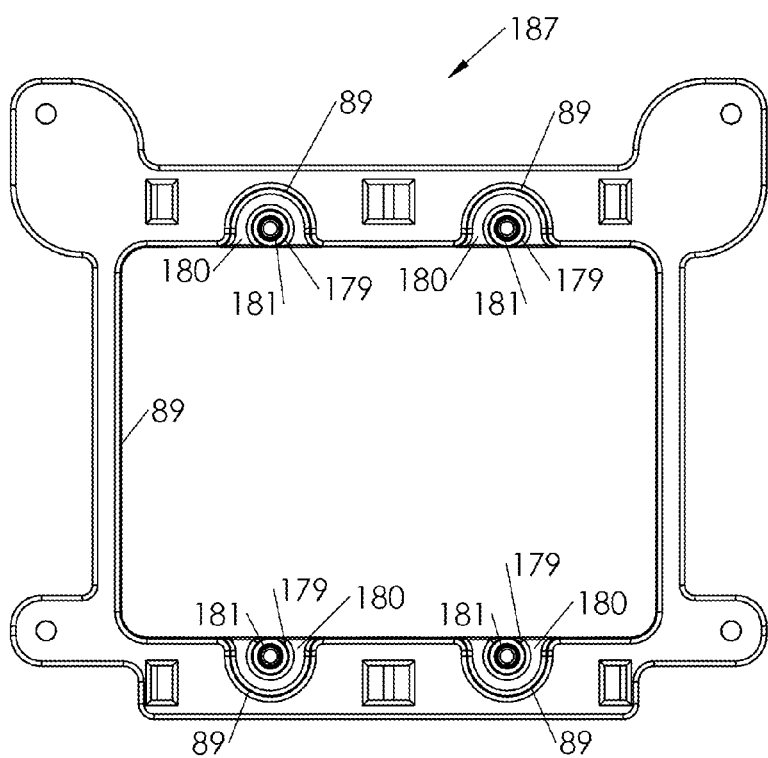 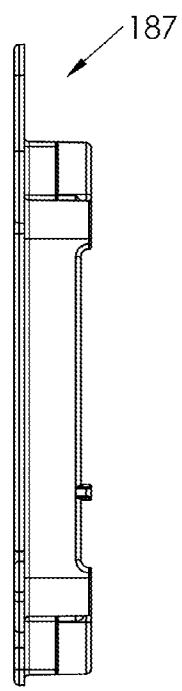
FIG. 38b    FIG. 38c

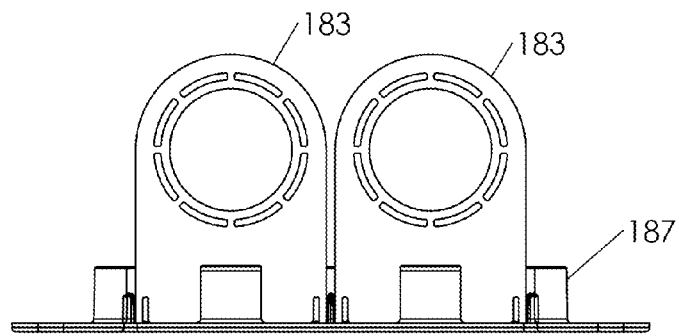
FIG. 40a
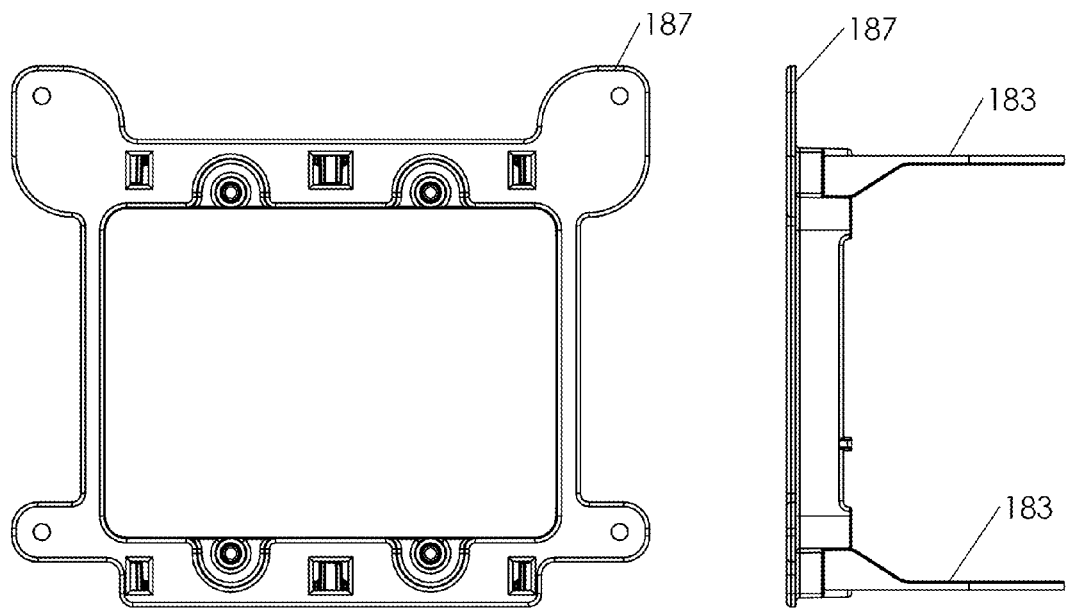
FIG. 40b
FIG. 40c

BRACKET AND SLEEVE ASSEMBLY

This is a continuation-in-part of co-pending application Ser. No. 14/033,257, filed Sep. 20, 2013, which is a continuation-in-part of co-pending application Ser. No. 13/795,538, filed Mar. 12, 2013. The present disclosure contains subject matter related to co-pending application Ser. No. 13/745,034, entitled ELECTRICAL BOX AND SLEEVE, filed by the current inventors on Jan. 18, 2013. The benefit of provisional application 61/878,432, filed Sep. 16, 2013 on behalf of inventors Jean-Guy Gagne and James Rogers, is claimed under 35 U.S.C. 119(e).

BACKGROUND

This disclosure is related to installation of electrical components in building walls, more particularly, to installation of support structure for line voltage and low voltage devices and the like. Existing electrical codes require containment of electrical switches and receptacles within electrical boxes. In new house or building construction, line voltage electrical boxes typically are attached to wall studs or joists before drywall or equivalent sheet material is applied to enclose the wall space. An opening is cut in the sheet material to accommodate the box or boxes that have been mounted in known positions. According to code, the enclosure of a line voltage electrical device must be in continuity with the wall substrate. Although low voltage applications, such as network communications, need not meet line voltage box requirements, means must be provided in the wall to provide appropriate access to internal wiring.

As the wall substrate, such as drywall, is fixed to the wall stud structure before installation of an electrical device can be completed, needs exist for efficiently locating and creating an opening in the substrate and for engaging the device in its existing enclosure. Cutting an opening in the wall substrate that is appropriately sized and placed can be time consuming. Difficulties exist in accurately locating a template to meet this need.

Conventionally, an electrical box is mounted to the wall stud so that the outer edge of the box is flush with the outer surface of the wall substrate, thereby meeting the code requirement for continuity. The installer must accurately locate the position of the box based on the wall substrate thickness. As various wall substrate thicknesses are in common use, a mounted box may need to be removed and repositioned if the substrate thickness is not compatible. As the outer edge of the box may not be square with the wall substrate, means should be provided to ensure that the facing of the mounted electrical device is flush with the plane of the substrate.

The conventional procedures for installation of electrical boxes and formation of substrate openings, therefore, involve a considerable expenditure of time and effort. Needs exist for a more accurate and easier way to facilitate installation of electrical devices in building walls, both in the formation of the substrate opening and in the provision of support for the electrical devices. Improvement is needed for an installation in which the electrical device is parallel to the front face of the wall substrate.

SUMMARY OF DISCLOSURE

The needs described above are fulfilled, at least in part, by an assembly including a flange that can be coupled to an interior wall structure, such as an electrical box. A planar surface of the flange abuts the outer surface of the wall substrate thus providing tight contact between the wall substrate and the interior structure.

Mating elements of the flange engage an electrical device to maintain the device in flush and parallel alignment with the substrate. Flexible tabs may extend from an inner opening periphery of the flange to couple with corresponding recesses in a housing of the electrical device. Cutout portions of the inner periphery mate with ribs on an outer surface of the housing to provide alignment between the flange and the device during insertion thereof.

The recesses are formed on the outer surface of the device housing at locations interior of a front facing housing surface. A plurality of channels extends from the front facing surface to the recesses, thereby facilitating easy removal of the electrical device from the flange.

The outer perimeter of the flange may be configured with a beveled edge. The flange may comprise slots for receiving elements of a cover plate for the electrical device. The flange may be configured to accommodate a plurality of electrical devices including, for example, devices configured for line voltage applications and as well as for low voltage communication devices.

An additional assembly embodiment may include a removable sleeve that is engageable with a flange directly fixed to an electrical box or the like. The flange is configured as a template guide for cutting the wall substrate opening. The sleeve contains an outer longitudinal surface with a plurality of teeth spaced along its extent. A plurality of retainers extends from an inner opening periphery of the flange for engaging the teeth of the sleeve. Retainers extend from an inner longitudinal surface of the sleeve to mate with recesses in the electrical device when inserted in the sleeve.

When inserted through an opening in a wall substrate and engaged with the flange, the sleeve secures tight contact between the wall substrate and the electrical box, irrespective of the thickness of the wall substrate. The electrical device can be inserted through the wall substrate opening for coupling with the sleeve.

A bracket body, mounted to a wall stud or the like, has a uniformly planar front surface that is configured to be flush with an internal surface of a wall substrate. An opening in the bracket body defines an inner perimeter that is coincident with an opening in the wall substrate. A flange extends contiguously along the perimeter opening in a direction opposite the front surface to form a template guide for cutting the wall opening. Indentations in the flange at opposite sides of the perimeter are joined to the distal end of the flange by recessed surfaces. A boss extends from each recessed surface and is recessed from the front surface to provide leeway for cutting the wall substrate opening and to permit mounting of the device with a small screw connector to a hole in the boss.

Through holes are located in the bracket body at opposite sides of the inner perimeter. Rib members project at each hole to provide engagement with a detachable conduit mount. The conduit mount includes flexible cantilevered beams terminating in barbs for abutting the rib members. The bracket may be formed of a moldable plastic material with the conduit mount frangibly attached to the bracket body in the as-molded state. The conduit mount comprises a detachable frangible ring compatible to a plurality of conduit fitting sizes.

Additional advantages of the present disclosure will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 1b is a perspective view of the assembled installation shown in FIG. 1a;

FIG. 2b is a front view of the embodiment shown in FIGS. 1b and 2a;

FIGS. 3a-3e are various detail views of the flange element of FIG. 1a;

FIG. 4a is a perspective exploded view of a modification of the installation assembly shown in FIG. 1a;

FIG. 4b is a perspective view of the assembled installation shown in FIG. 4a;

FIG. 4c is a front view of the installation shown in FIG. 4b;

FIG. 4d is a section view taken from FIG. 4c;

FIG. 4e is an enlarged view of a portion of FIG. 4d;

FIGS. 5a-5d are various views of the electrical device shown in FIG. 4a;

FIGS. 6a-6b are views of the cover plate shown in FIG. 4a;

FIGS. 11a-11b are perspective views of an alternative embodiment to the one shown in FIGS. 4a-4b;

FIG. 11c is a front view of the embodiment of FIGS. 11a-11b;

FIG. 11d is a section view taken from FIG. 11c;

FIG. 11e is an enlarged detail view of a portion of FIG. 11d;

FIGS. 13a-13e are various detail views of the sleeve of FIG. 12a;

FIG. 17b is a front view of the installation shown in FIG. 17a;

FIG. 21a is an exploded isometric view of the embodiment;

FIG. 21b is an isometric view of the embodiment;

FIGS. 21c-21e are top, front and side views, respectively, of the embodiment;

FIG. 21f is a section view taken from FIG. 21d;

FIG. 21g is a detail view taken from FIG. 21f;

FIG. 22a is an exploded isometric view of the embodiment;

FIG. 22b is an isometric view of the embodiment;

FIG. 23a is an exploded isometric view of the embodiment in combination with an electrical box;

FIG. 23b is an isometric view of the embodiment shown in FIG. 23a;

FIGS. 24c-24e are front, side and bottom views, respectively, of the bracket shown in FIGS. 21a-23b;

FIG. 25a is a front isometric view of the sleeve shown in FIGS. 21a-23b;

FIGS. 25b-25d are top, side and front views, respectively, of the sleeve shown in FIG. 25a;

FIGS. 26a-26g exemplify an alternative embodiment for low voltage device installation.

FIG. 26a is an exploded isometric view of the alternative embodiment;

FIG. 26b is an isometric view of the alternative sleeve with bracket;

FIGS. 26c-26e are top, front and side views, respectively, of the alternative sleeve with bracket;

FIG. 26f is a section view taken from FIG. 26d;

FIG. 26g is a detail view taken from FIG. 26f;

FIG. 27a is a isometric view of the alternative sleeve of the embodiment of FIGS. 26a-26g;

FIGS. 27b-27d are top, side and front views of the alternative sleeve;

FIGS. 28a-28d illustrate use of a rotary cutting tool running along an internal perimeter flange of the bracket of FIGS. 26a-26g for cutting an opening in a wall substrate;

FIG. 28a is a front isometric view of the cutting tool in situ;

FIG. 28b is a front orthographic view of the cutting tool;

FIG. 28c is a section view taken from FIG. 28b;

FIG. 28d is a detail view taken from FIG. 28c;

FIGS. 30c-30e are front, side and bottom views of the single gang bracket shown in FIGS. 29a-29b;

FIGS. 32b-32d are top, side and front views of the bracket shown in FIG. 32a;

FIG. 34b is an isometric view of the device illustrated in FIG. 34a;

FIG. 35b is an isometric view of the arrangement shown in FIG. 35a;

FIGS. 37a-47e are illustrative of a modification of the embodiment of the low voltage bracket shown in FIGS. 36a-36e;

FIGS. 37a-37c are top, front and side orthographic views, respectively, of the bracket;

FIGS. 38a-38c are top, front and side orthographic views, respectively, of a two gang arrangement of the bracket;

FIGS. 40a-40c are top, front and side orthographic views, respectively, of the two gang bracket shown in FIGS. 38a-38e with conduit mounts;

FIGS. 43b-43c are top and front views, respectively, of the assembly shown in FIG. 43a;

FIGS. 44b-44c are top and front views, respectively, of the assembly shown in FIG. 44a;

FIGS. 45b-45c are top and front views, respectively, of the assembly shown in FIG. 45a;

FIG. 47e is a back isometric view of the assembly shown in FIGS. 47a-47d.

DETAILED DISCLOSURE

Figure 1A:
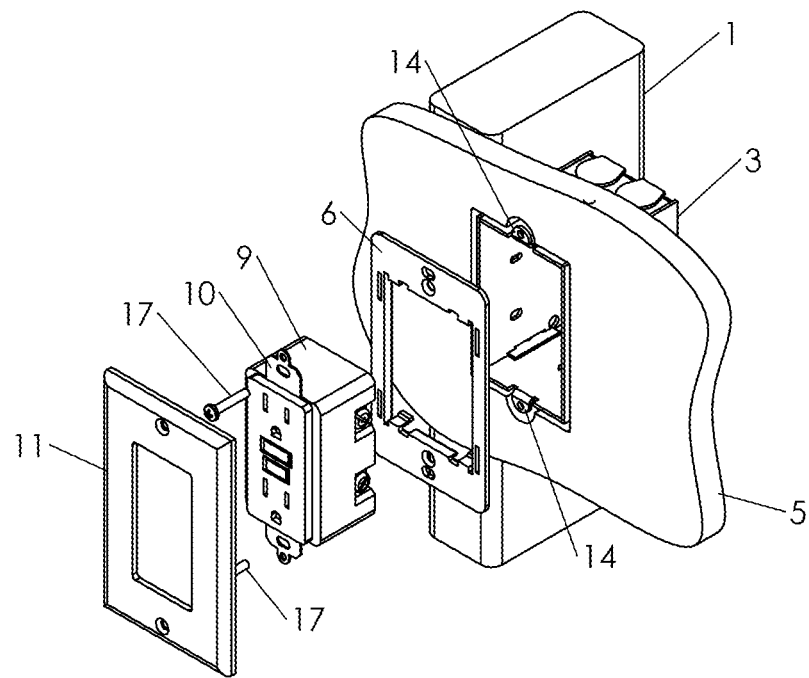
FIG. 1a is an exploded perspective view of a preferred embodiment of an installation assembly.
Figure 1B:
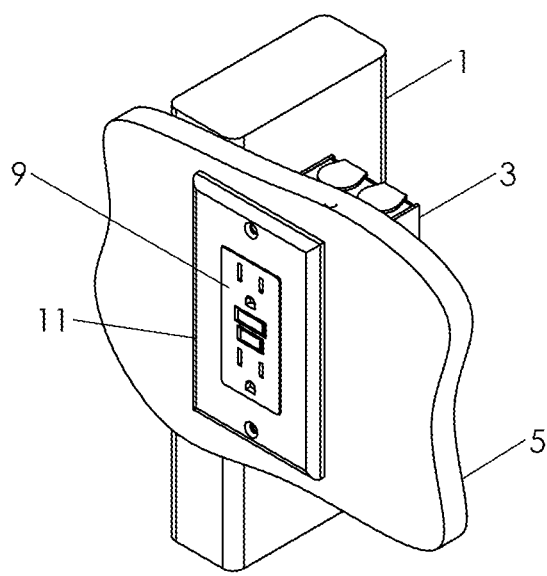

A preferred embodiment of an installation assembly is shown in FIGS. 1a and 1b. Electrical box 3 may be mounted in conventional manner on wall stud 1 behind wall substrate 5. Flange 6 is sandwiched between mounting plates 10 of conventional electrical device 9, illustrated herein as an outlet. It should be understood that the assembly is applicable for use with other electrical devices, such as switches and the like. Fasteners 17, threaded into holes on tab 14 of box 3, hold both device 9 and flange 6 in place. Flange 6 is flush with the outer surface of wall substrate 5. Flange 6 may be fabricated of injection molded plastic or metal. Cover plate 11 may be mounted with threaded fasteners, not shown, on device 9 in conventional manner.

Figure 2A:
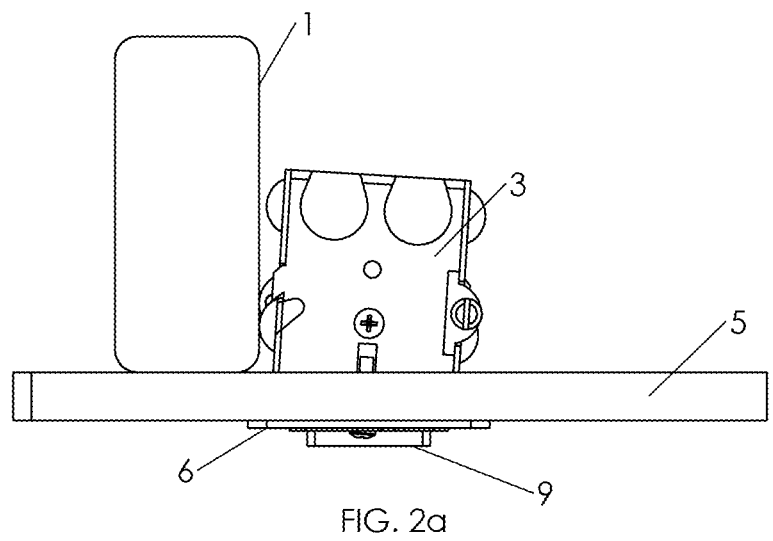
FIG. 2a is a top plan view of the assembled installation shown in FIG. 1a, applied to an electrical box mounted askew on a stud.
Figure 2B:
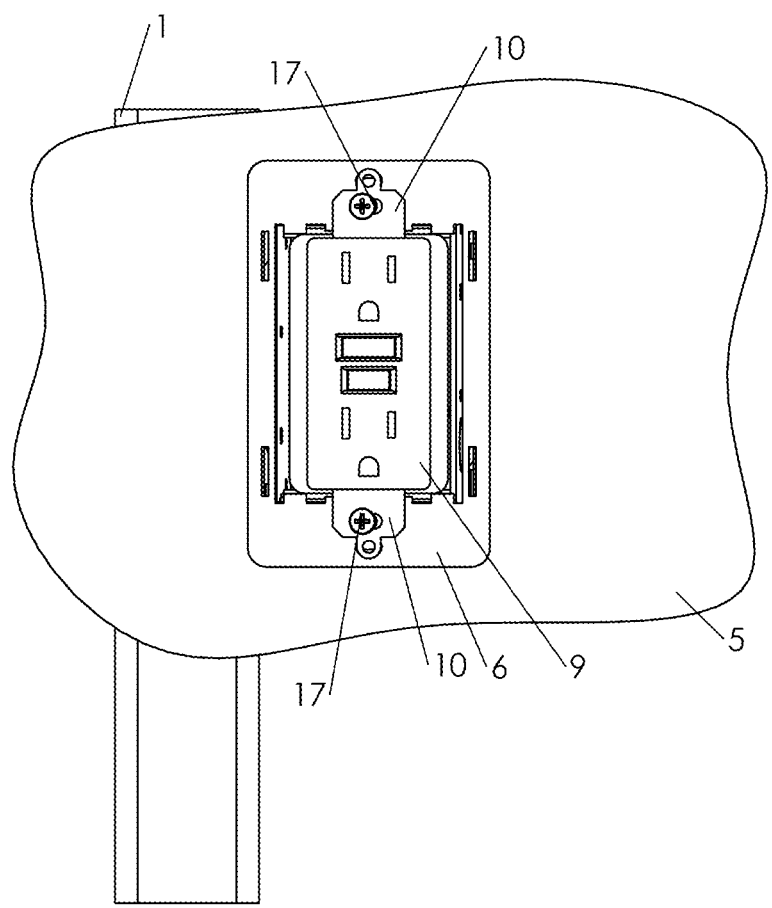
Figure 3C:
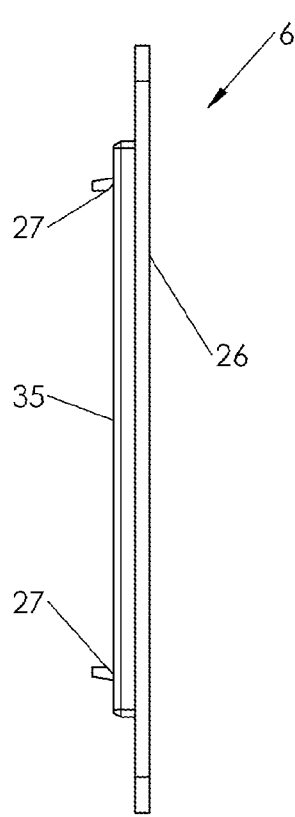
Figure 3D:
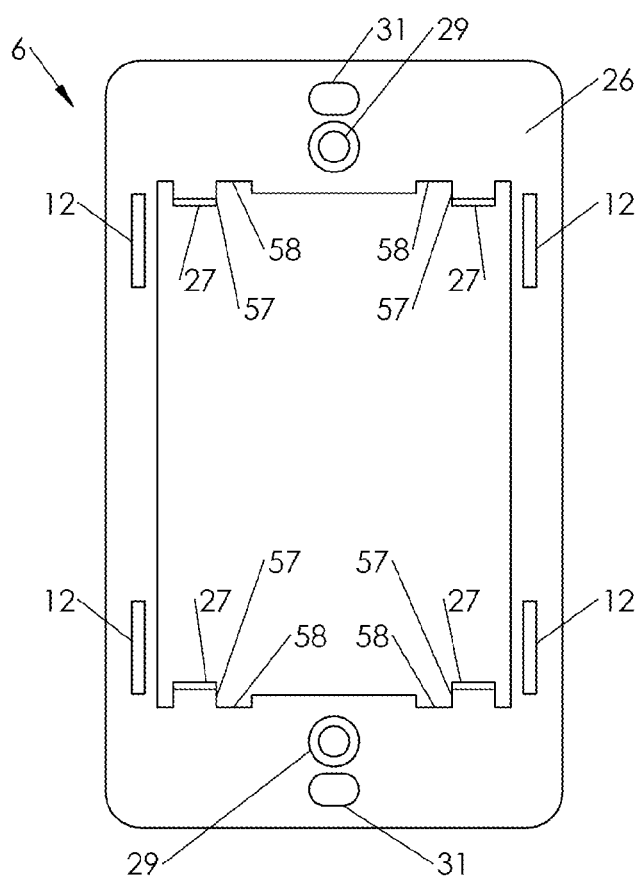
Figure 3E:
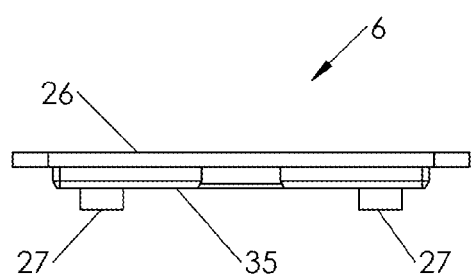

Flange 6 thus ensures that the front surface of device 9 can be mounted parallel to drywall 5 even if box 3 is not. In the latter instance, as illustrated in FIGS. 2a and 2b, electrical box 3 is mounted askew with respect to stud 1 and wall substrate 5. Flange 6 rests flush against drywall 5 allowing the front face of device 9 to be mounted parallel to the outer surface of drywall 5. The presence of flange 6 device avoids the likelihood that mounting plates 10 would dig into wall substrate 5 and skew device 9, as would occur during conventional installation.

Figure 6A:
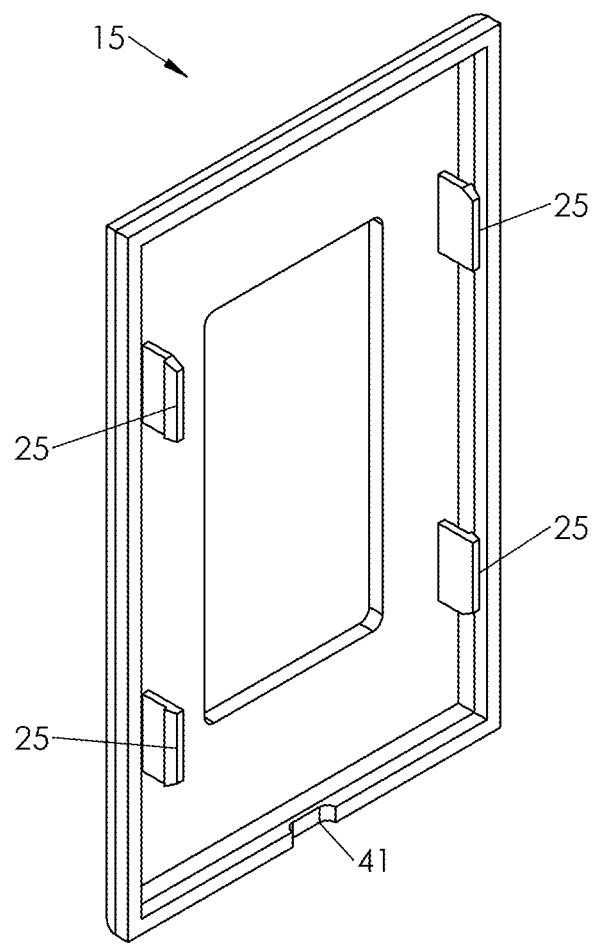
Figure 6B:
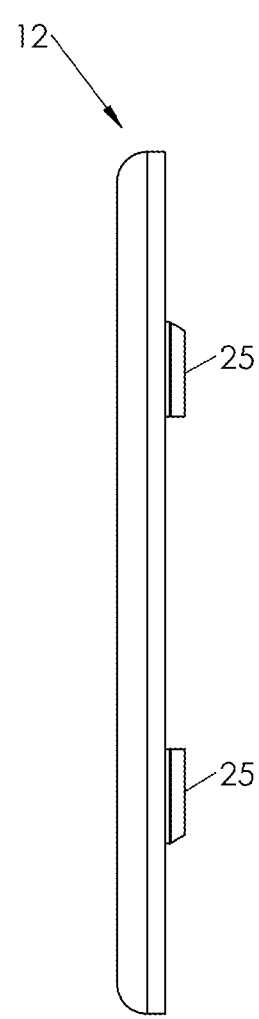

FIGS. 3a-3e are detailed views of flange 6 of FIG. 1a. Flange 26 contains mounting holes 29 for attachment to the electrical box. Flange 26 can accommodate screw attachment to a cover plate 11, shown in FIG. 1a via clearance holes 31. Cover plate retainer holes 12 are provided to accommodate a snap-on cover plate 15, shown in FIGS. 6a and 6b, in lieu of cover plate 11. Sprung retainers 27 extend inwardly from the inner opening periphery at the upper and lower corners thereof. Ribs 35 give added strength to flange 26, reducing tendency of deformation when installed.

Centering cutout portions 57 and 58 allow snap-in device 13, shown in the modified embodiment of FIGS. 4a-4e, to be centered in the opening. In this installation, the hole in drywall 5 may be cut around the outside perimeter of electrical box 3 in conventional manner. Flange 6 is fastened to box 3 with threaded fasteners 17 through mounting holes 29 into holes on tab 14 of the box. Snap-in electrical device 13, illustrated as an outlet, may then be pushed into flange 6.

Electrical device 13 is illustrated in FIGS. 5a-5d. Recesses 55 are located proximate the four corners of the device housing in the top and bottom surfaces thereof. The recesses extend inwardly from the front surface of the housing. Centering ribs 51 on the top and bottom surfaces allow device 13 to be centered and solidly retained horizontally and vertically. Chamfer 53 on the end of each rib 51 allows easy installation between the matching cutout portions of flange 6.

Referring to FIGS. 4a-4e, as device 13 is inserted, side and top surfaces of ribs 51 on device 13 run along horizontal centering surfaces 57 and vertical centering surfaces 58 respectively. When mounting flange 10 of the device reaches flange 6, four sprung retainers 27 drop into device recesses 55 to secure the device in place. Removal of the device may be accomplished by flexing retainers 27 out of recesses 55. Retainers 27 are accessed from either side of device 13 for removal. Flexible barbed retainers 25 of snap-on cover plate 15 pass through holes 12 in flange 6 and retain on the backside thereof. Removal of the cover plate 15 can be done by inserting a screw driver or the like in recess 41 to pry off cover plate 15. Engagement of the device with the flange and cover plate may best be seen in the partial detail view of FIG. 4e.

Figure 7A:
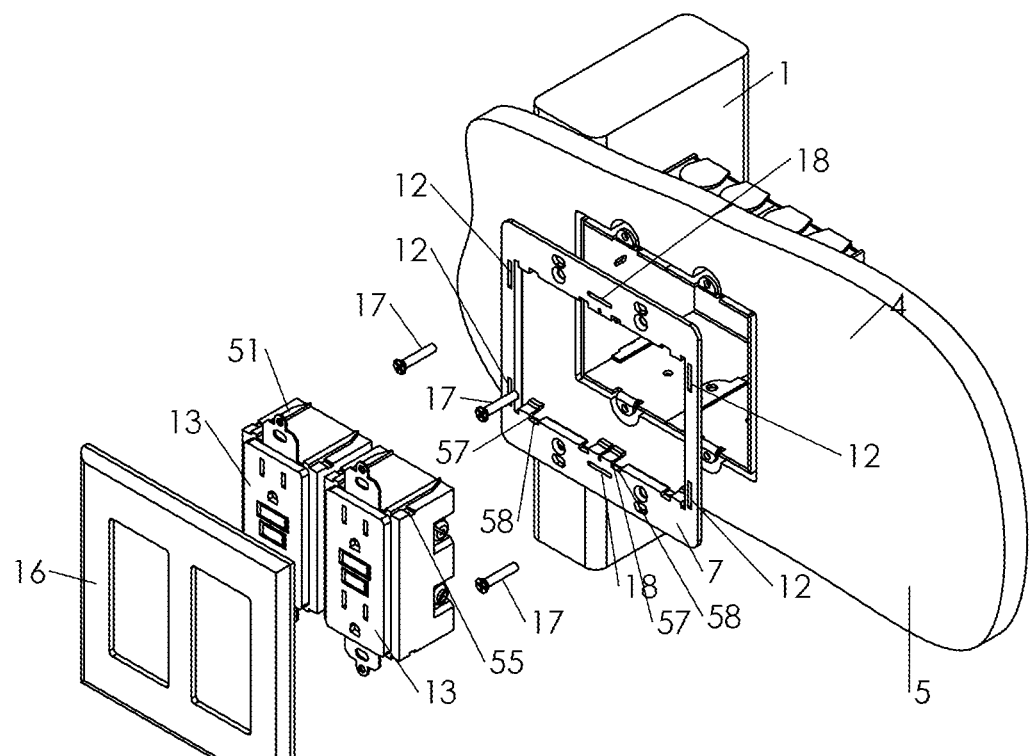
FIGS. 7a-7b are exploded and assembled perspective views, respectively, of a two gang installation of the embodiment shown in FIGS. 4a-4b.
Figure 7B:
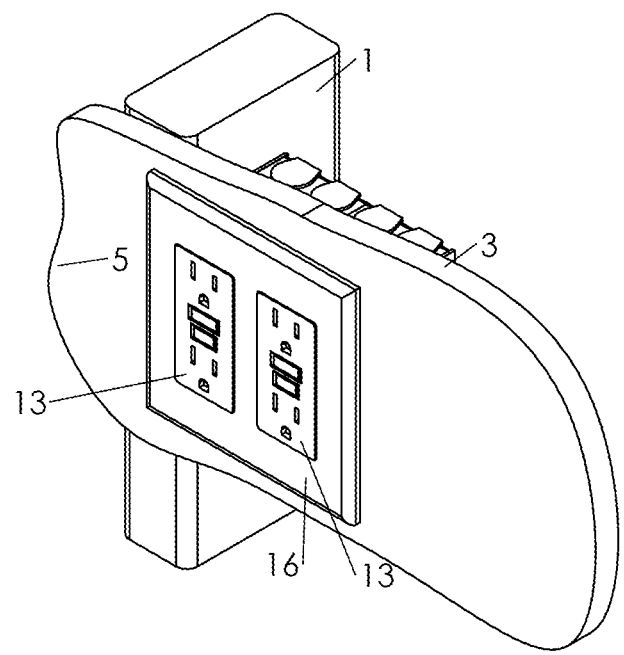
Figure 8A:
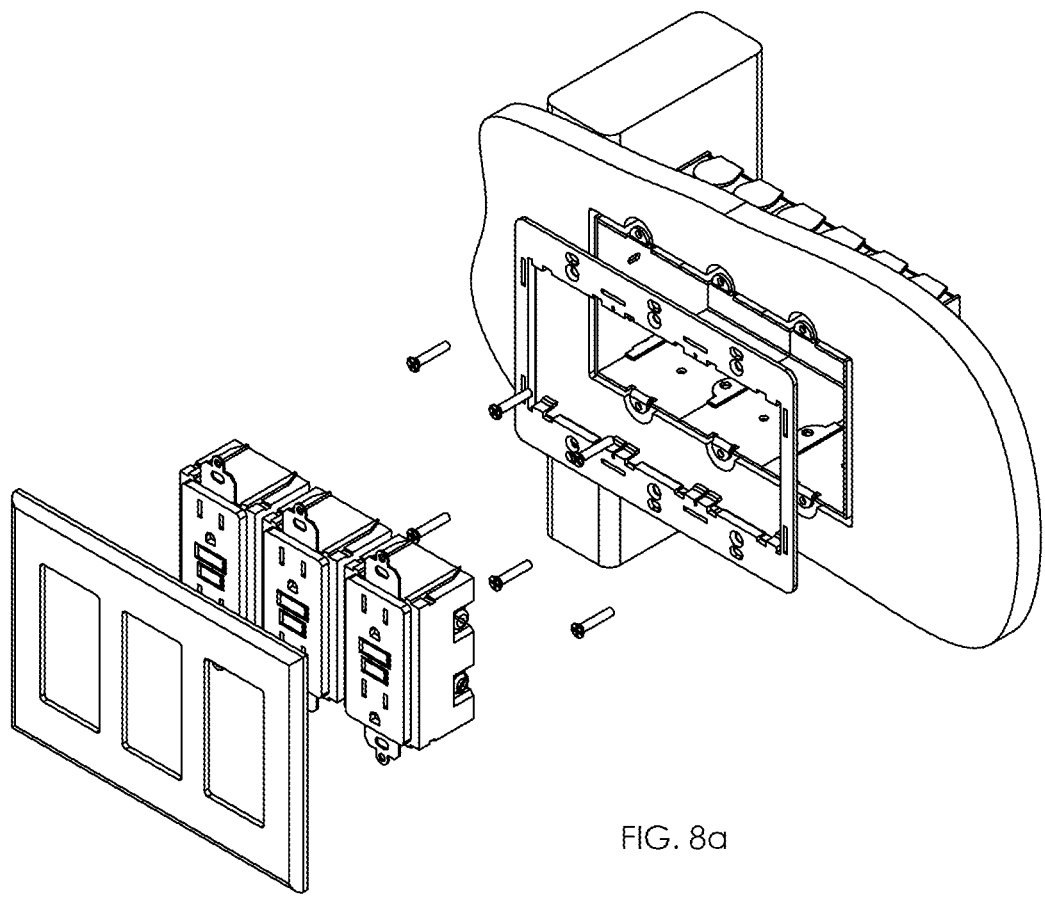
FIGS. 8a-b are exploded and assembled perspective views, respectively, of a three gang installation of the embodiment shown in FIGS. 4a-b.
Figure 8B:
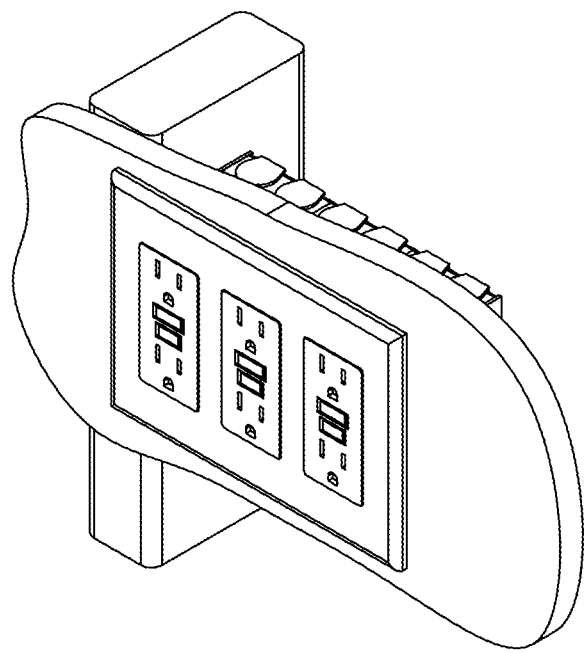
Figure 9A:
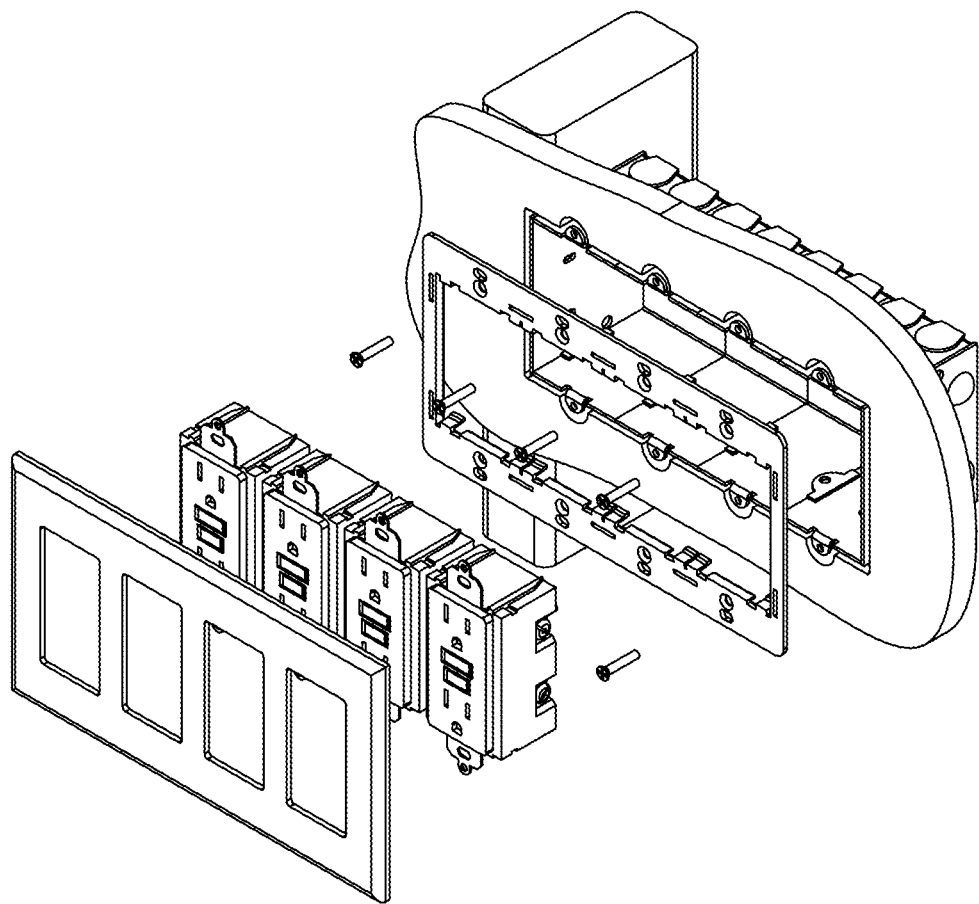
FIGS. 9a-9b are exploded and assembled perspective views, respectively, of a four gang installation of the embodiment shown in FIGS. 4a-4b.
Figure 9B:
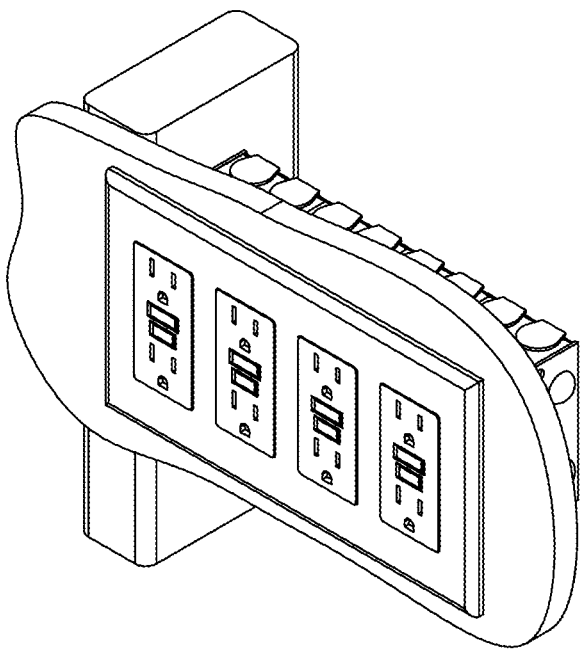

FIGS. 7a-7b illustrate the embodiment of FIGS. 4a-4e, for use in accommodating a two gang installation. Two gang flange 7 is installed via fasteners 17 on two gang electrical box 4. Electrical devices 13 are snapped-in to flush flange 7. Two gang cover plate 16 is snapped on to flush flange 7 via side holes 12 and mid span holes 18. Device centering ribs 51 and flush flange horizontal centering surfaces 57 allow cover plate 16 to be installed without horizontal adjustment of the devices, as would be required in conventional installations. This feature is a benefit to all multigang installations. Similar installations are shown in three and four gang configurations in FIGS. 8a-8b and 9a-9b, respectively.

Figure 4A:
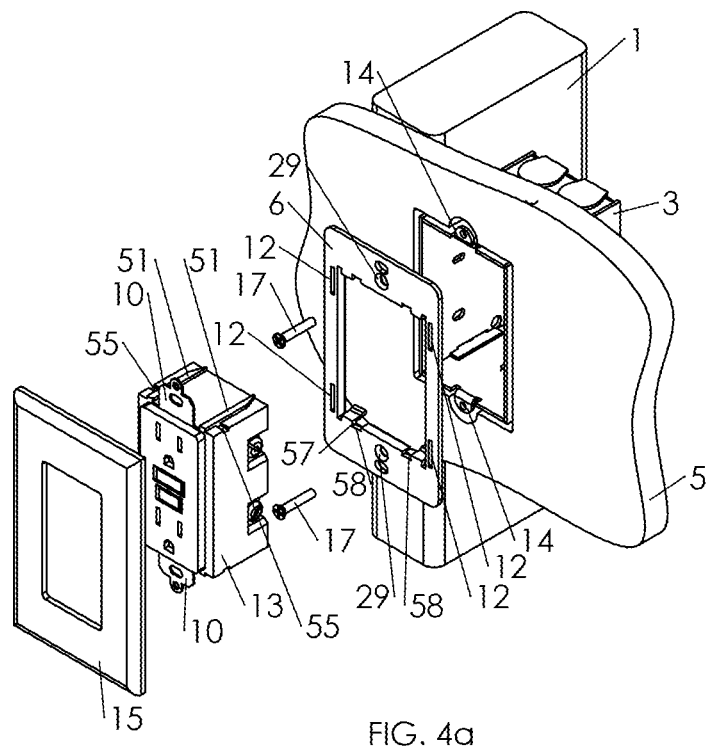
Figure 4B:
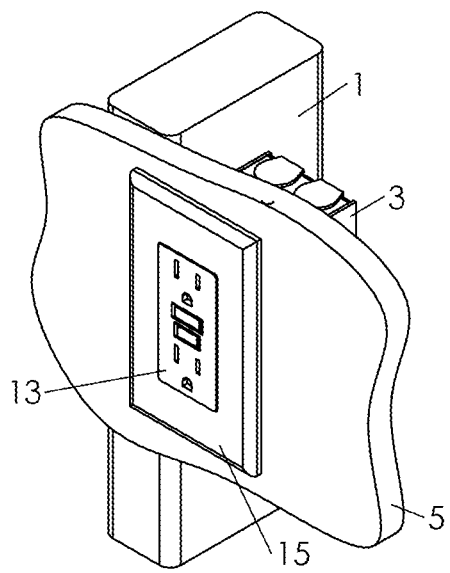
Figure 5A:
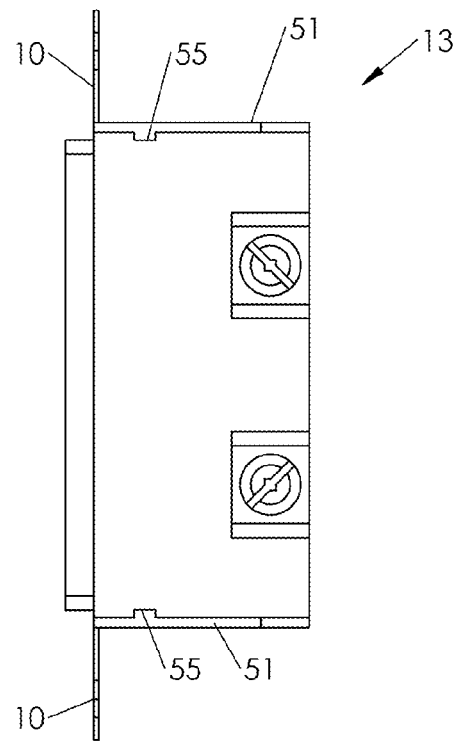
Figure 5B:
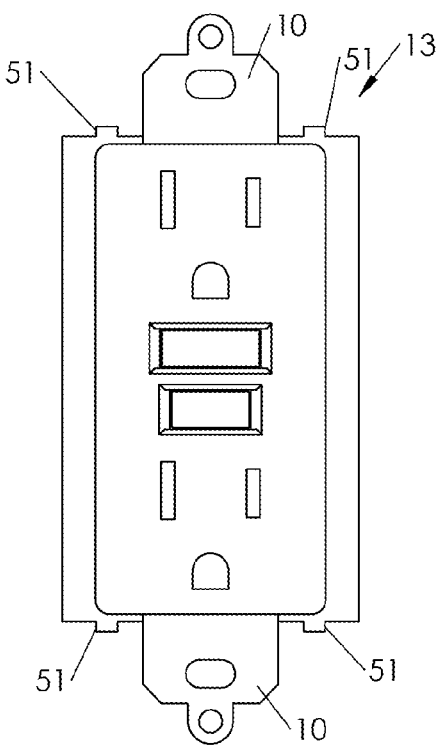
Figure 5C:
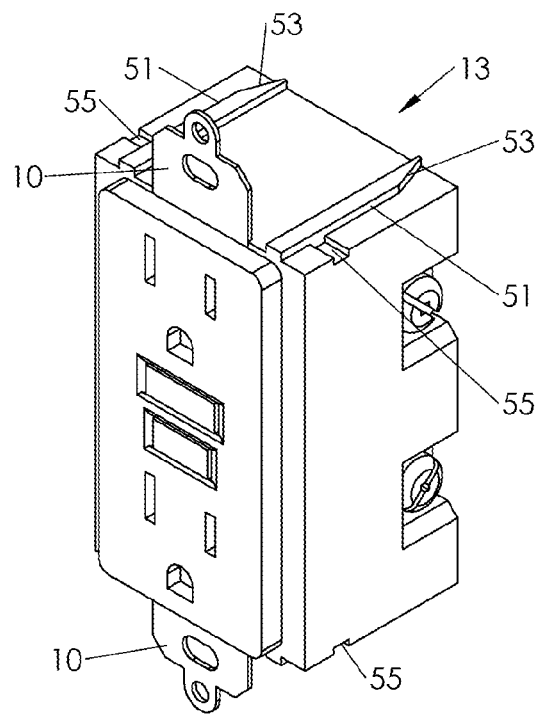
Figure 5D:
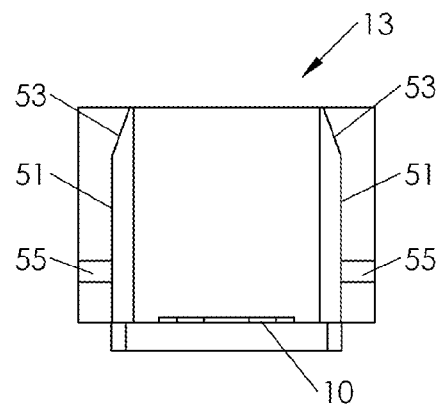
Figure 10A:
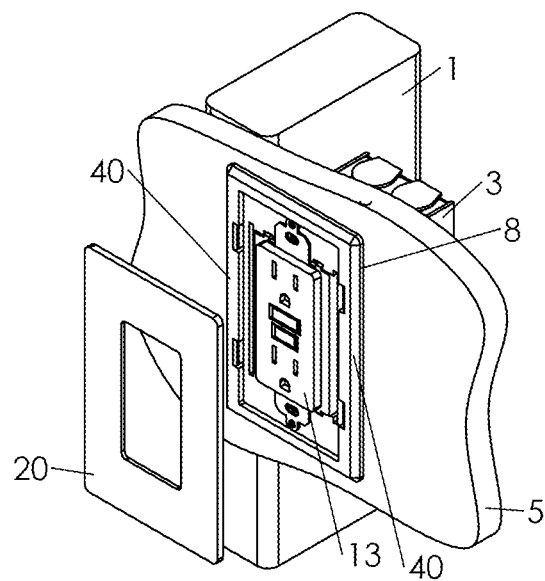
FIGS. 10a-10b are perspective views of a modification of the embodiment shown in FIGS. 4a-4b.
Figure 10B:
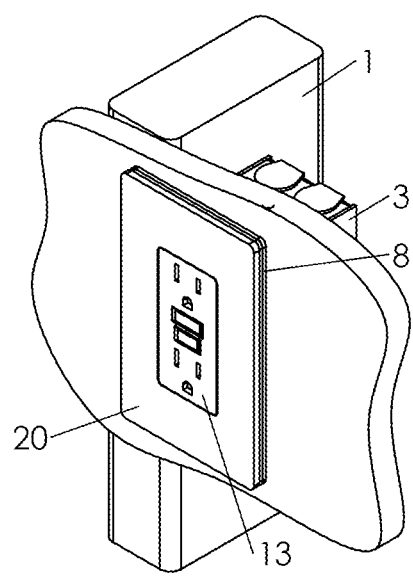
Figure 10C:
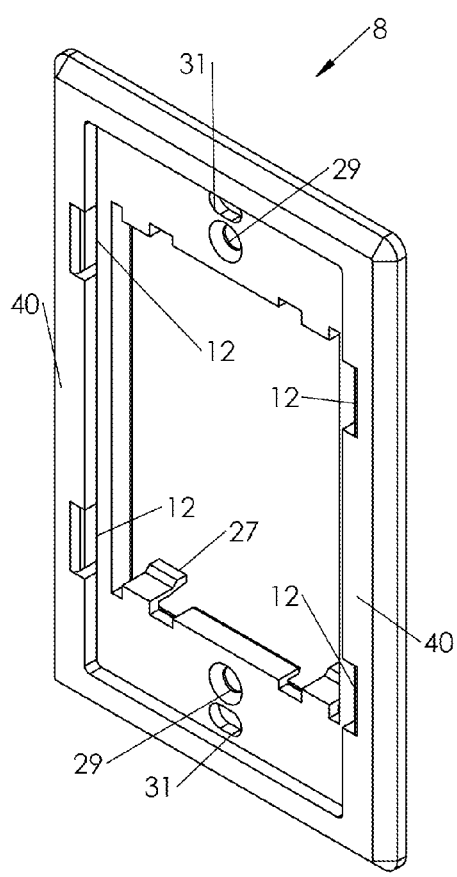
FIGS. 10c-10d are perspective detail views of the flange of FIGS. 10a-10b.
Figure 10D:
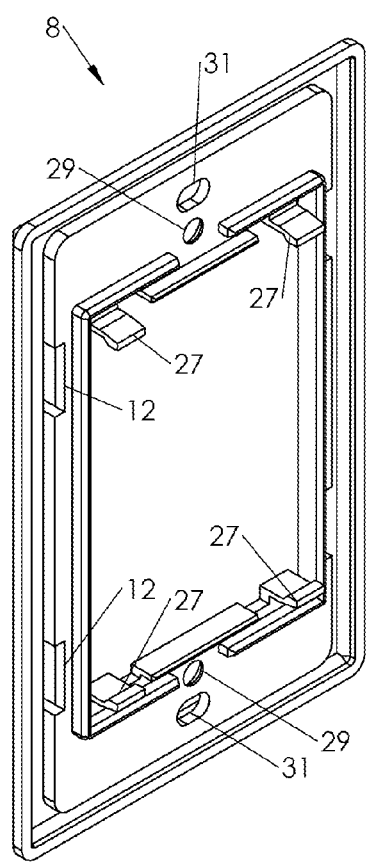

FIGS. 10a-10b illustrates a variation to the single gang snap-in configuration of the flush flange assembly shown in FIGS. 4a-4b. Flange 8 corresponds to flange 6, shown previously. Flange 8 has proud perimeter embossment 40, giving additional strength to the part. The embossed perimeter is visible after the matching cover plate 20 is installed. Flange 8 is shown in more detail in FIGS. 10c-10d.

Figure 11F:
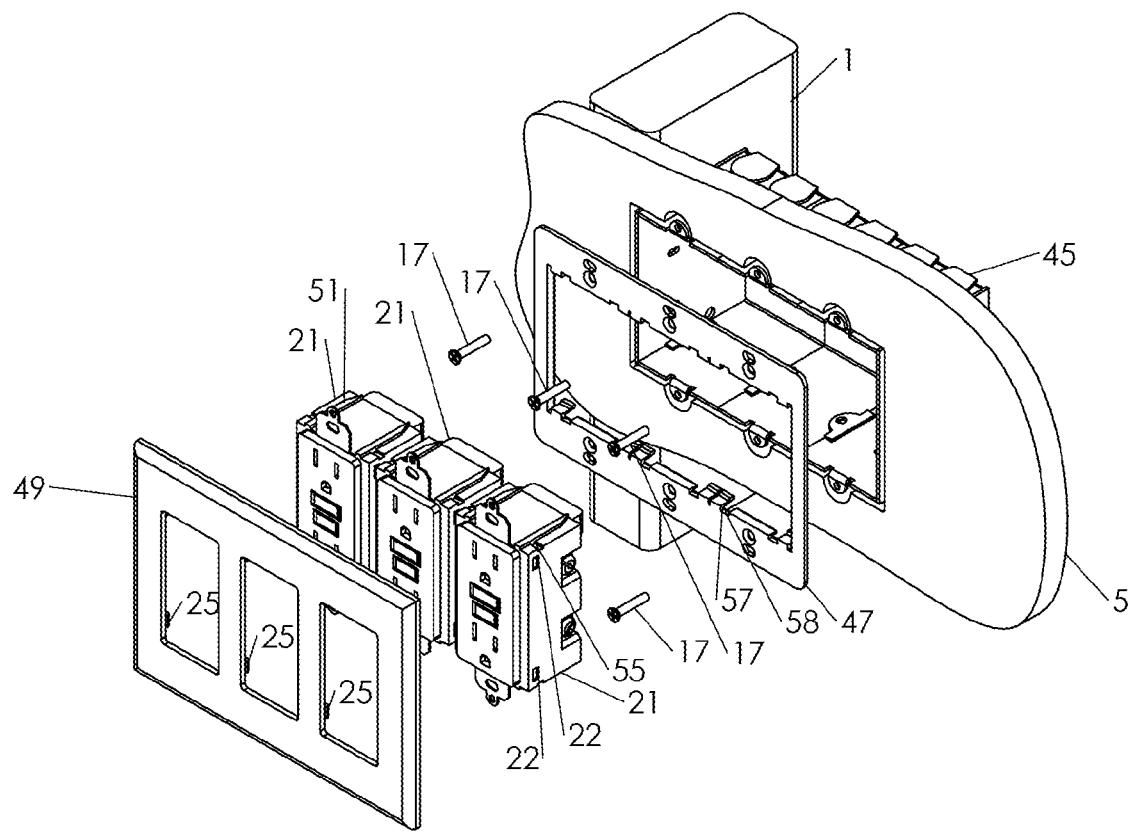
FIGS. 11f-11g are exploded and assembled perspective views, respectively, of a three gang installation of the embodiment shown in FIGS. 11a-11b.
Figure 11G:
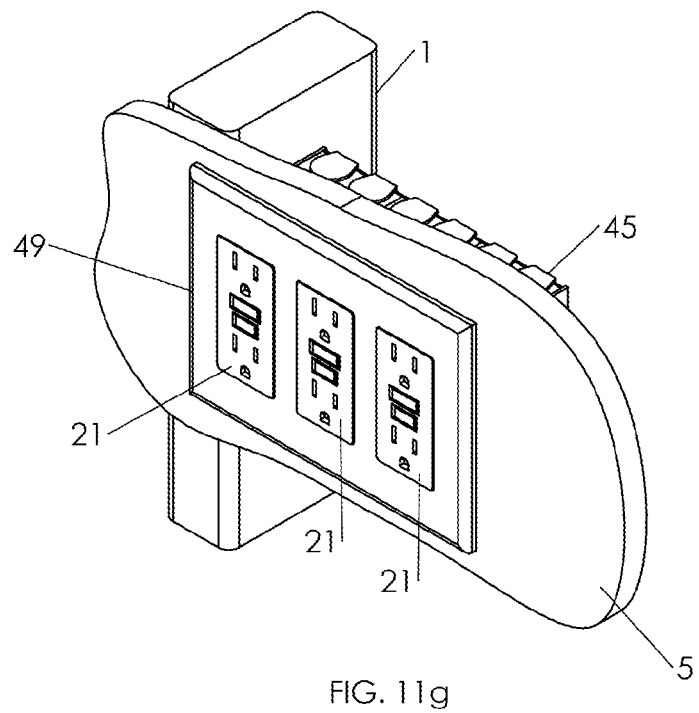

FIGS. 11a-11e illustrate device 21, in an alternate embodiment of the snap-in device shown previously, mounted via fasteners 17 to conventional electrical box 3. Recesses 22 on either side in either side of device 21 receive resilient retainers 25 on cover plate 23, holding it in place. This arrangement permits direct mounting of a cover plate directly to a device without need for screws or attachment to the flange. A multigang arrangement is shown in FIGS. 11f-11g. Multigang cover plate 49 includes resilient retainers 25 that snap-on to recesses 22 on the sides of devices 21. Devices 21 snap-in to flange 47. Horizontal centering surfaces 57 of flange 47 index devices 21 to provide ideal spacing and easy installation of snap-on cover plate 49.

Figure 12A:
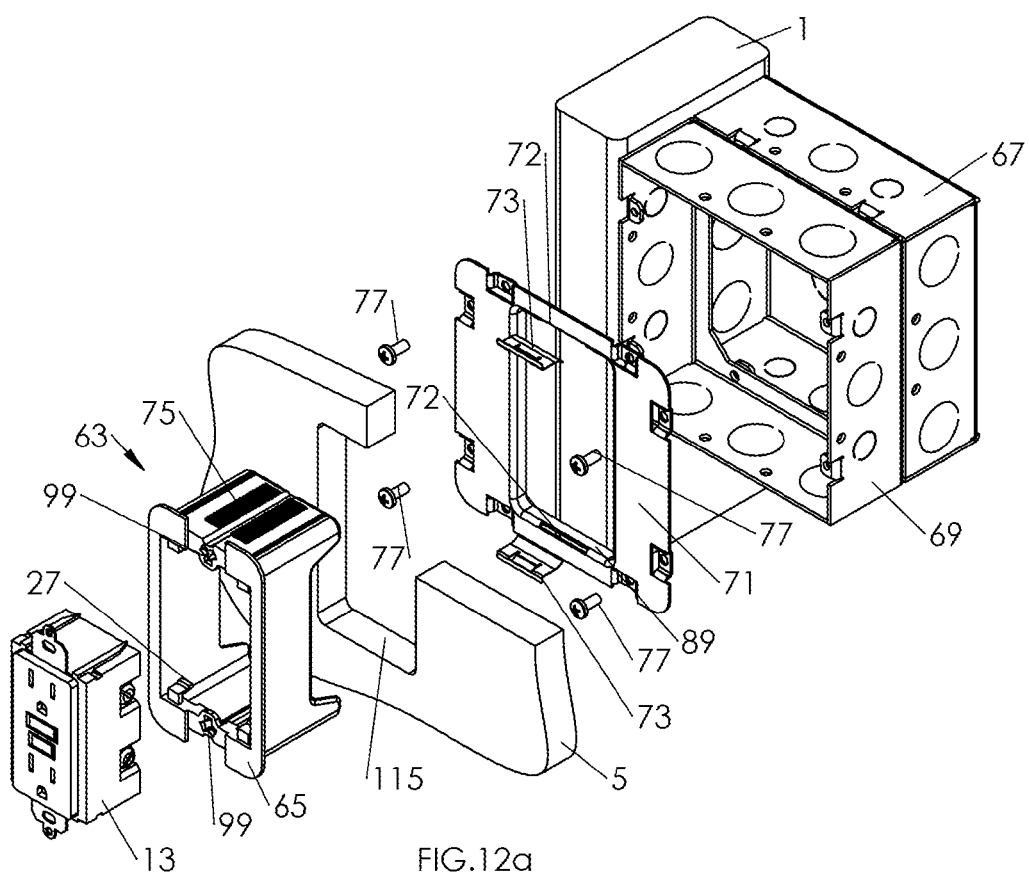
FIGS. 12a and 12b are exploded and assembled perspective views, respectively, of an alternative embodiment.
Figure 12B:
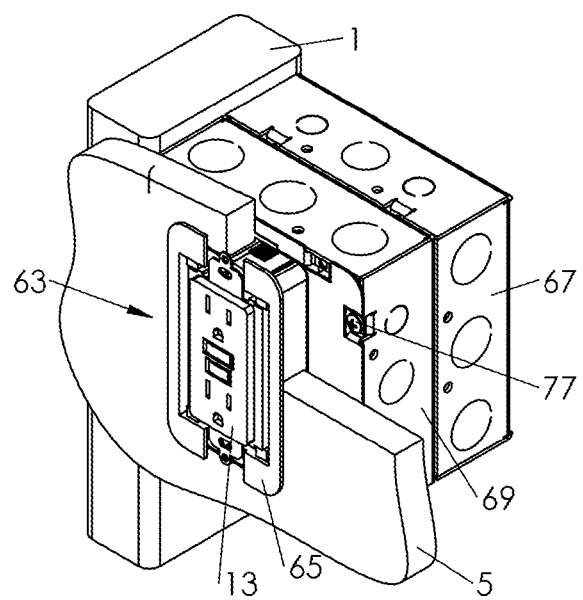
Figure 13A:
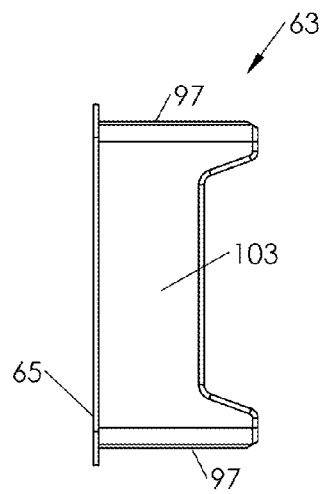
Figure 13B:
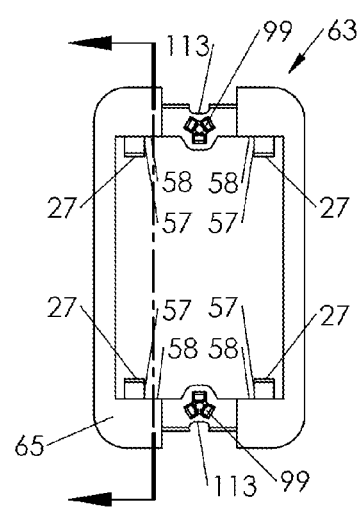
Figure 13C:
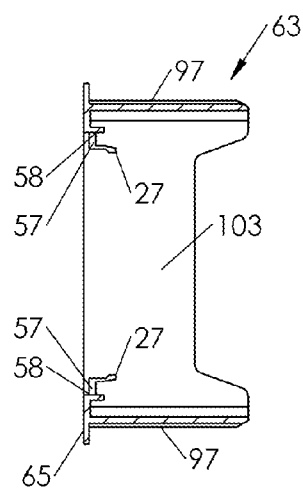
Figure 13D:
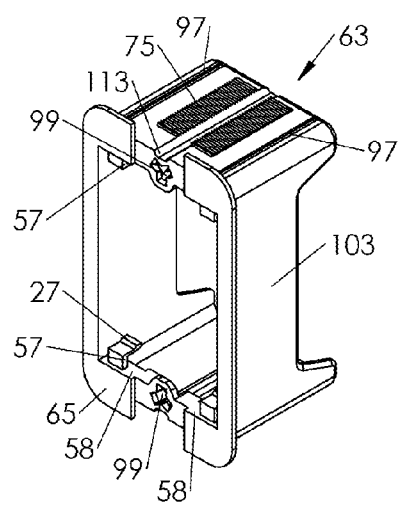
Figure 13E:
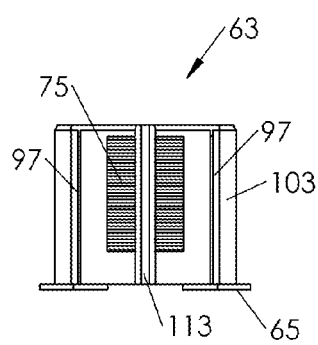

FIGS. 12a-12b illustrate an alternative assembly, similar in some respects to that disclosed in co-pending application Ser. No. 13/745,034 of the current inventors, identified above. Sleeve 63, having barbed teeth 75 along an extent of its outer surface, can be mounted in flange collar 71. As illustrated, flange collar 71 is attached by screws 77 to electrical box extension 69 mounted on electrical box 67. The box structure is mounted on stud 1. Sprung retainers 73 extend from on the top and bottom of the inner periphery of flange collar 71 to engage teeth 75 on the top and bottom outer surfaces of sleeve 63. Sleeve 63 has internal ratchet threads 99 to receive mounting screws for accommodating installation of a conventional device.

Snap-in device 13 snaps into retainers 27 of sleeve 63, illustrated in FIGS. 12a-12b. Wall substrate 5, illustrated as drywall, contains hole 115 that provides access to the roughed in box assembly 67 and 69, and flange collar 71. Cutting of the drywall is achieved by running a rotating drywall cutting tool with a guide tip tool along internal perimeter flange 89 of flange collar 71. Retainers 73, which may be made of spring steel, can be inserted through slits 72 on flange collar 71. The retainers are sufficiently recessed beyond internal perimeter flange 89 to prevent the cutting tool from contacting them. Flange collar 71 can be mounted 90 degrees to the shown orientation if a horizontally oriented device is desired.

As shown in FIGS. 13a-13e, a single gang sleeve 63 includes perimeter wall 103 that completely encloses the device and electrical connections of the installations regardless of the thickness of the wall substrate. For example, the wall substrate may include drywall with additional cladding, such as tile. Such enclosure meets electrical code requirements for line voltage installations. Flange 65 serves to apply pressure to the drywall on the front of the installation to effectively sandwich the drywall, resulting in a well secured installation. Ribs 97 serve to ensure that sleeve 63 remains centered vertically in flange collar 71. Removal slots 113 allow a removal tool such as a screwdriver to be inserted in order to flex sprung retainer 73 of flange collar 71 outwardly to disengage it from teeth 75, thereby permitting removal of sleeve 63 from flange collar 71. Horizontal centering surfaces 57 and vertical centering surfaces 58, serve to center snap-in device 13. Internal ratchet threads 99, have biased arms with a single thread which flex out of the way as an appropriately sized conventional threaded fastener is pushed in to full depth and tightened with a screwdriver. The bias secures the fastener until unscrewed. This internal ratchet thread feature can be used in conventional electrical boxes.

Figure 14A:
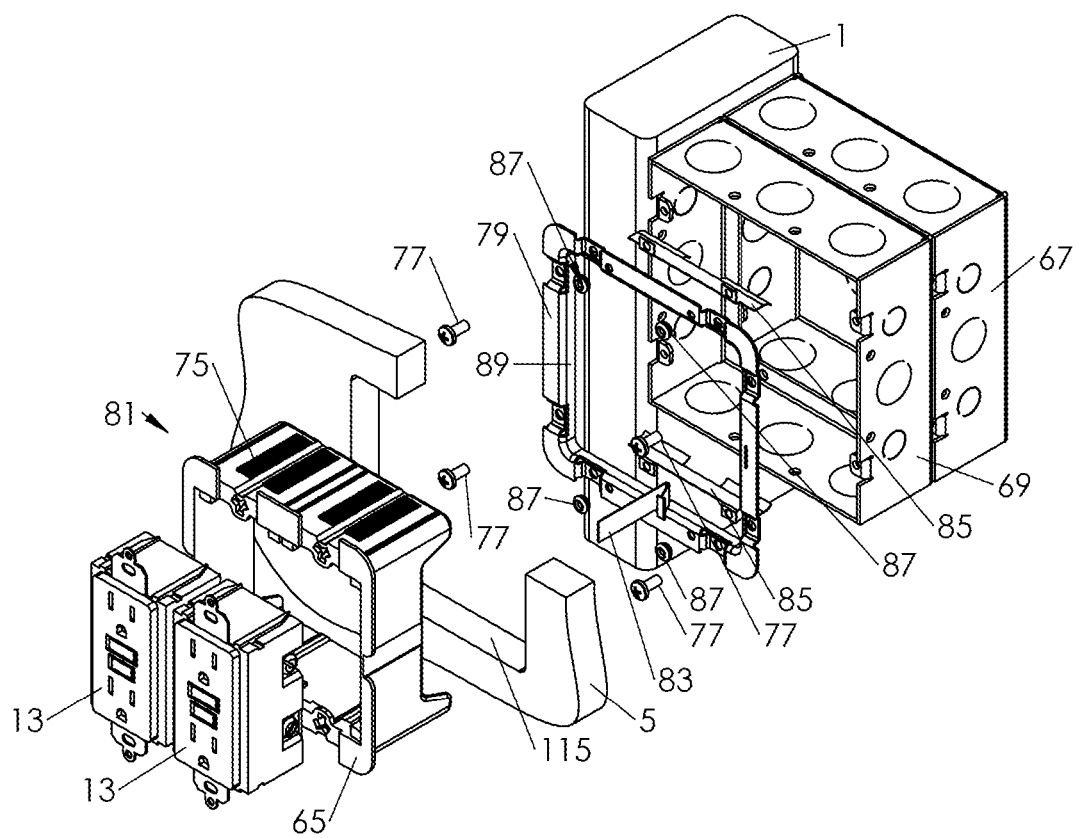
FIGS. 14a-14b are exploded and assembled perspective views of a two gang installation of the embodiment shown in FIGS. 12a-12b.
Figure 14B:
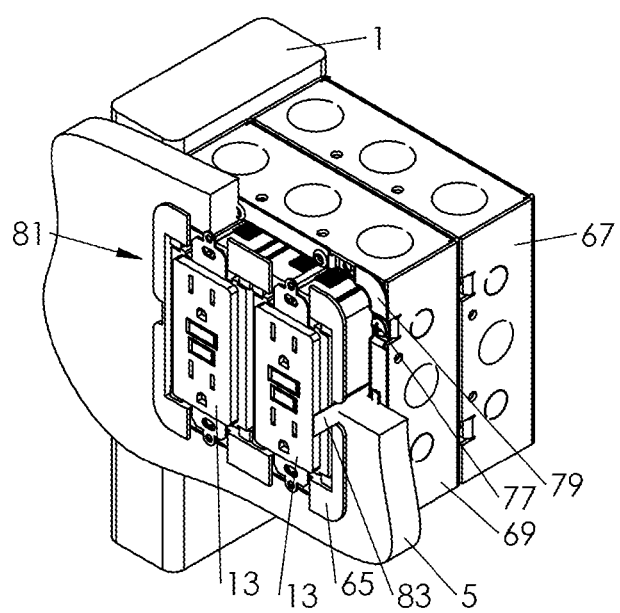
Figure 15A:
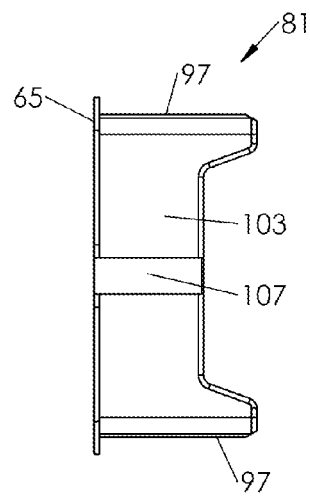
FIGS. 15a-15d are various detail views of the sleeve of FIGS. 14a-14b.
Figure 15B:
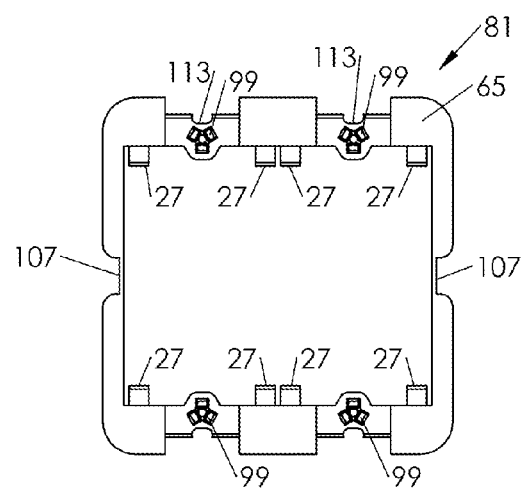
Figure 15C:
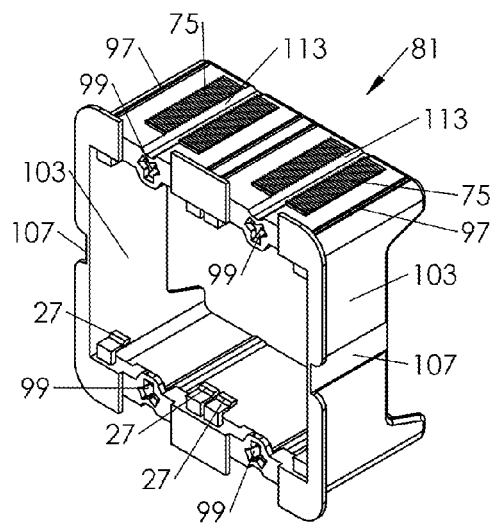
Figure 15D:
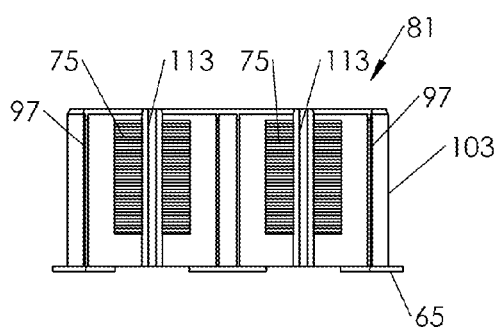
Figure 16A:
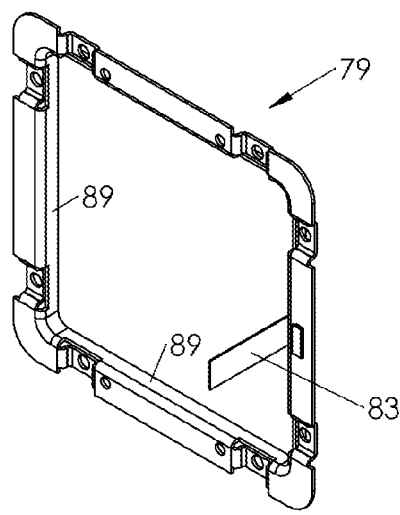
FIGS. 16a-16e are various detail views of the flange collar of FIGS. 14a-14b.
Figure 16B:
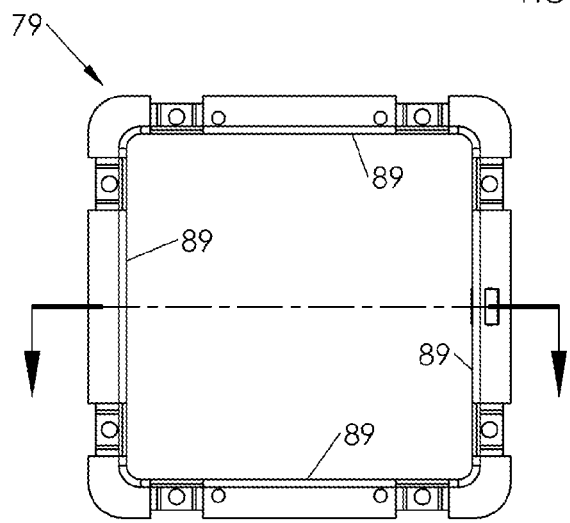
Figure 16C:
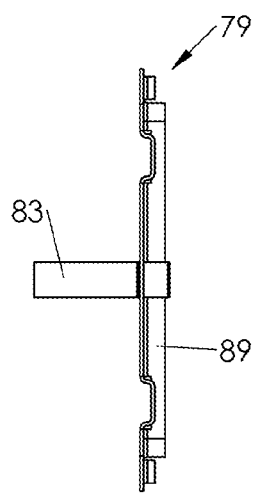
Figure 16D:
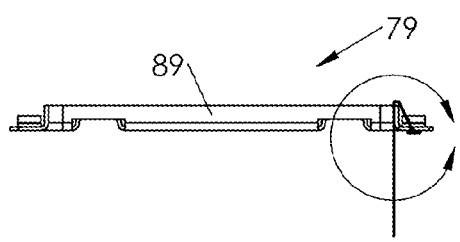
Figure 16E:
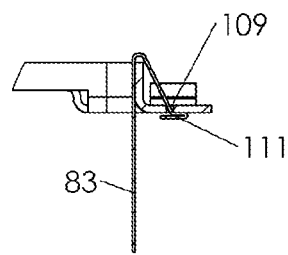

FIGS. 14a-14b illustrate a two gang embodiment of the assembly seen in FIGS. 13a-13e. Two gang collar 79 is screwed via fasteners 77 to electrical box extension 69 mounted on electrical box 67 and fixed to stud 1. Flange collar 79 has internal perimeter flange 89 that serves to provide a cutting jig for drywall hole 115. Sprung retainers 85 are fixed with rivets 87 to collar 79. Collar 79 has pull 83 made of flexible webbing. Collar 79 is oriented with pull 83 on the non-stud side of box extension 69. Pull 83 allows the installer to provide a counterforce on the unsupported side of the box when inserting sleeve 81 through hole 115 into collar 79 effectively sandwiching drywall 5 between collar 79 and flange 67 of sleeve 81. Sprung retainers 85 of collar 79 retain teeth 75 of collar 79. Pull 83 can be cut off after use or pushed back into the assembly or left hanging and concealed by a cover plate. Devices 13 snap into sleeve 81. Collar 79 can be mounted 90 degrees to the shown orientation if horizontally oriented devices are desired.

FIGS. 15a-15d illustrate two gang sleeve 81 with corresponding features to the one gang version shown in FIGS. 13a-13d. Recess 107 provides a space for pull 83 to pass though as sleeve 81 is inserted. FIGS. 16a-16e illustrate the two gang collar 79. Pull 83 can hang out of the way of the cutting tool to permit cutting around interior perimeter flange 89 without obstruction. Pull 83 has sewn hem 111 that acts as a stop as it passes through hole 109 in collar 79.

Figure 17A:
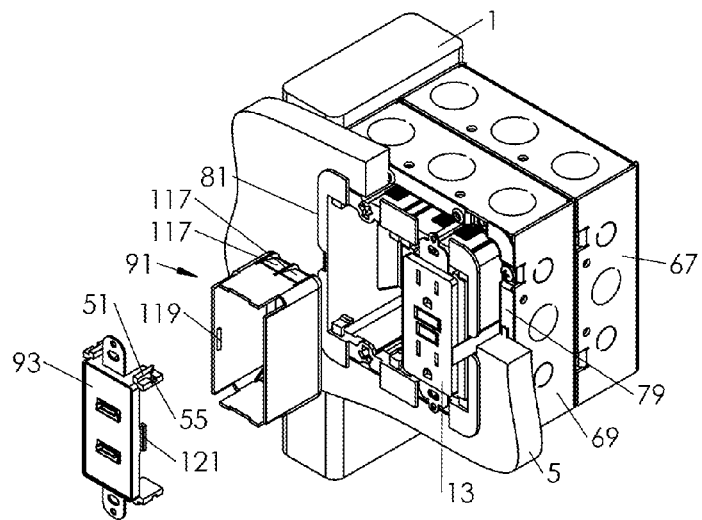
FIG. 17a is an exploded perspective view of a line voltage device and low voltage device installation.
Figure 17B:
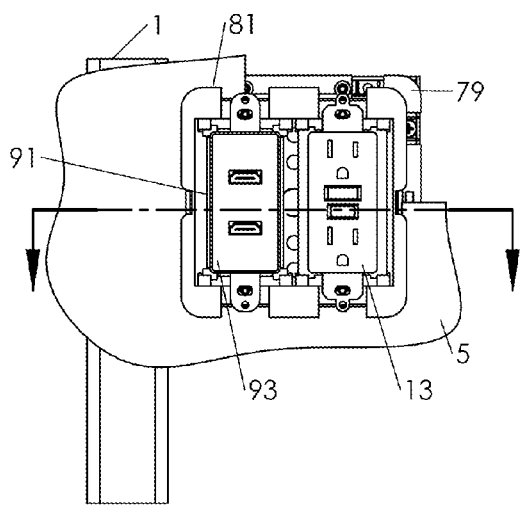
Figure 17C:
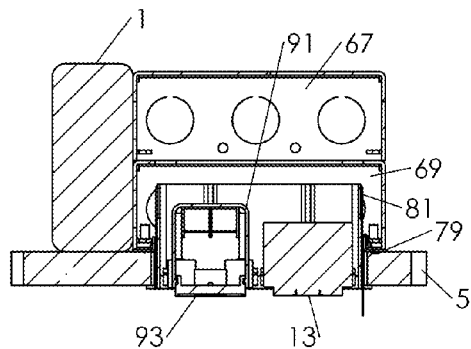
FIG. 17c is a section view taken from FIG. 17b.
Figure 18A:
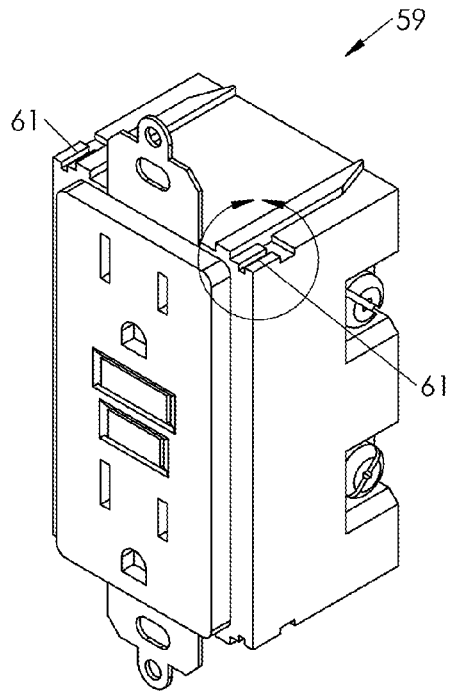
FIGS. 18a-18d are various detail views of the snap-in electrical device of FIGS. 17a-17c.
Figure 18B:
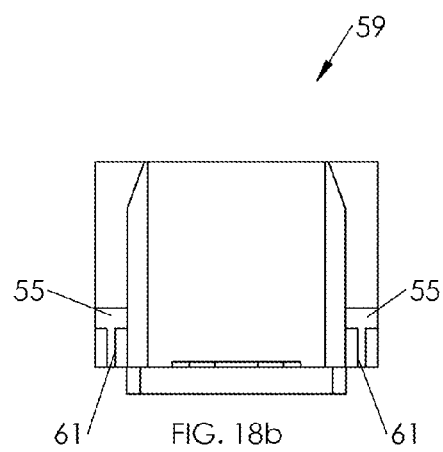
Figure 18C:
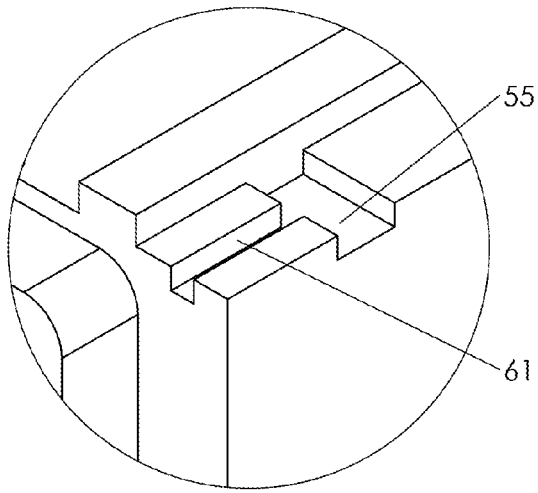
Figure 18D:
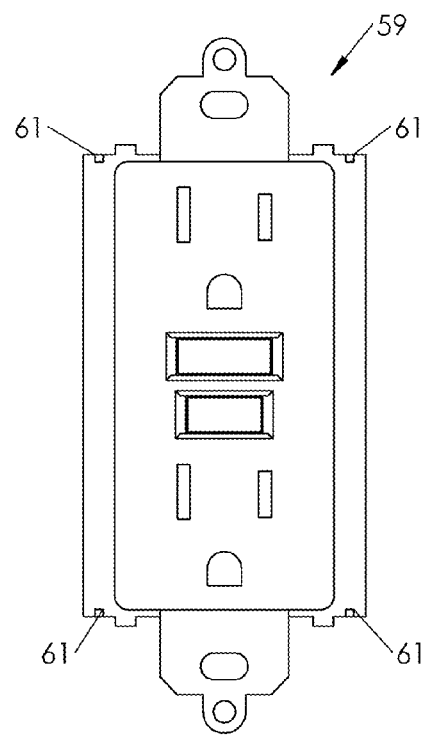
Figure 19A:
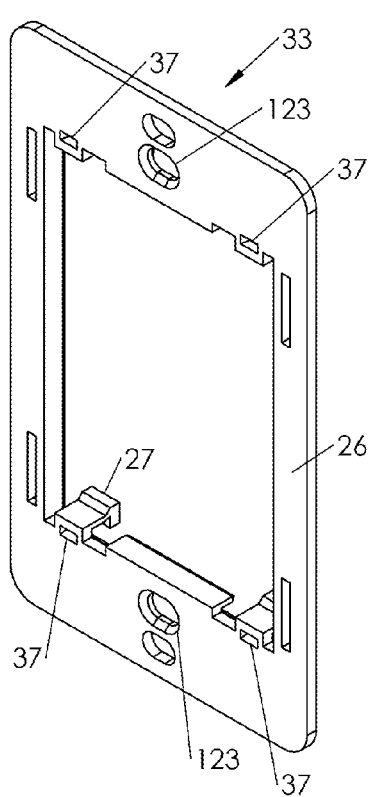
FIGS. 19a-19e are various detail views of the flange collar of FIGS. 17a-17c.
Figure 19B:
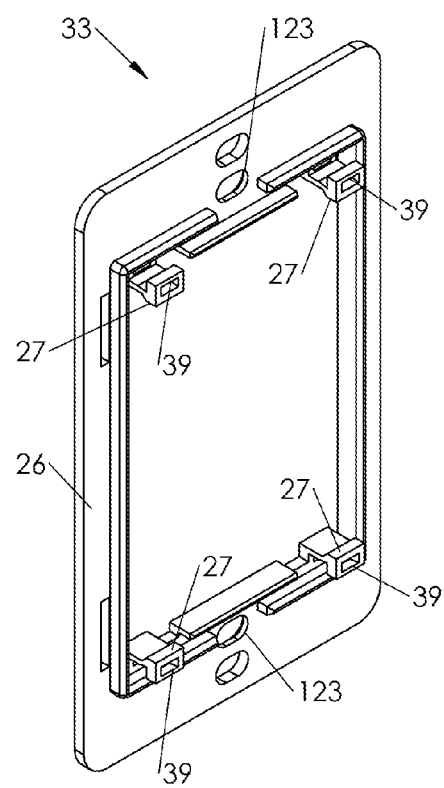
Figure 19C:
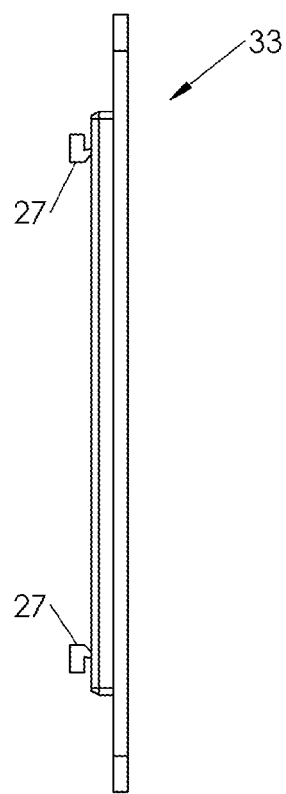
Figure 19D:
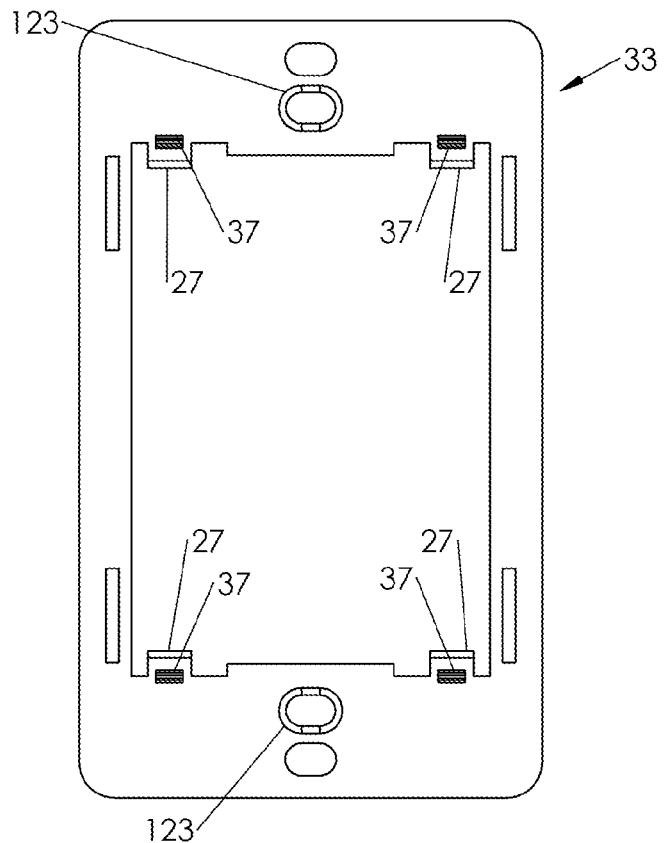
Figure 19E:
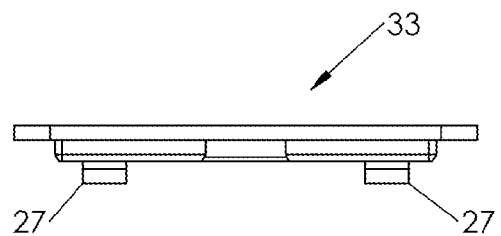

FIGS. 17a-17c illustrate an installation that accommodates mounting of low voltage device 93 and line voltage device 13 in the same sleeve 81, collar 79, and box assembly. Low voltage device 93 includes isolation box 91 that ensures that the differing voltage wire connections, not shown, are isolated. isolation box 91 comprises resilient wire strain relief ports 117 on the top and bottom. Side recesses 119 receive barbed retainers 121 of low voltage device 93. This embodiment alleviates the need to install a dividing plate between differing voltage devices. Low voltage device 93 has snap-in features similar to those on the device in FIGS. 5a-5d, such as ribs 51 and recesses 55. Although this embodiment is shown with novel sleeve 81 and collar 79, isolation box 91 can be used on a suitable low voltage device in a conventional multigang electrical box installation.

Electrical device 59 of FIGS. 18a-18d is provided with an alternate means of removal from retainers 27 on flush flange 6 or sleeve 81. Slots 61 on device 59 can receive a slender tool, such as a screw driver or the like, to flex retainers 27 outward and disengage them from recesses 55 on device 59.

FIGS. 19a-19e illustrate a modification of flange 6 of FIGS. 3a-3e. Flange 33 comprises an alternate device removal feature. Four removal access holes 37 on flange 33 provide access to hole 39 on the outboard side of sprung retainer 27. A screwdriver or the like can be inserted through hole 37 to hole 39 and used to pry sprung retainer from device recesses 55, thereby allowing device 13 to be removed. Countersunk slots 123 allow flush flange 33 to be mounted and adjusted angularly on the box.

Figure 20A:
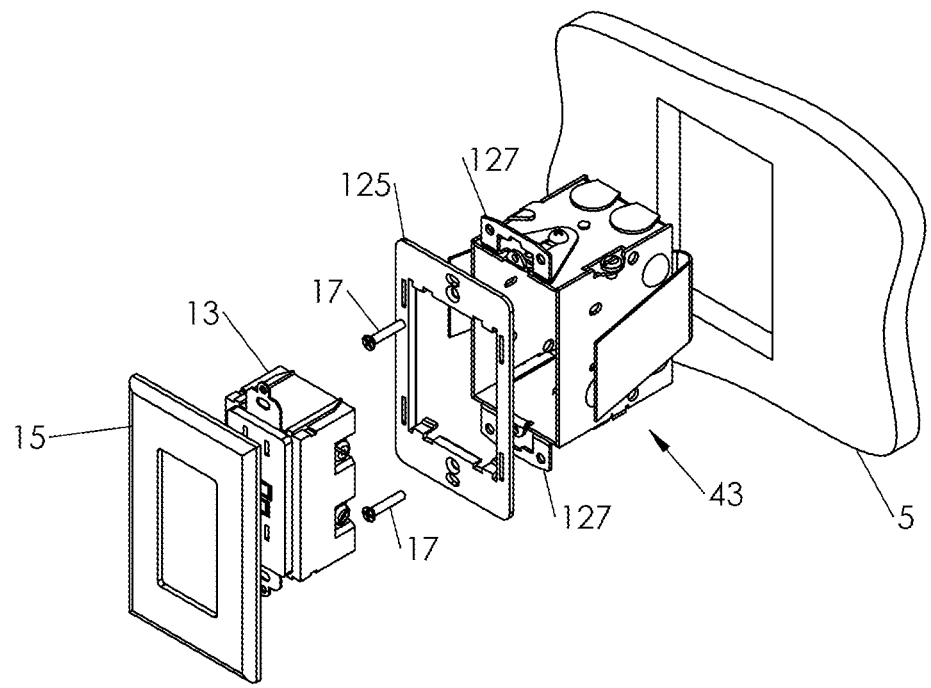
FIGS. 20a-20b are exploded and assembled perspective views, respectively, of the embodiment of FIG. 1 employable in an existing wall.
Figure 20B:
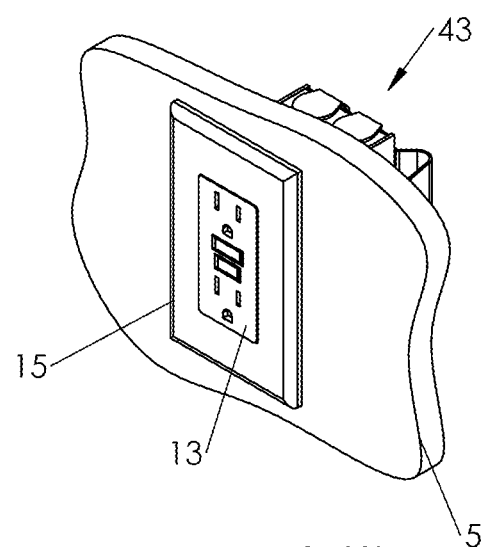

FIGS. 20a-20b illustrate application of the concepts of this disclosure to installation of the embodiment of FIGS. 4a-4e in a pre-existing wall. Conventional rework box 43 can be coupled to flange 125 to facilitate snap-in of the device 13 and cover plate 15. Perimeter ribs 35 on the top and bottom of the flange 125 have been shortened to accommodate rework box ears 127 on the front side of drywall 5.

Figure 21A:
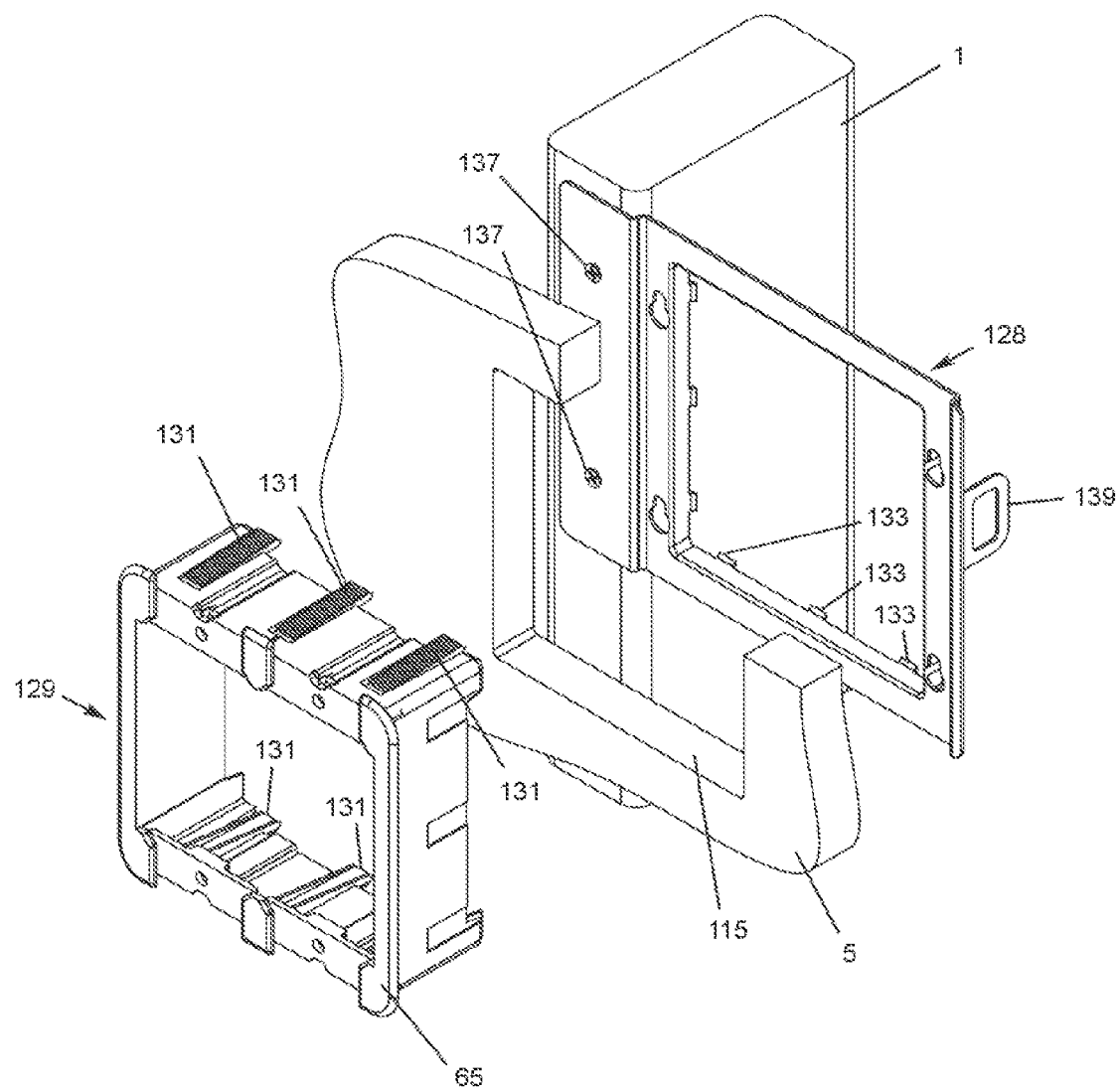
FIGS. 21a-21g exemplify an embodiment illustrating a stud mounted bracket behind drywall with a matching sleeve for installation of low voltage devices.

As shown in FIG. 21a, bracket 128 can be mounted to wall stud 1 with fasteners 137. Thereafter, drywall 5 can be installed to the wall studs. Opening 115 in drywall 5 can then be cut as described in more detail below with respect to FIGS. 28a-28d. Bracket 128 and sleeve 129 are sized to accommodate a plurality of low voltage devices. Although any number of devices may be utilized, for purposes of illustration, a two gang bracket 128 and sleeve 129 are exemplified. Sleeve 129 can be pushed through wall opening 115 and bracket 128 until sleeve flange 65 contacts drywall 5. Resilient cantilevered teeth 131 on sleeve 129 slide within bracket 128 to engage horizontal barbed retainers 133 integral with the bracket at the top and bottom thereof to secure sleeve 129 in position as illustrated in the detail view of FIG. 21e. Rung 139 allows an installer to insert a hand or tool to restrain bracket 128 while sleeve 129 is being pushed into position.

Figure 21B:
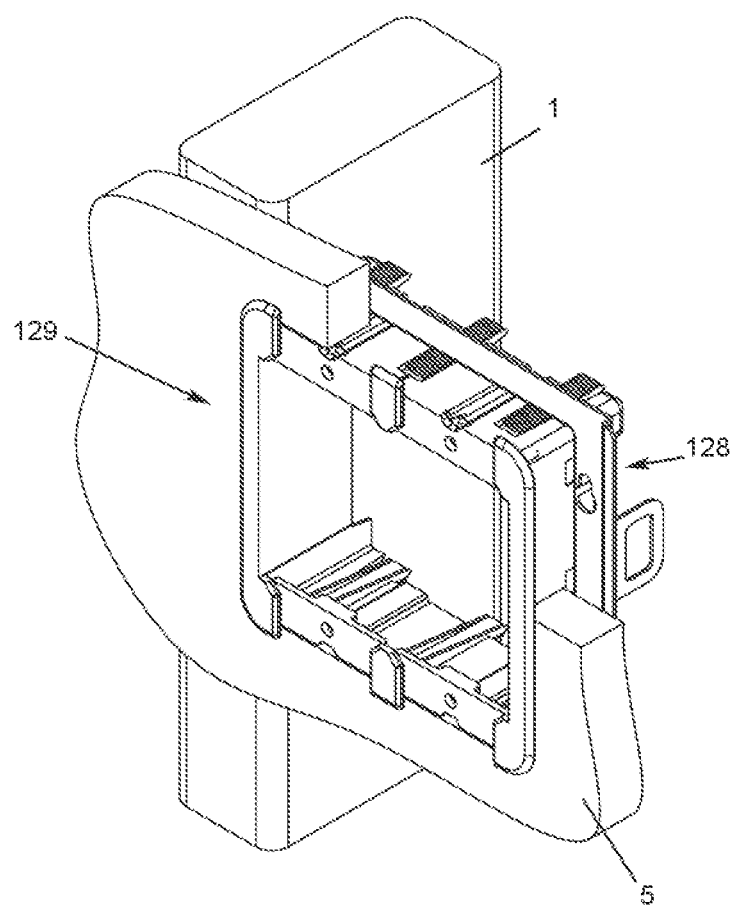
Figure 21C:
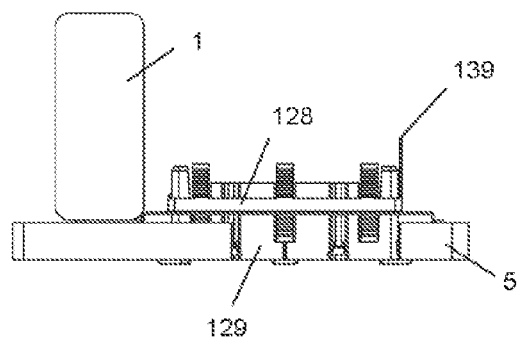
Figure 21D:
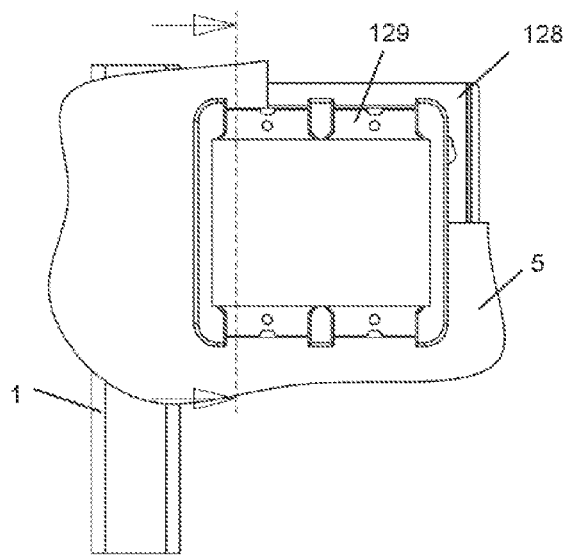
Figure 21E:
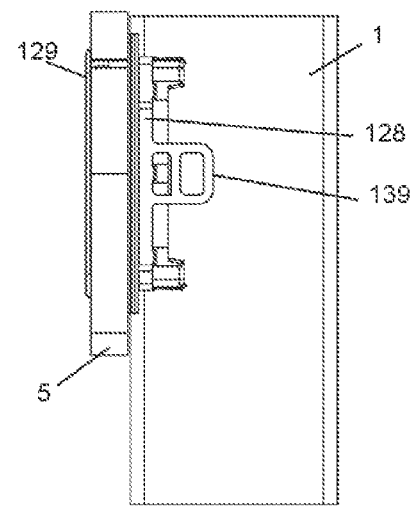
Figure 21F:
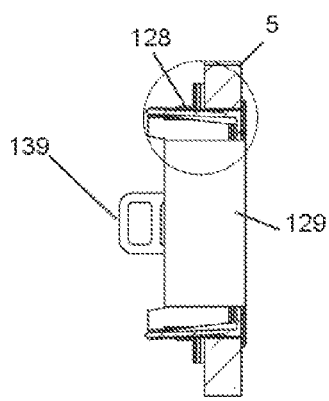
Figure 21G:
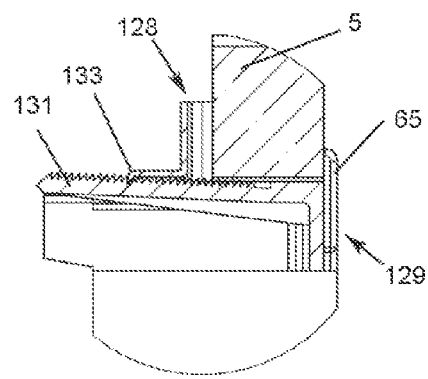

The assembled arrangement is shown in FIGS. 21b-21d. In the illustrated arrangement, two low voltage devices may be retained in vertical orientation with respect to the wall. The length of resilient cantilevered teeth 133 may be dimensioned to accommodate any wall substrate thickness. Sleeve 129 can be removed by hand by flexing the resilient cantilevered teeth away from barbed retainers 133.

Figure 22A:
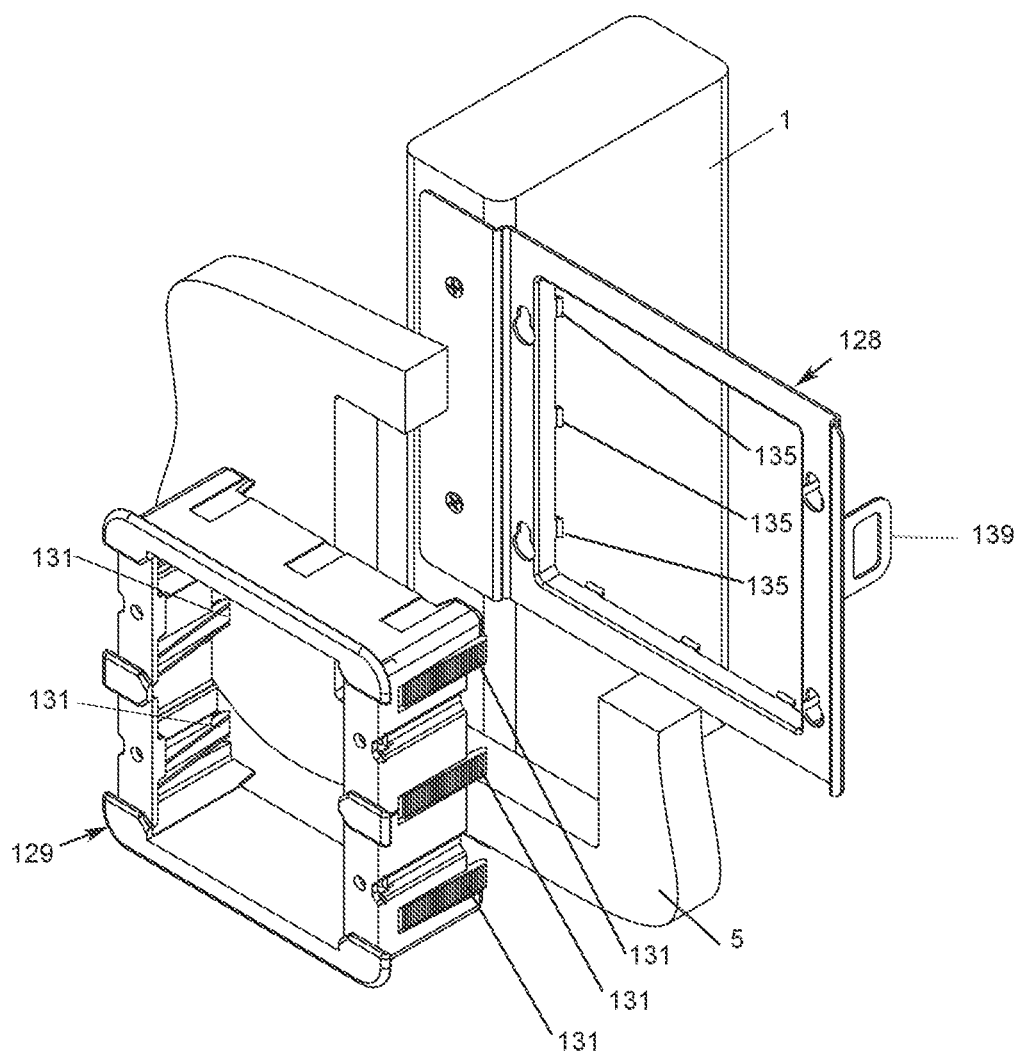
FIGS. 22a-22b illustrate the embodiment of FIG. 21a-21g, oriented for horizontal device installation.
Figure 22B:
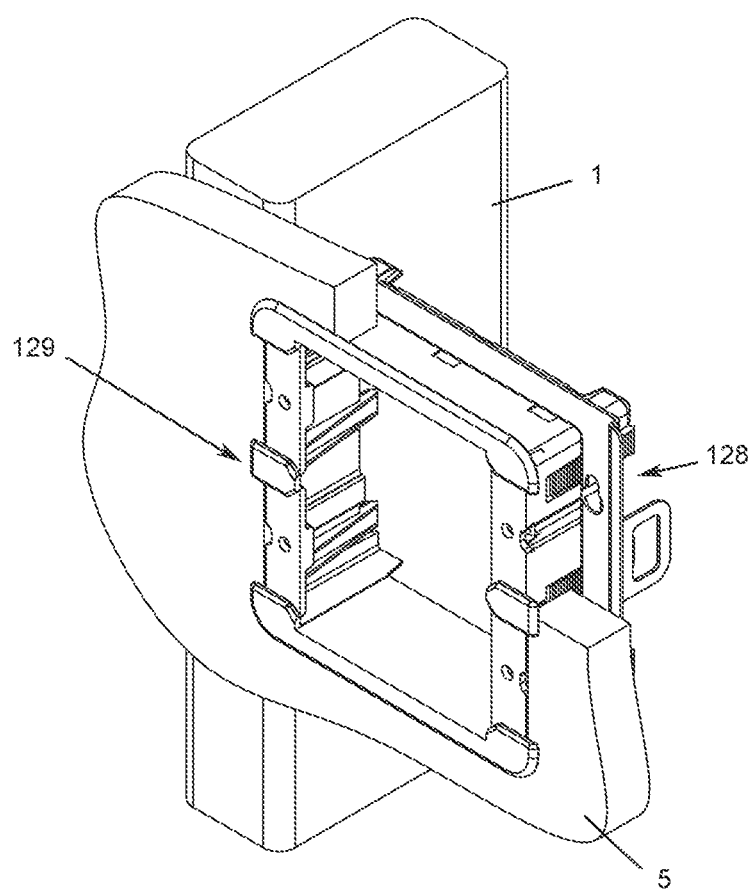

FIGS. 22a-22b exemplify bracket 128 mounted in the same manner as shown in FIGS. 21a-21g while sleeve 129 has been rotated 180 degrees to allow horizontal orientation of electrical devices. Resilient cantilevered teeth 131 slide beneath and engage vertical barbed retainers 135 on either side of bracket 128.

Figure 23A:
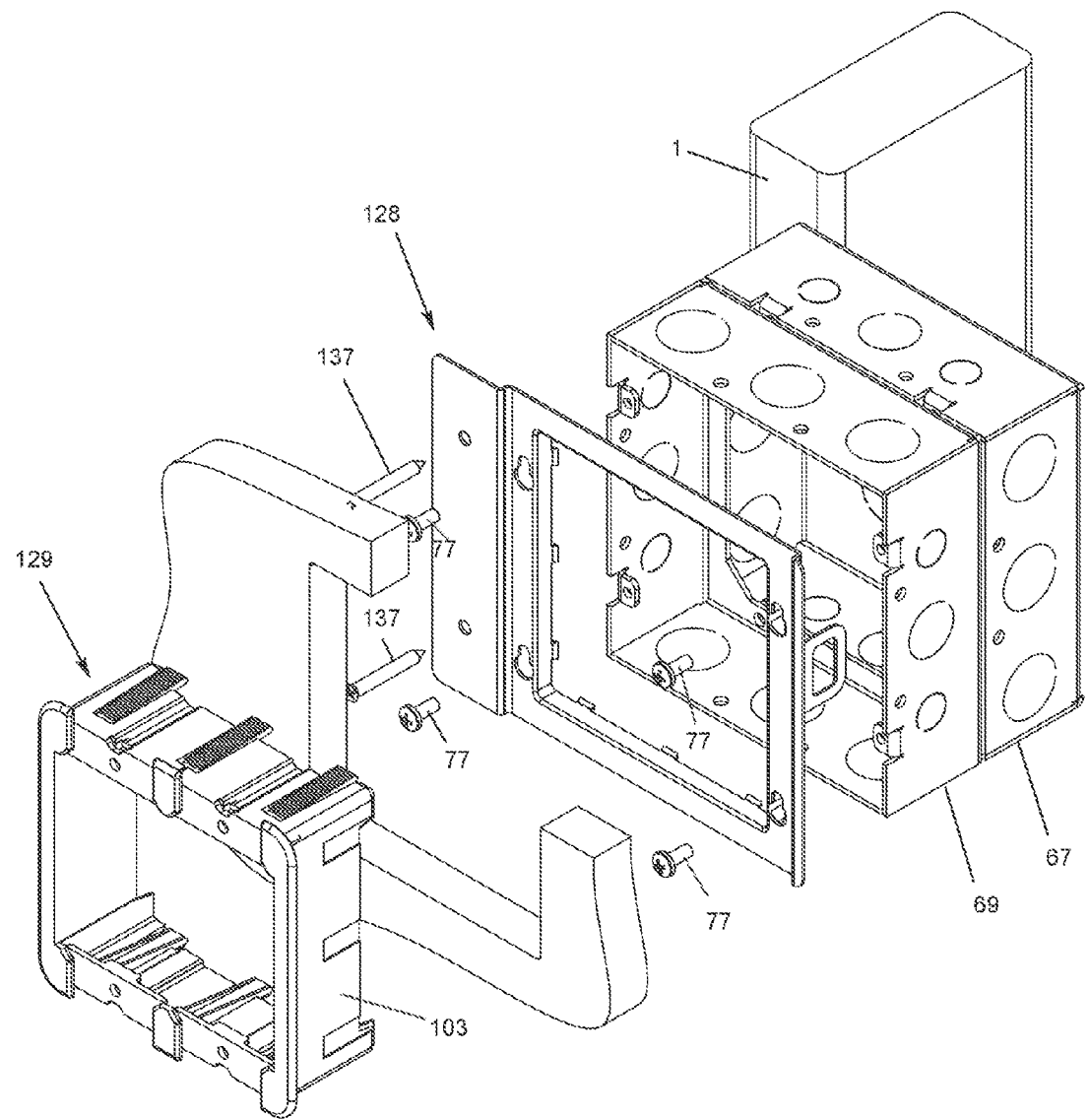
FIGS. 23a-23b illustrate the embodiment of FIGS. 22a-21g and FIGS. 22a-22b for use of line voltage devices.
Figure 23B:
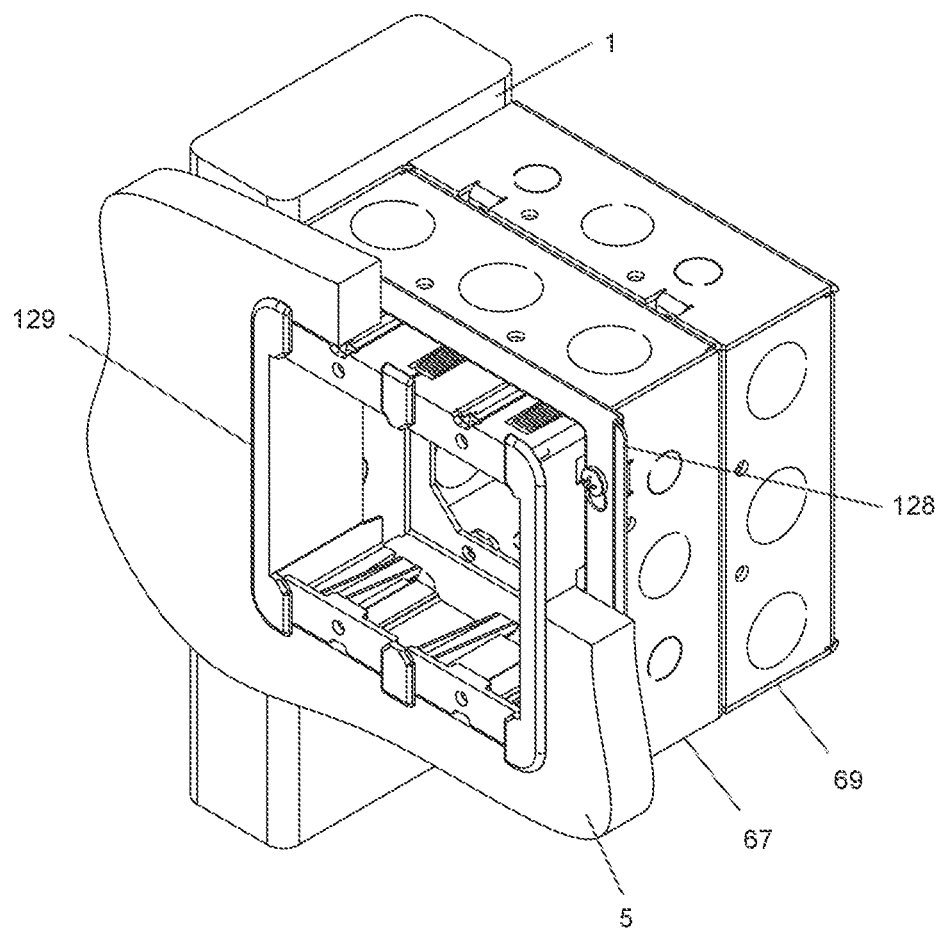
Figure 24A:
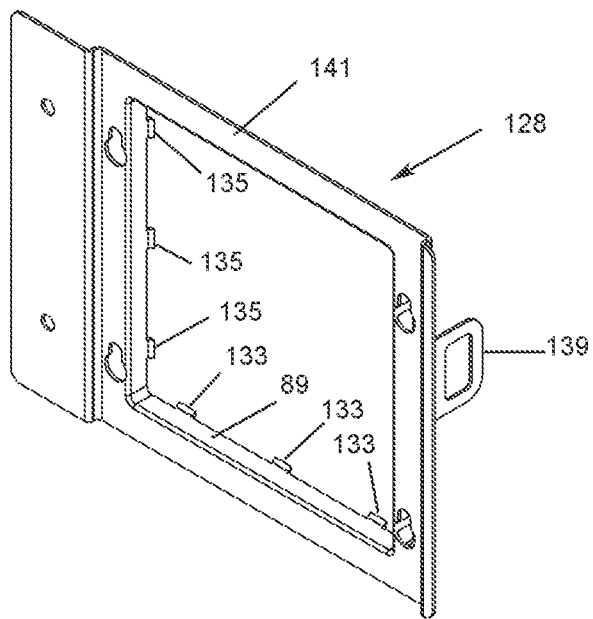
FIGS. 24a-24b are front and rear isometric views, respectively, of the bracket shown in FIGS. 21a-23b.
Figure 24B:
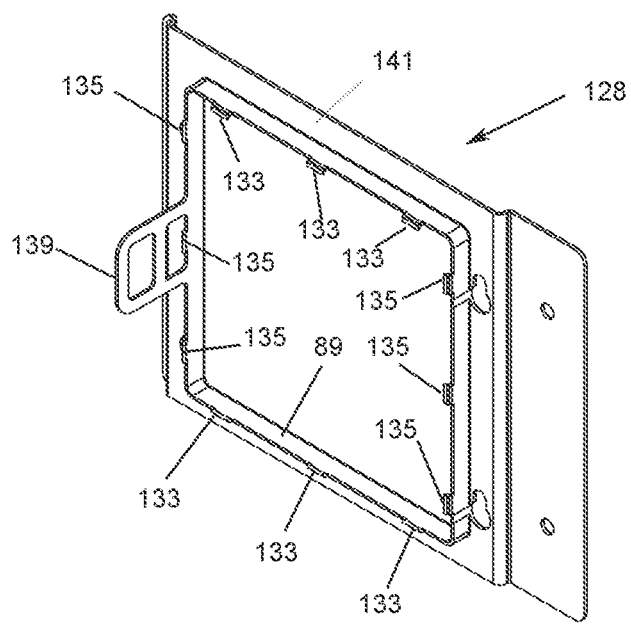
Figure 26A:
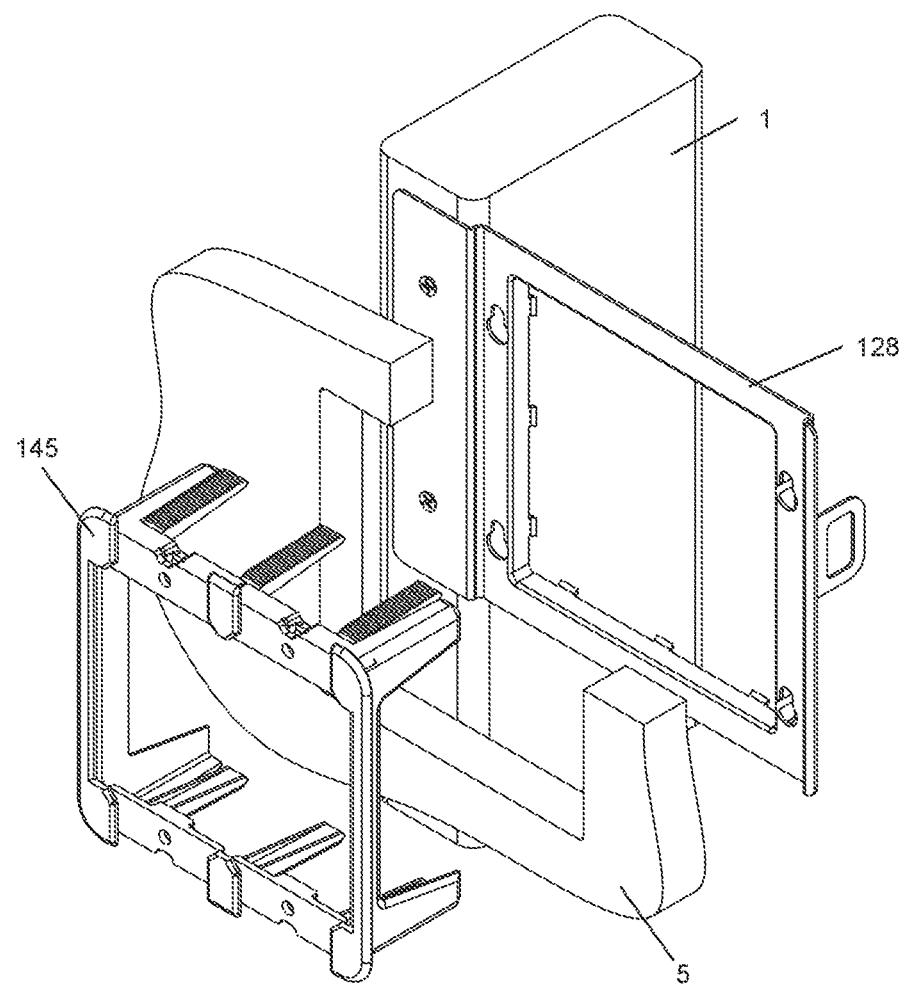
Figure 26B:
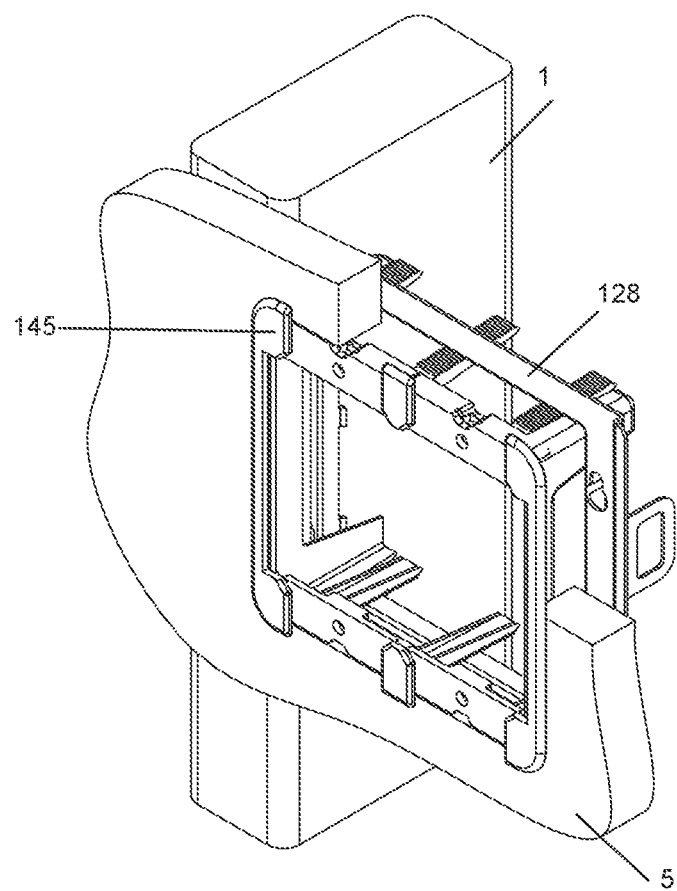

FIGS. 23a-23b show bracket 128 and sleeve 129 in combination with a conventional electrical box for accommodating line voltage devices. Box 67 and extension 69 can be fixed to bracket 128 by fasteners 77, the combination then mounted to stud 1 with fasteners 137. As box 67, extension 69 and perimeter wall 103 on sleeve 129 form an enclosure through the thickness of drywall 5, the installation is suitable for line voltage devices as required by electrical code.

FIGS. 24a-24e are more detailed illustrations of bracket 128. When bracket 128 is mounted to the wall stud, planar element 141 is recessed from the edge surface of the stud. Internal perimeter flange 89 extends rearwardly from planar element 141. Horizontal barbed retainers 133 and vertical barbed retainers 135 extend inwardly from internal perimeter flange 89. Rung 139 projects from the non-stud side of bracket 128.

FIGS. 25a-25d are more detailed illustrations of sleeve 129. Sleeve 129 is suitable for both low and line voltage device installations. Sleeve 129 comprises perimeter wall 103, front flange 65 and resilient cantilevered teeth 131. Holes 143 are provided for reception of device mounting screws. As shown in FIGS. 21a-23b, sleeve 129 is suitable for use in both low voltage device installations and line voltage device installations.

FIGS. 26a-26d exemplify an alternative assembly embodiment. The assembly differs from that of FIGS. 21a-25d with respect to low voltage sleeve 145. As seen in FIGS. 27a-27d sleeve 145 does not have a perimeter wall that would allow it to be used for line voltage device installation. Angle corner elements 147 align sleeve 145 vertically and horizontally within the internal perimeter 89 at the wall. Resilient cantilevered teeth 131 are retained by barbed retainer 133 of bracket 128.

The means of cutting the hole in the drywall 5 is shown in FIGS. 28a-28d illustrate a manner in which an installed bracket may be used to form the opening in the drywall 5. Rotating cutting tool 149 comprises cutting bit 153 and depth guide 151. Cutting bit 153 contains cutting flutes along its length except at guide tip 155. To form the opening, an access hole for cutting bit 153 may be drilled at any point within the inner periphery of the bracket, as illustrated in FIGS. 28a and 28b. After insertion of cutting bit 153, during cutting operation, guide tip 155 runs along internal perimeter flange 89 to define cutting path 157 in drywall 5. Depth guide 151 maintains the depth of cutting bit 153 through drywall 5 to ensure that guide tip 155 runs along internal perimeter flange and to maintain its height appropriate to avoid cutting barbed retainers 133 of bracket 128.

Figure 29A:
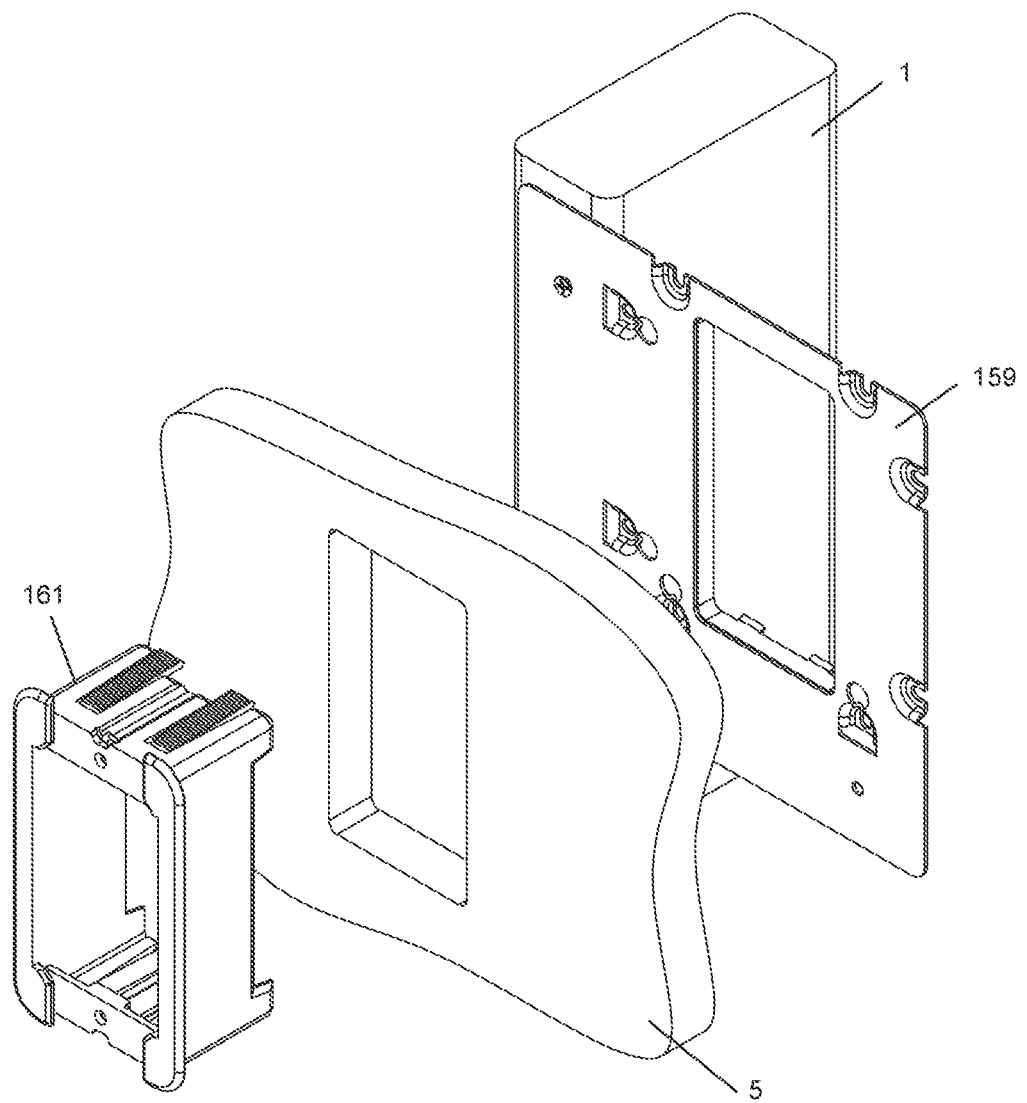
FIG. 29a is an exploded isometric view of a single gang installation corresponding to that shown in FIGS. 21a-21g.
Figure 29B:
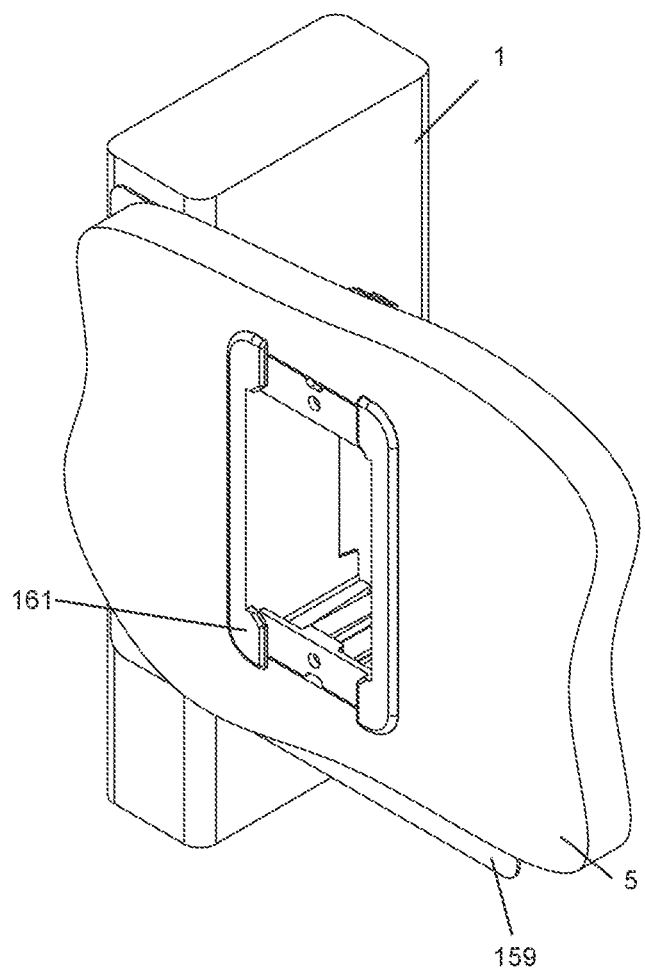
FIG. 29b is an isometric view of the installation shown in FIGS. 21a-21g.
Figure 30A:
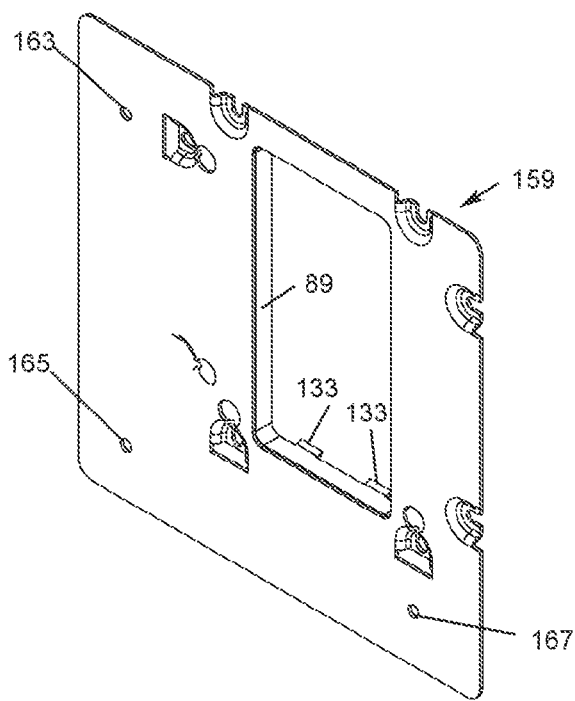
FIGS. 30a-30b are front and rear isometric views of the single gang bracket shown in FIGS. 29a-29b.
Figure 30B:
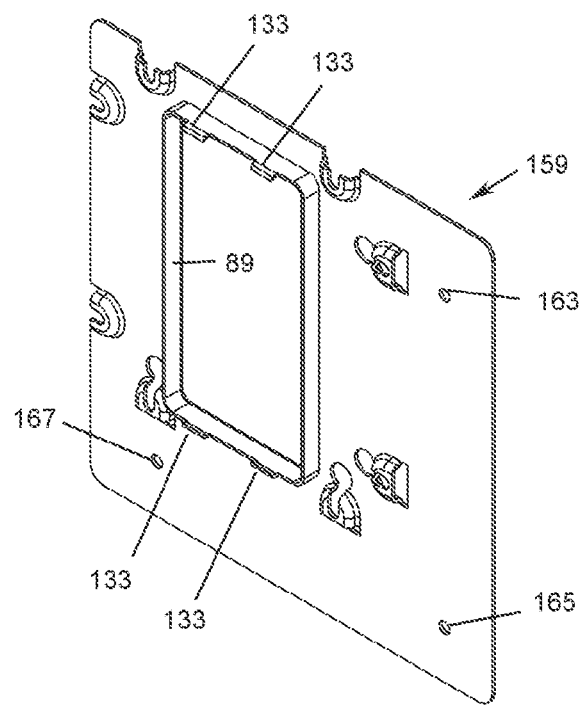
Figure 31A:
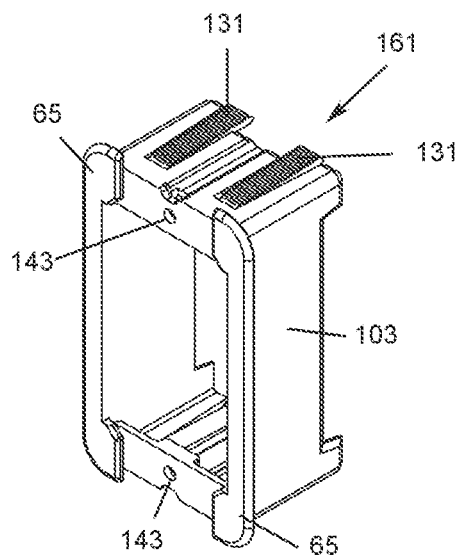
FIG. 31a is a front isometric view of the single gang sleeve used in FIGS. 29a-29b.
Figure 31B:
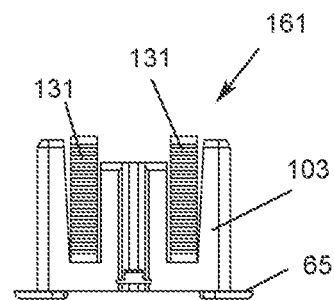
FIGS. 31b-31d are top, side and front views of the single gang sleeve shown in FIGS. 29a-29b.
Figure 31C:
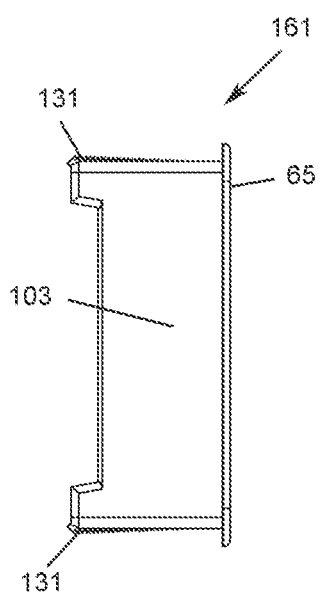
Figure 31D:
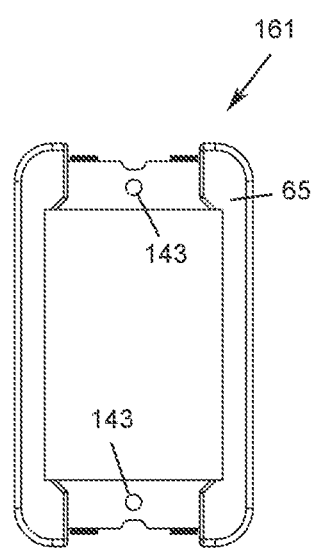
Figure 32A:
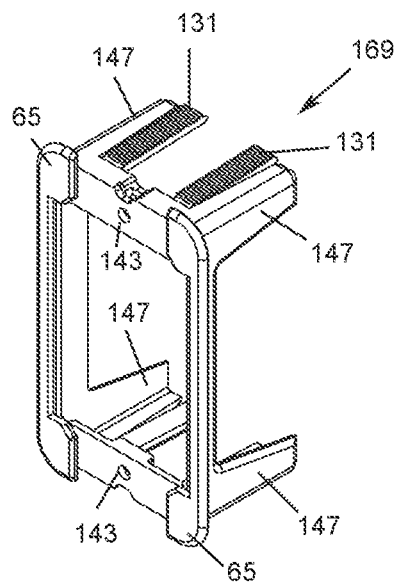
FIG. 32a is a front isometric view of a single gang sleeve embodiment only suitable for low voltage device installation.
Figure 32B:
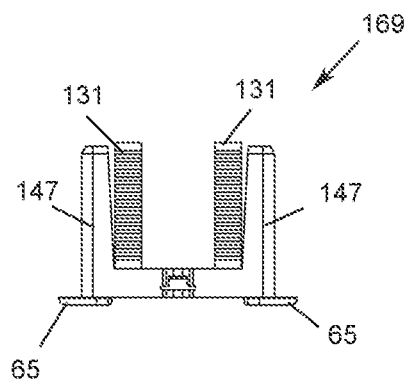
Figure 32C:
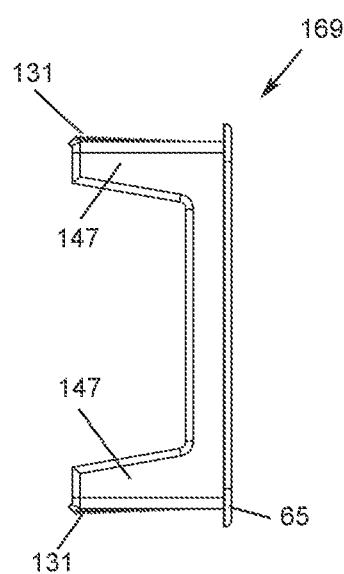
Figure 32D:
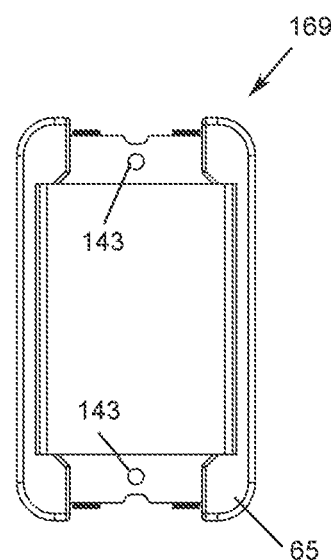
Figure 33A:
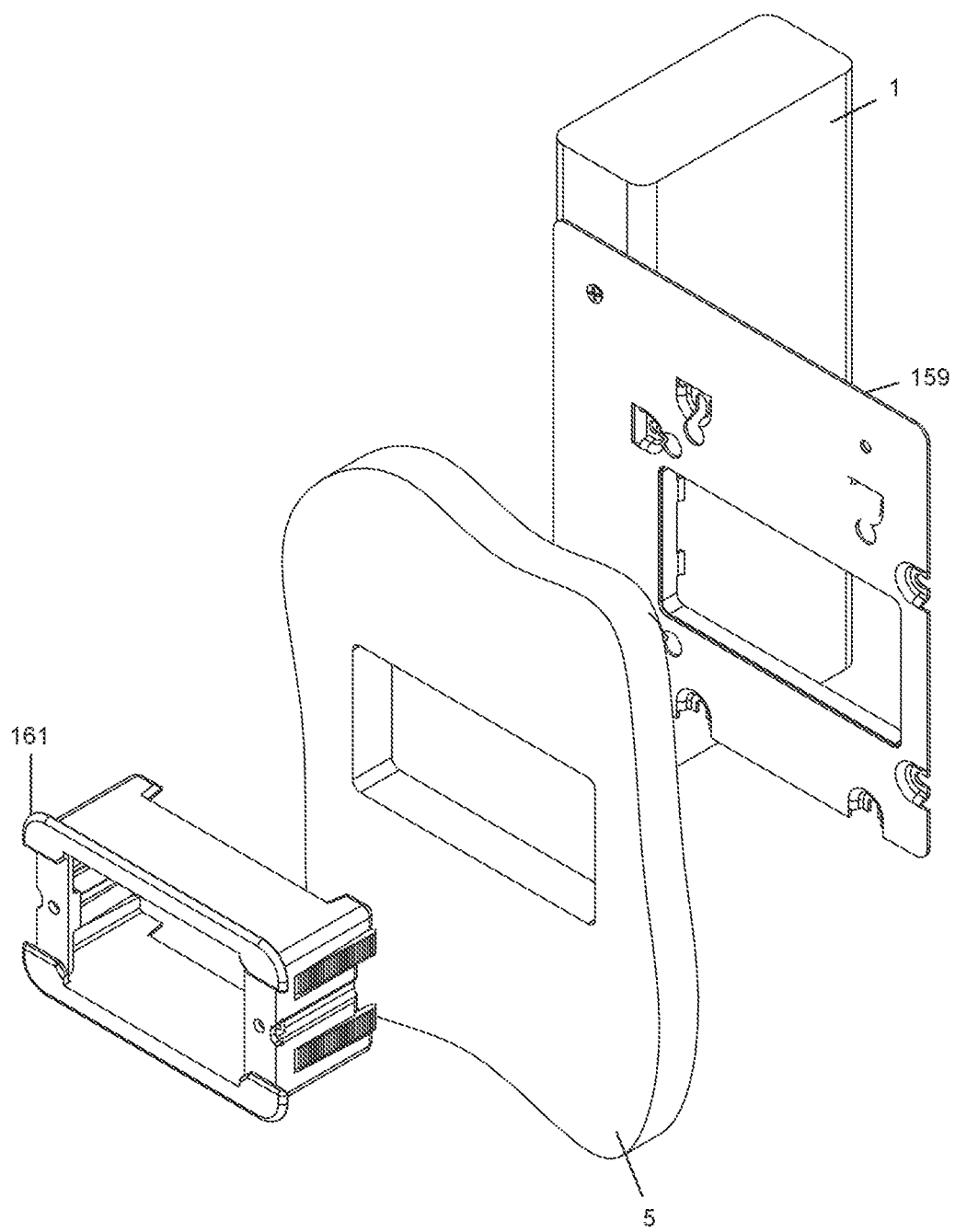
FIG. 33a is an exploded isometric view of the bracket and sleeve shown in FIGS. 29a-29b mounted for horizontal device installation.
Figure 33B:
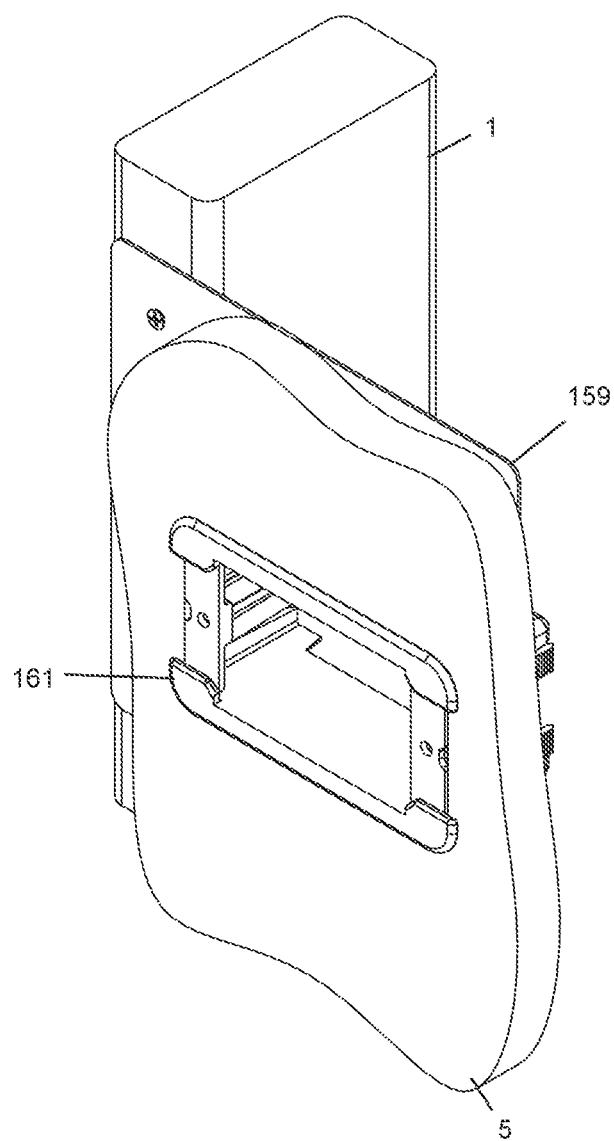
FIG. 33b is an isometric view of the bracket and sleeve shown in FIGS. 29a-29b mounted for horizontal device installation.

FIGS. 29a-29b illustrate a low voltage assembly corresponding to the assembly shown in FIGS. 21a-21g. As seen in FIG. 29a, single gang bracket 159 is mounted to stud 1 with single gang sleeve 161 inserted into bracket 159 through drywall 5. Single gang bracket 159 is shown in more detail in FIGS. 30a-30e. Flange 89 extends continuously at the inner perimeter of bracket 159. Barbed retainers 133 are situated at opposite sides of flange 89. Bracket 159 can be mounted to stud 1 in the vertical orientation via mounting holes 163 and 165. Bracket 159, alternatively, can be mounted in a horizontal orientation via mounting holes 165 and 167.

Figure 34A:
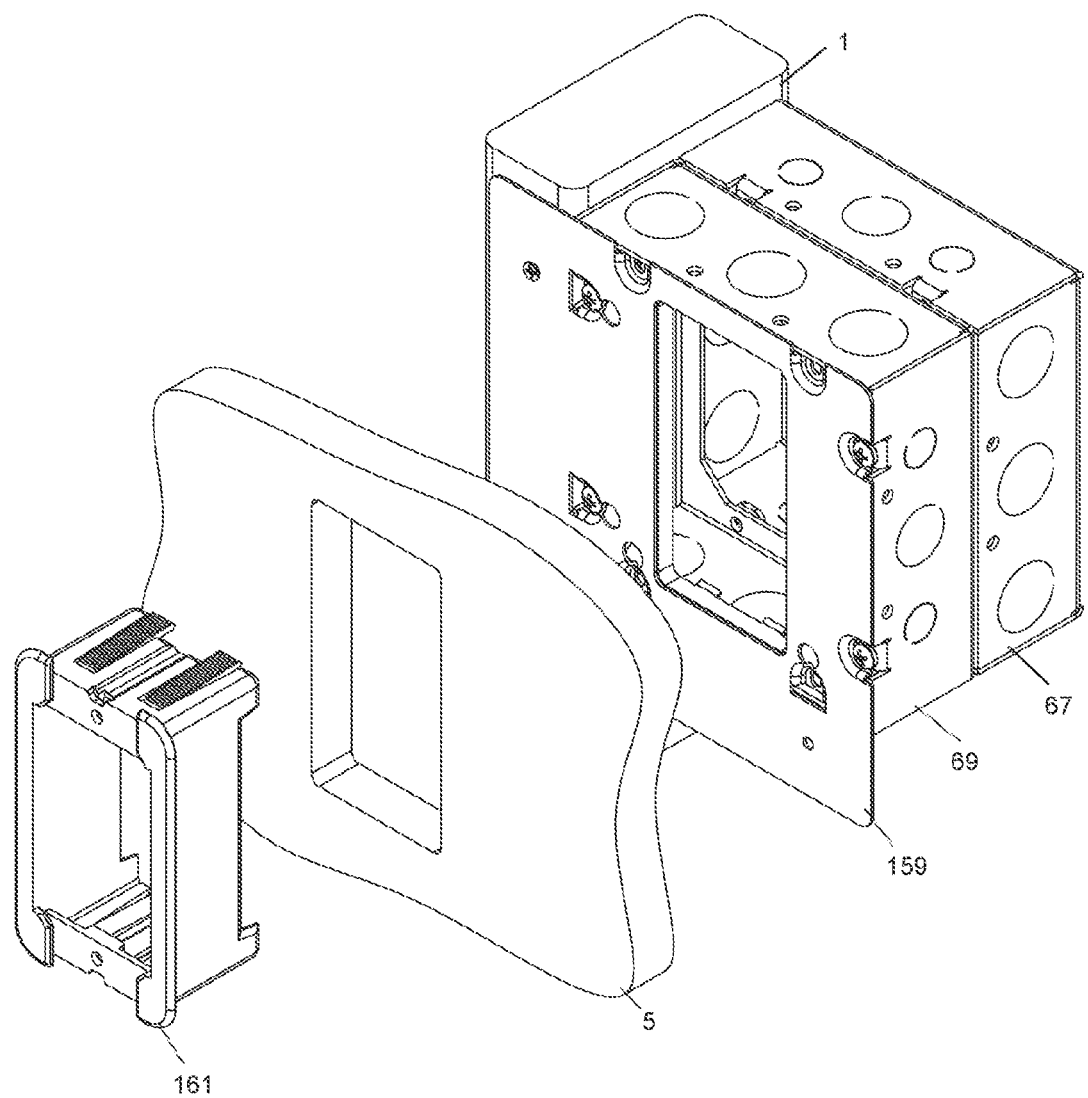
FIG. 34a is an exploded isometric view of the bracket and sleeve shown in FIGS. 29a-29b in combination with an electrical box.
Figure 34B:
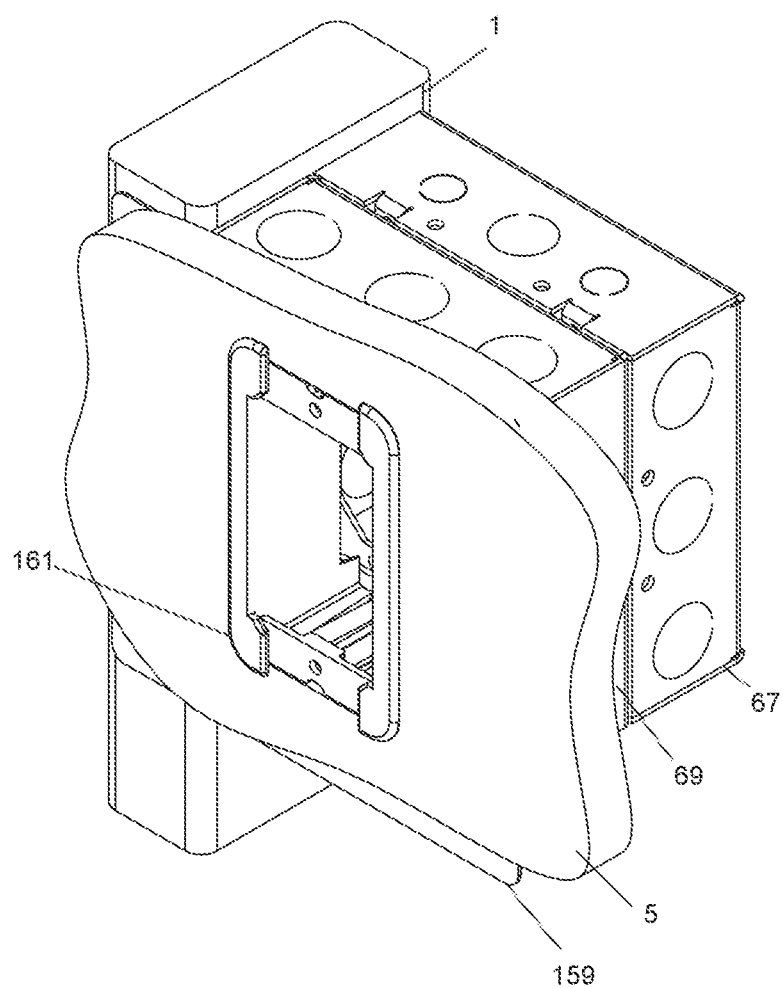

Similar to two gang sleeve 129, Single gang sleeve 161 is shown in more detail in FIGS. 31a-31d. Perimeter wall 103 is configured to accommodate a low voltage device installation or for alternative line voltage device installation in combination with the electrical box 67, shown in FIGS. 34a and 34b. Extension 67 may be added to provide additional box space. Sleeve 161 may be modified as shown in FIGS. 32a-32d for installation of only a low voltage device. Single gang low voltage sleeve 169, lacks perimeter wall 103 of sleeve 161.

Figure 35A:
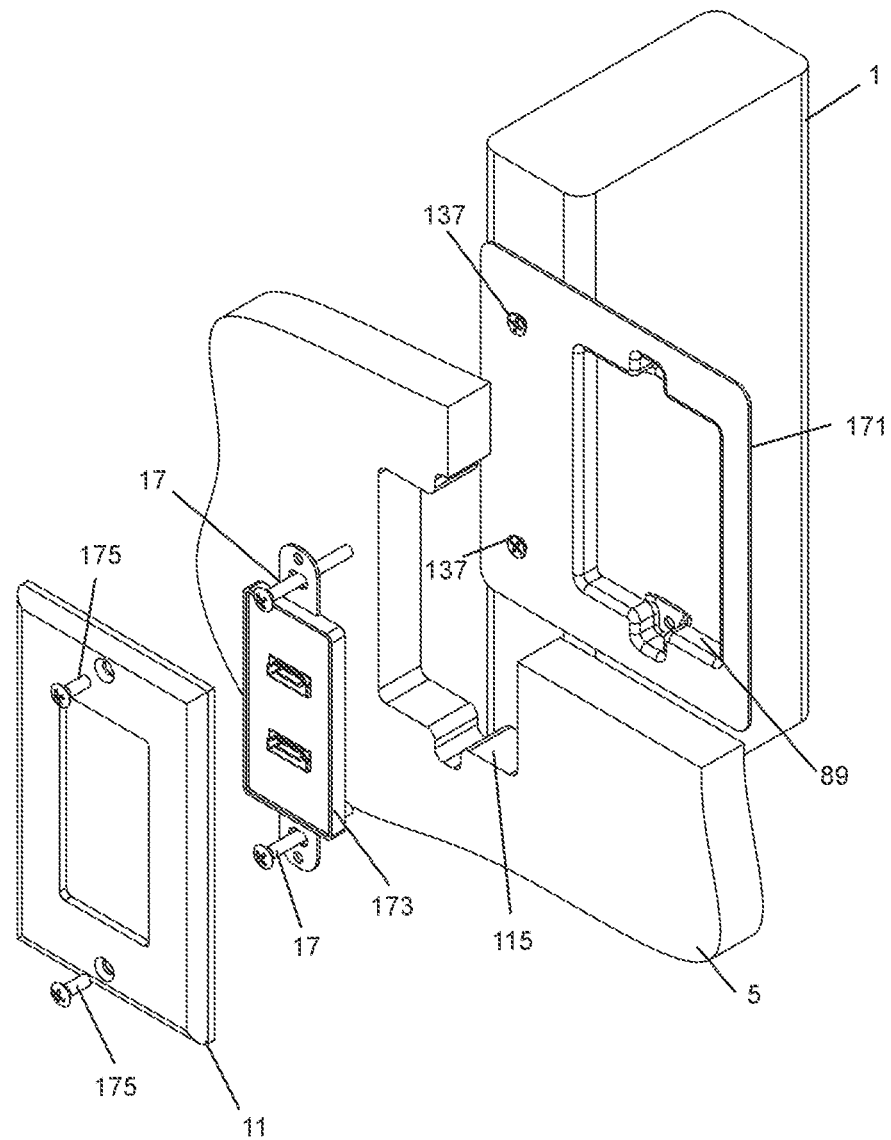
FIG. 35a is an exploded isometric view of a bracket mounted on a stud for installation of a low voltage device.
Figure 35B:
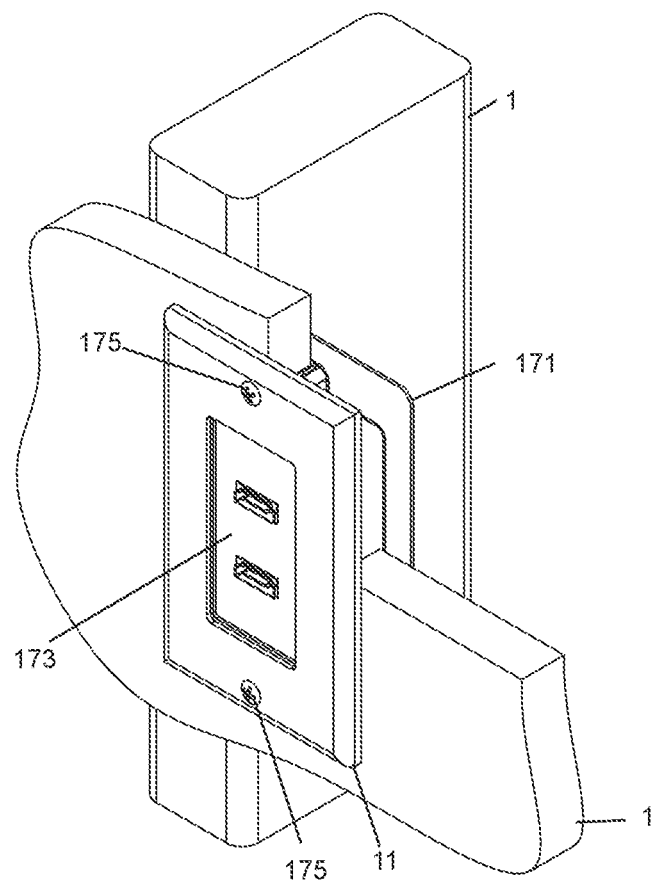
Figure 36A:
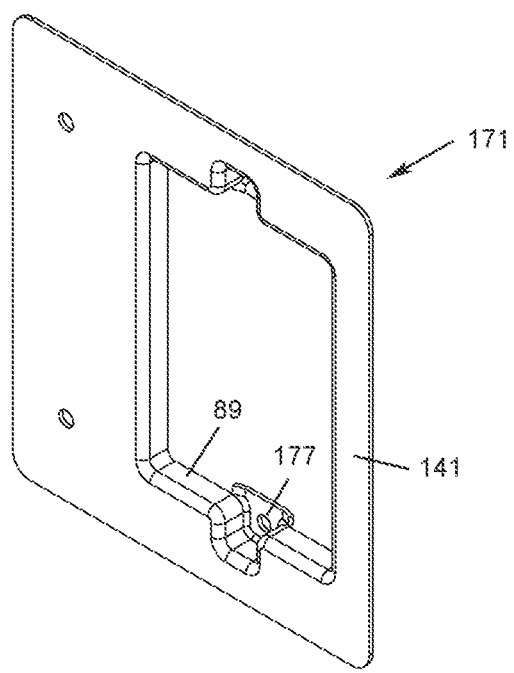
FIGS. 36a-36b are front and rear isometric views, respectively, of the bracket shown in FIGS. 35a-35b.
Figure 36B:
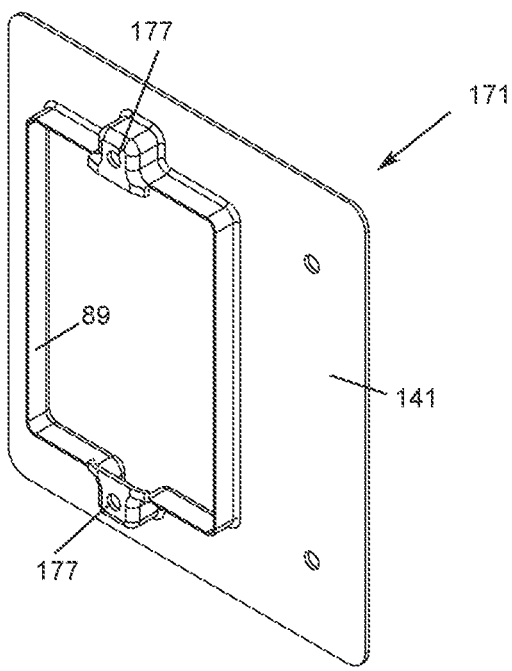
Figure 36C:
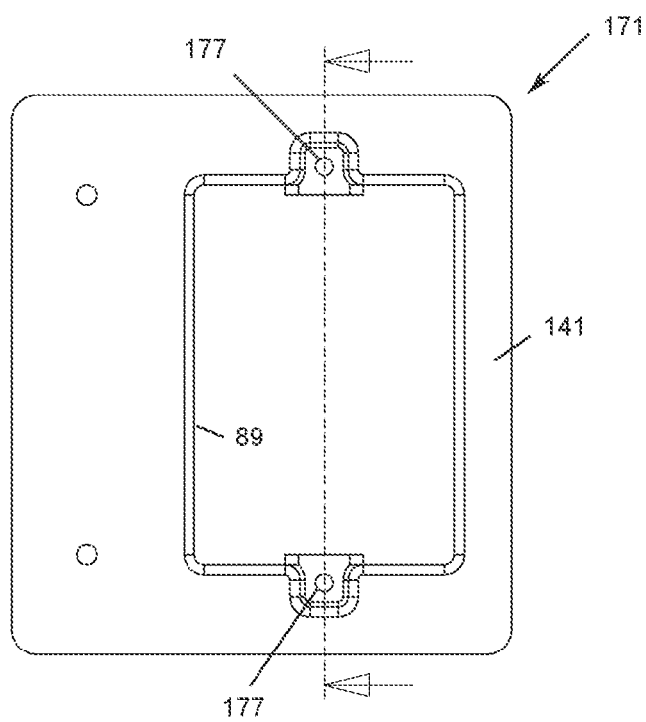
FIG. 36c is a side orthographic view of the bracket shown in FIGS. 35a-35b.
Figure 36D:
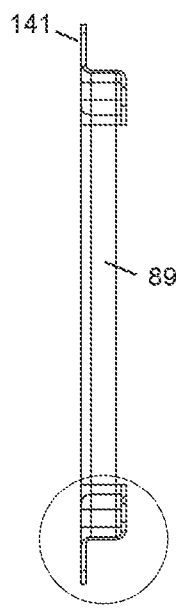
FIG. 36d is a section view taken from FIG. 36c.
Figure 36E:
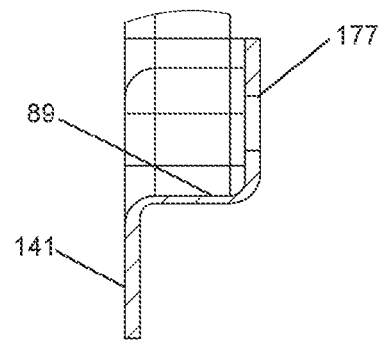
FIG. 36e is a detail view taken from FIG. 36d.

A sleeveless low voltage device installation is shown in FIGS. 35a-35b. Bracket 171 is mounted to stud 1 with fasteners 137. Drywall 5 can then be fixed to stud 1. Hole 115 in drywall 5 can then be cut in similar manner to that described with respect to FIGS. 28a-28d by running the cutting tool along internal perimeter flange 89 that extends rearwardly from planar element 141. Recessed mounting holes 177 in bracket 171, shown in FIGS. 36a-36e, receive fasteners 17. Mounting holes 177 are recessed to allow the cutting tool, running along flange 89, to pass without obstruction and remove drywall from in front of mounting hole. Sufficient drywall is thus left around the mounting hole to provide sufficient surface upon which the device mounting plates can be supported.

Figure 43A:
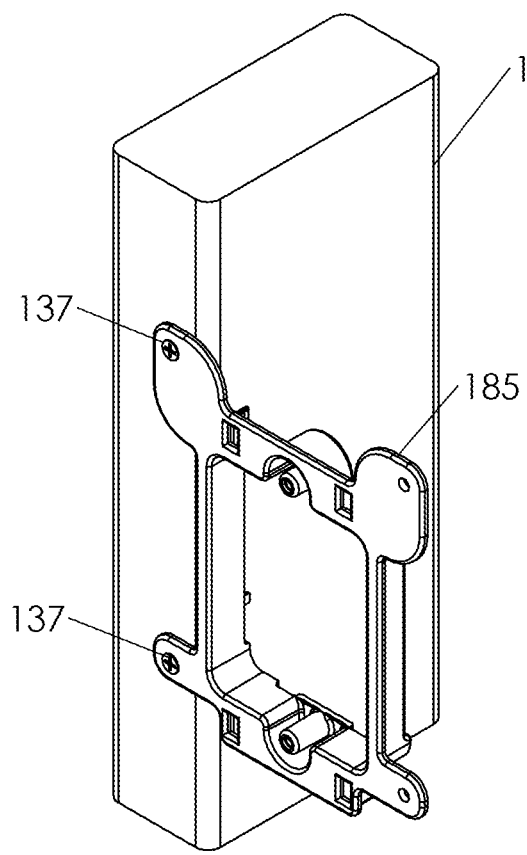
FIG. 43a is an isometric view of the bracket from FIG. 37a-37e mounted on a stud.
Figure 43B:
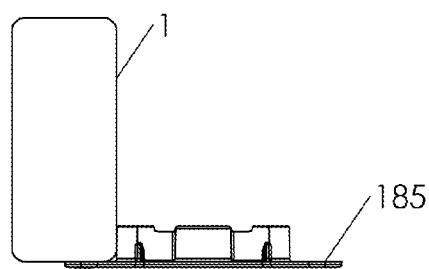
Figure 43C:
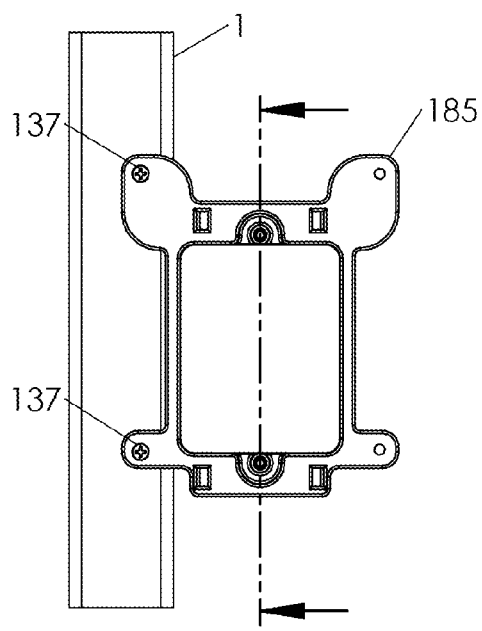
Figure 43D:
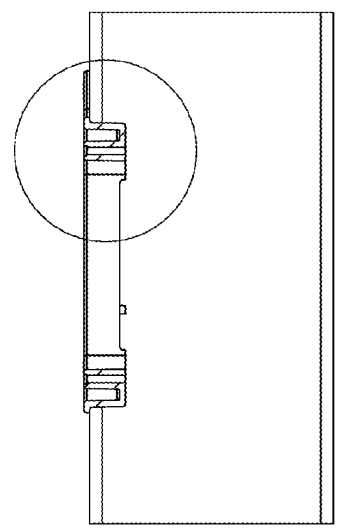
FIG. 43d is a section view taken from FIG. 43c.
Figure 43E:
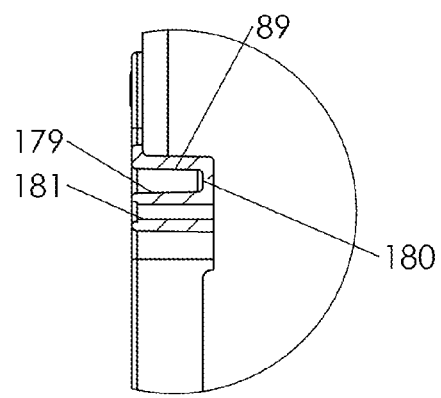
FIG. 43e is a detail view taken from FIG. 43d.
Figure 44A:
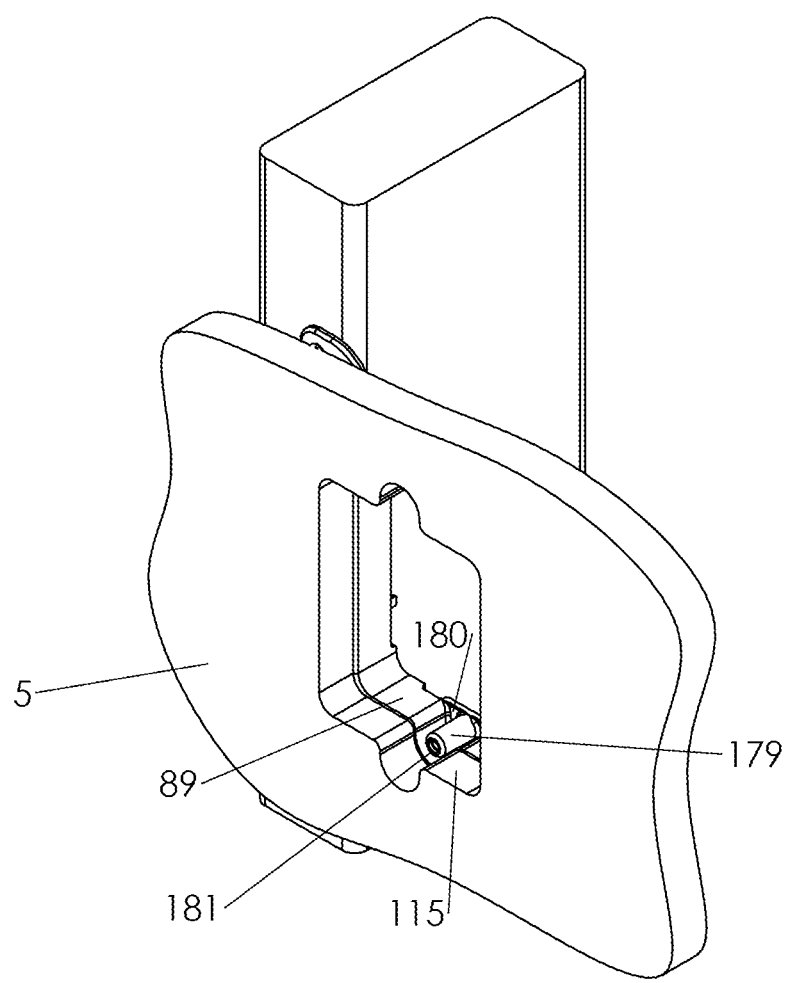
FIG. 44a is an isometric view of the bracket from FIG. 37a-37e mounted on a stud behind drywall.
Figure 44B:
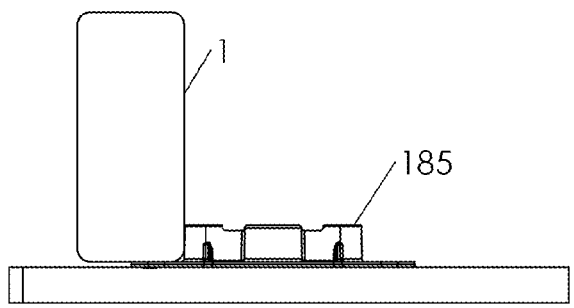
Figure 44C:
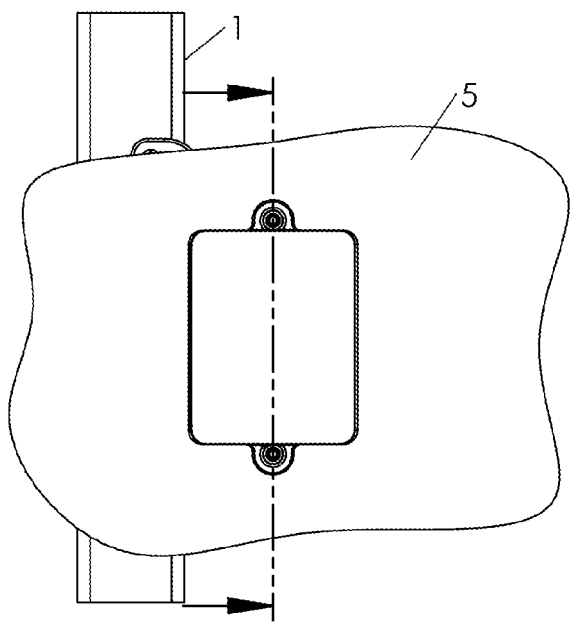
Figure 44D:
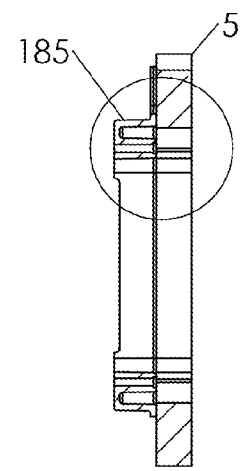
FIG. 44d is a section view taken from FIG. 44c.
Figure 44E:
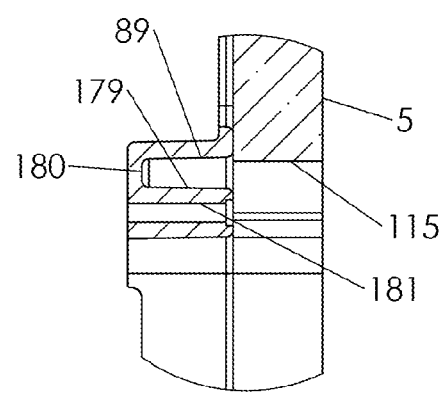
FIG. 44e is a detail view taken from FIG. 44d.

The bracket depicted in FIGS. 37a-42e, which support low voltage devices in the manner described with respect to FIGS. 35a-36e, may be constructed of moldable plastic material. Bracket 185 is mountable to stud 1 with fasteners 137 as shown, for example in FIGS. 43a and 46a. Drywall 5 can then be fixed to stud 1, the front surface of bracket 185 flush with the internal surface of drywall 5. FIGS. 38a-38b illustrate a double gang flange 187.

Figure 37A:
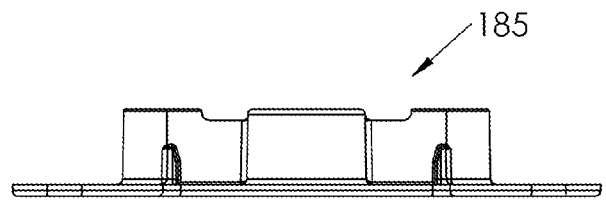
Figure 37B:
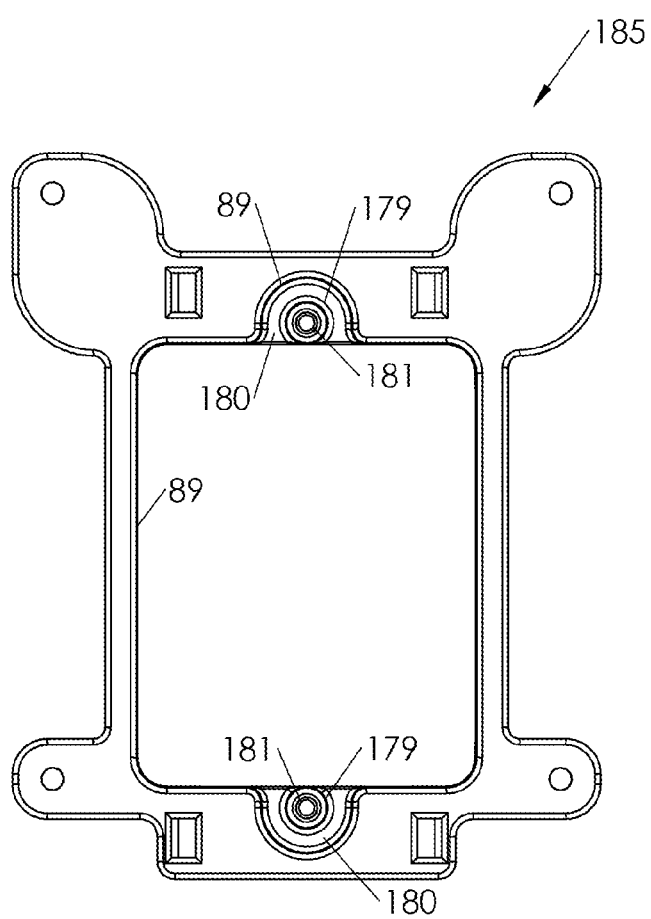
Figure 37C:
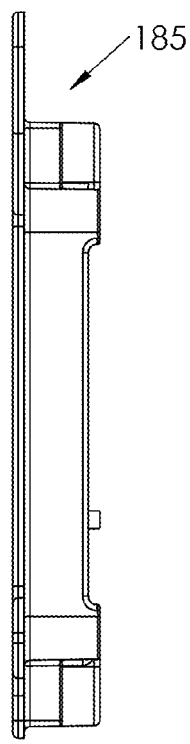
Figure 37D:
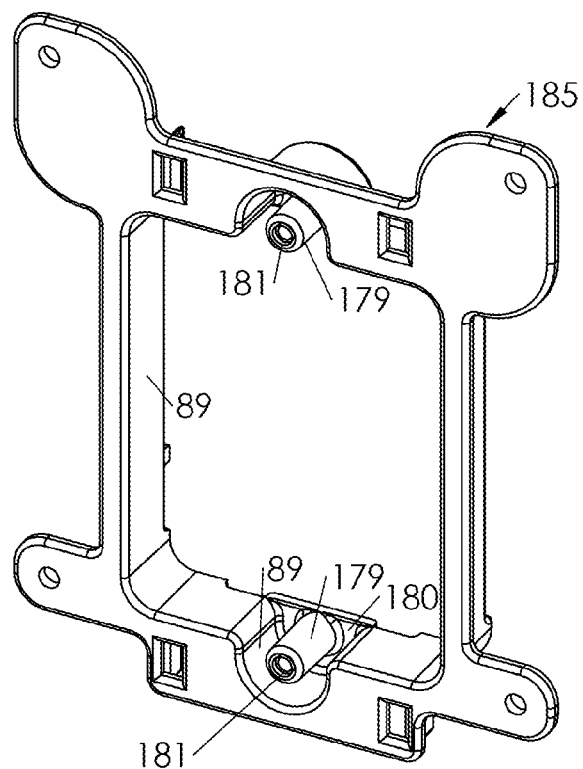
FIGS. 37d-37e are front and back isometric views, respectively, of the bracket.
Figure 37E:
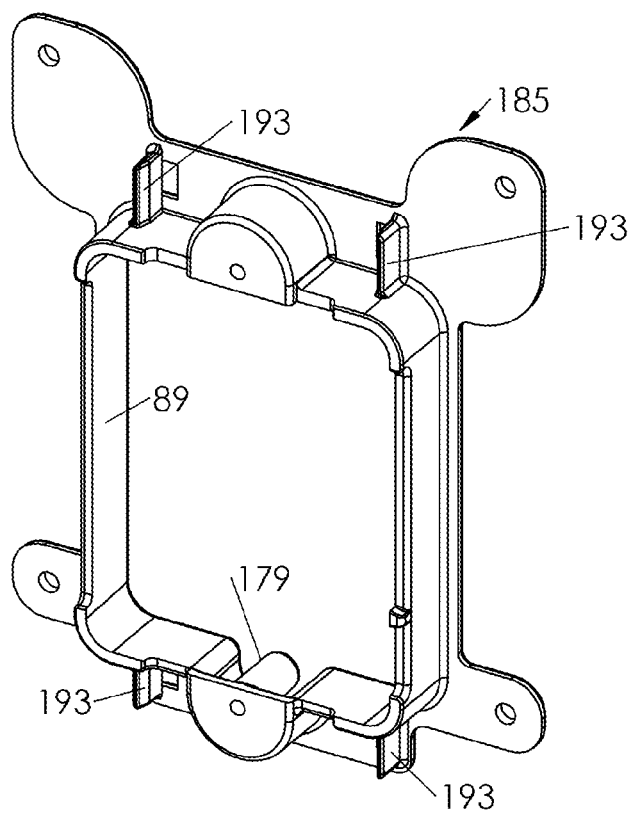
Figure 38D:
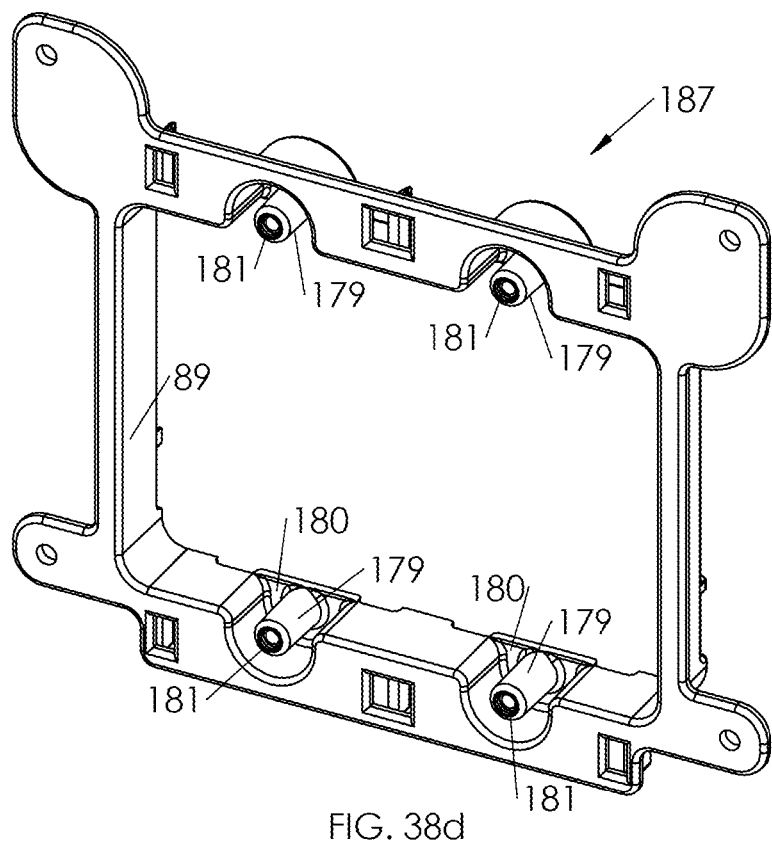
FIGS. 38d-38e are front and back isometric views, respectively, of the two gang bracket arrangement.
Figure 38E:
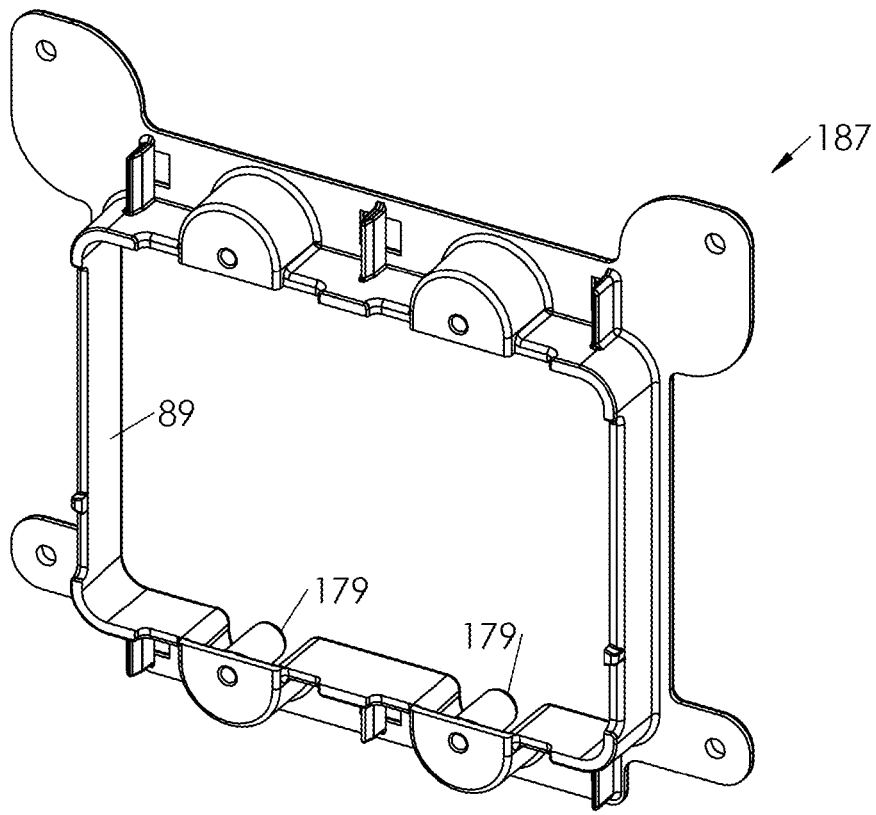
Figure 39A:
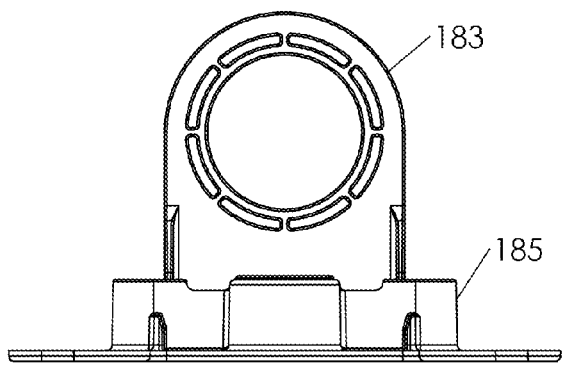
FIGS. 39a-39b are top and front orthographic views, respectively, of the bracket shown in FIGS. 37a-37e with a conduit mount.
Figure 39B:
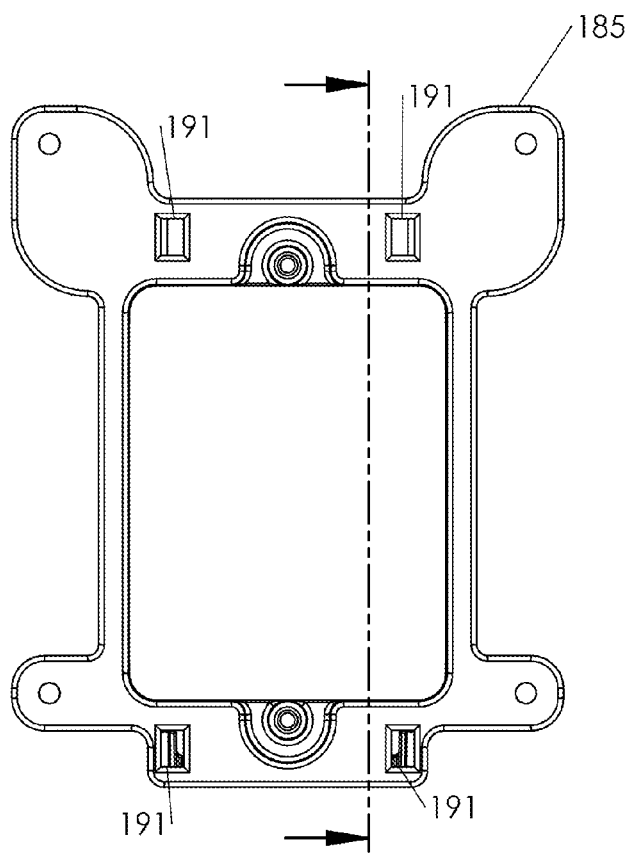

Internal perimeter of bracket 185 is formed with a contiguous flange 89 that extends distally from the front surface of bracket 185, such as shown in FIG. 37d. Curved mounting holes are formed by indentations in the inner periphery at opposite sides of flange 89, the indentations terminating at recessed surfaces 180 at the distal end of the flange. Boss members 179 extend from recessed surfaces 180 toward the front surface of flange 185, the proximal ends of boss members 179 recessed from the front surface of flange 185. Threaded holes 181 are contained within boss members 179. Rectangular holes 191 are formed in bracket 185, as indicated in FIG. 39b. Ribs 193 project rearwardly from bracket 185 adjacent holes 191, as shown in FIG. 37e.

Figure 45A:
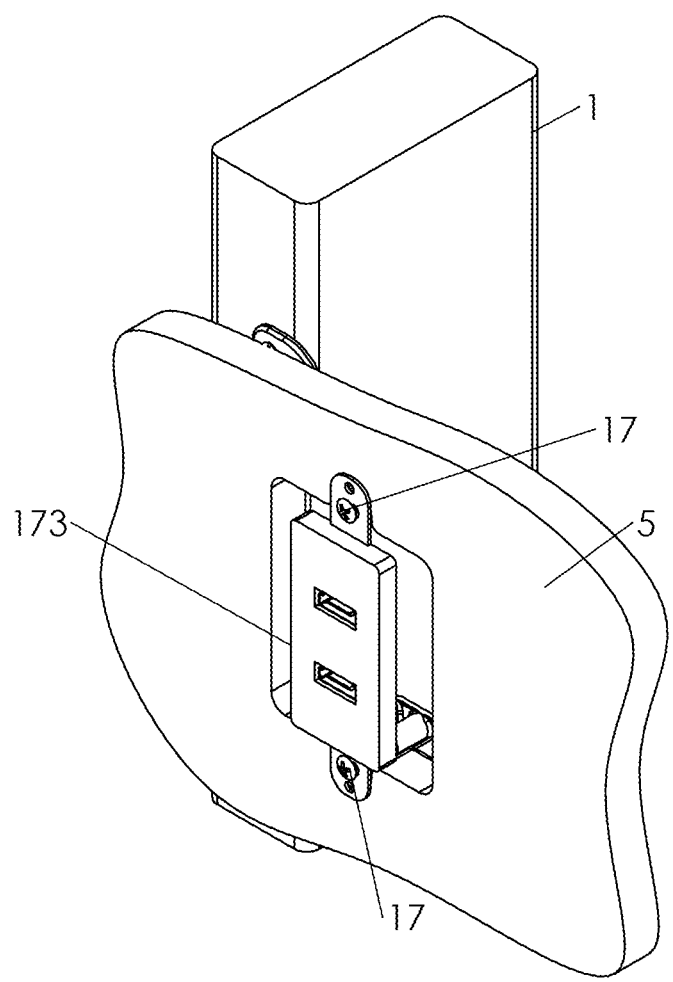
FIG. 45a is an isometric view of the bracket from FIG. 37a-37e mounted on a stud, behind drywall, assembled with a low voltage device.
Figure 45B:
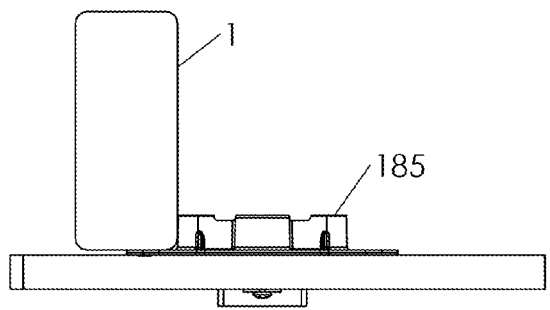
Figure 45C:
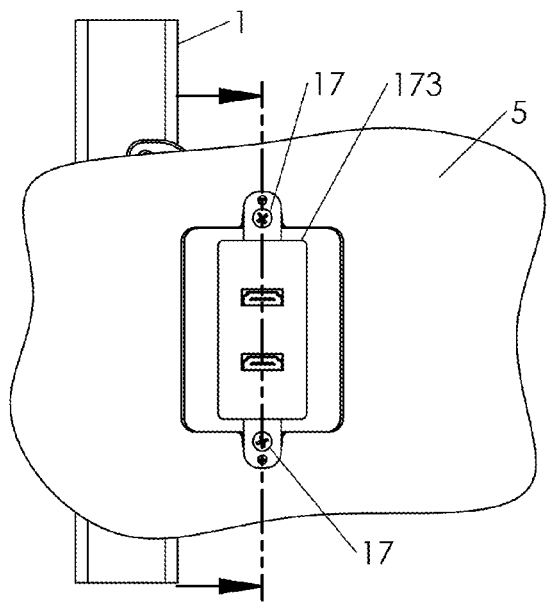
Figure 45D:
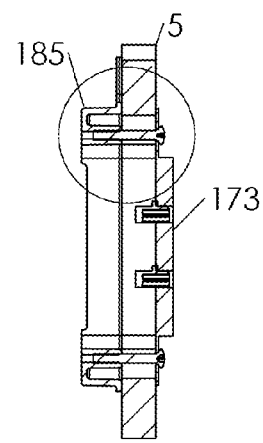
FIG. 45d is a section view taken from FIG. 45c.
Figure 45E:
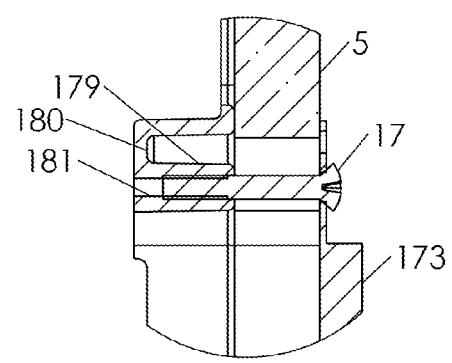
FIG. 45e is a detail view taken from FIG. 45d.

During installation, drywall 5 is erected over bracket 185, which is mounted on stud 1, as shown in FIGS. 44a-44e. Drywall hole 115 is cut by running the rotating cutting tool along internal perimeter flange 89. Boss members 179 are recessed sufficiently to allow the cutting tool, running along flange 89, to pass without obstruction and remove drywall from in front of the mounting holes. Sufficient drywall is thus left around the mounting hole to provide sufficient surface upon which the device mounting plates can be supported. Boss members 179 are dimensioned in length to receive mounting screws 17 that may be provided with the device 173, shown in FIG. 45a. The need for longer mounting screws, which would otherwise be required to mate with recessed surface 180 is thus avoided.

Brackets 185 and 187 may be provided with one or more conduit mounts in the as-molded state of the device if a conduit fitting or a temporary fixing of wires is desired. As shown in FIGS. 41a-42e, conduit mount 183 is frangibly attached to bracket 185 or 187 in the bracket opening. Conduit mount 183 can be broken away to allow mounting of an electrical device. Frangible ring 189 allows installation of different diameters of conduit fittings.

Figure 39C:
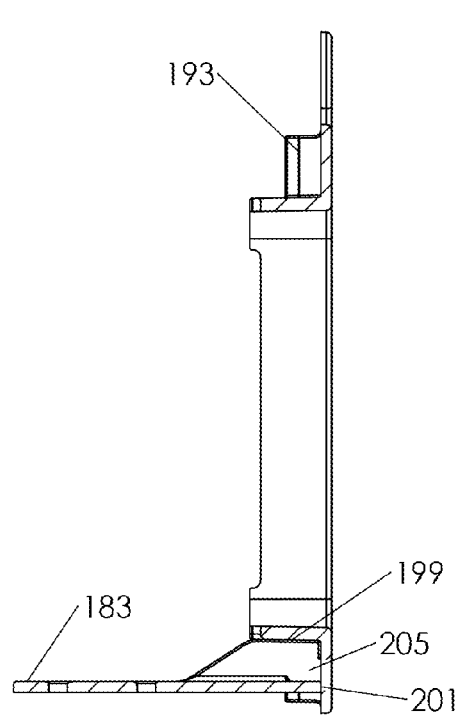
FIG. 39c is a section view taken from FIG. 39b.
Figure 39D:
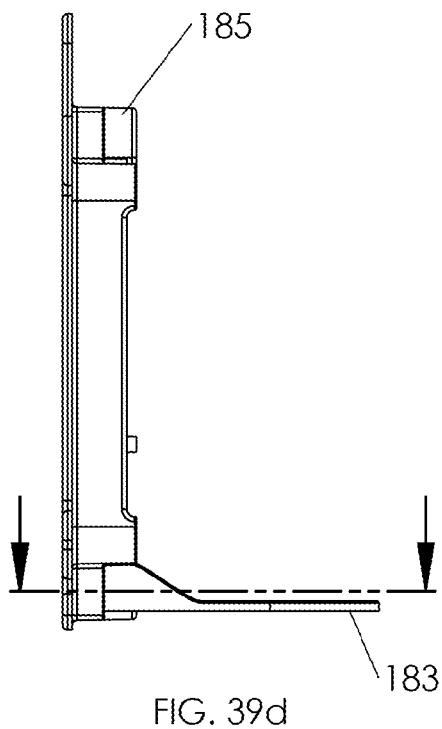
FIG. 39d is a side view of the bracket shown in FIGS. 39a-39b.
Figure 39E:
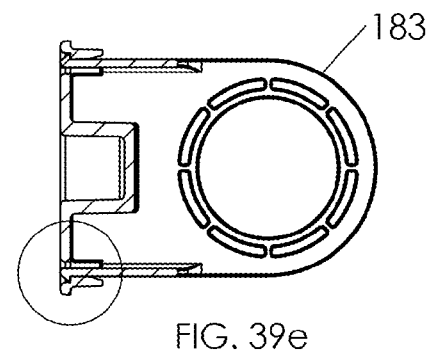
FIG. 39e is a section view taken from FIG. 39d.
Figure 39F:
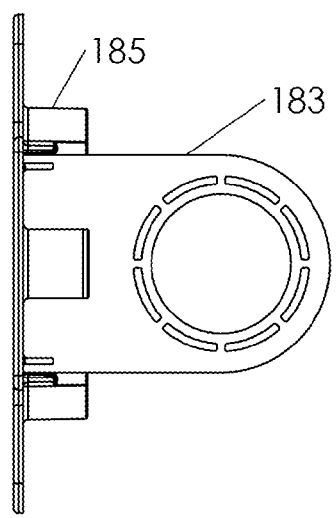
FIG. 39f is a bottom view of the bracket shown in FIG. 39d.
Figure 39G:
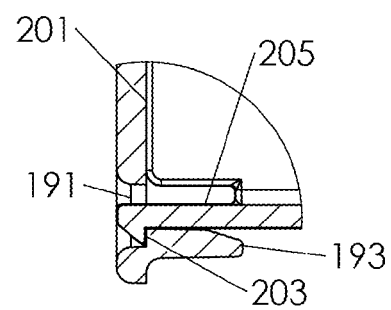
FIG. 39g is a detail view taken from FIG. 39e.
Figures 39H, 39I:
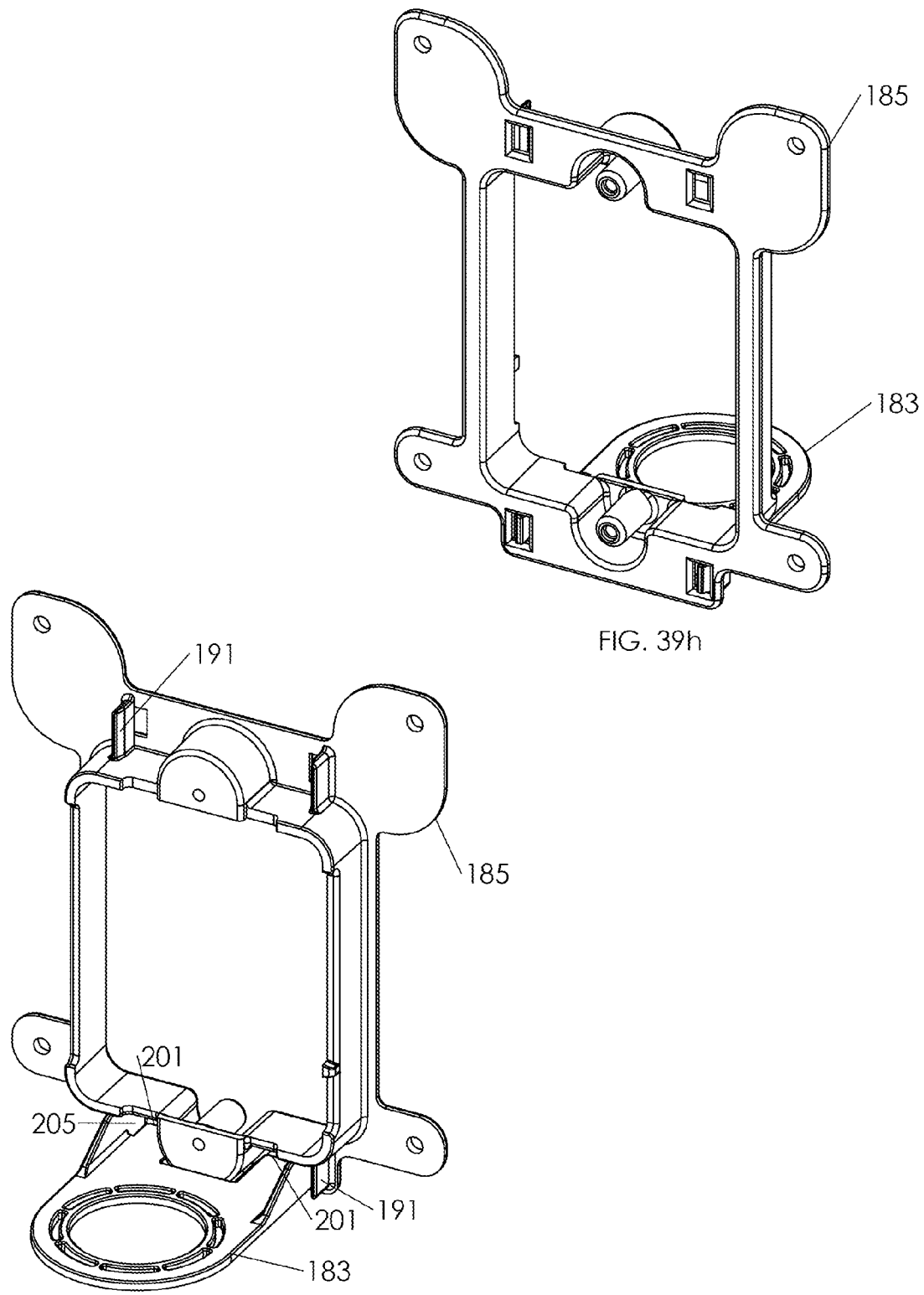
FIGS. 39h-39i show front and back isometric views, respectively, of the bracket shown in FIGS. 39a-39g.
Figure 40D:
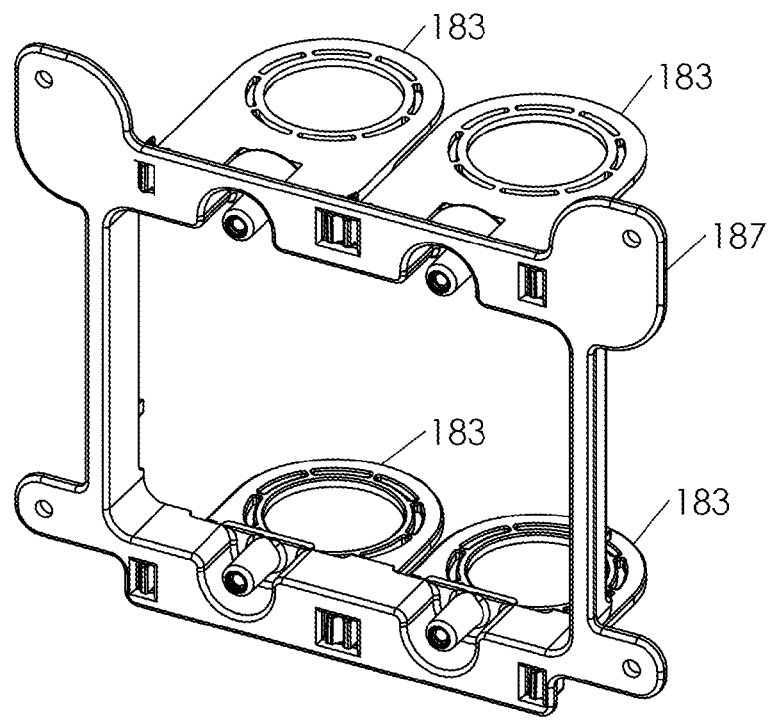
FIGS. 40d-40e are front and back isometric views, respectively, of the bracket and conduit mounts shown in FIGS. 40a-40c.
Figure 40E:
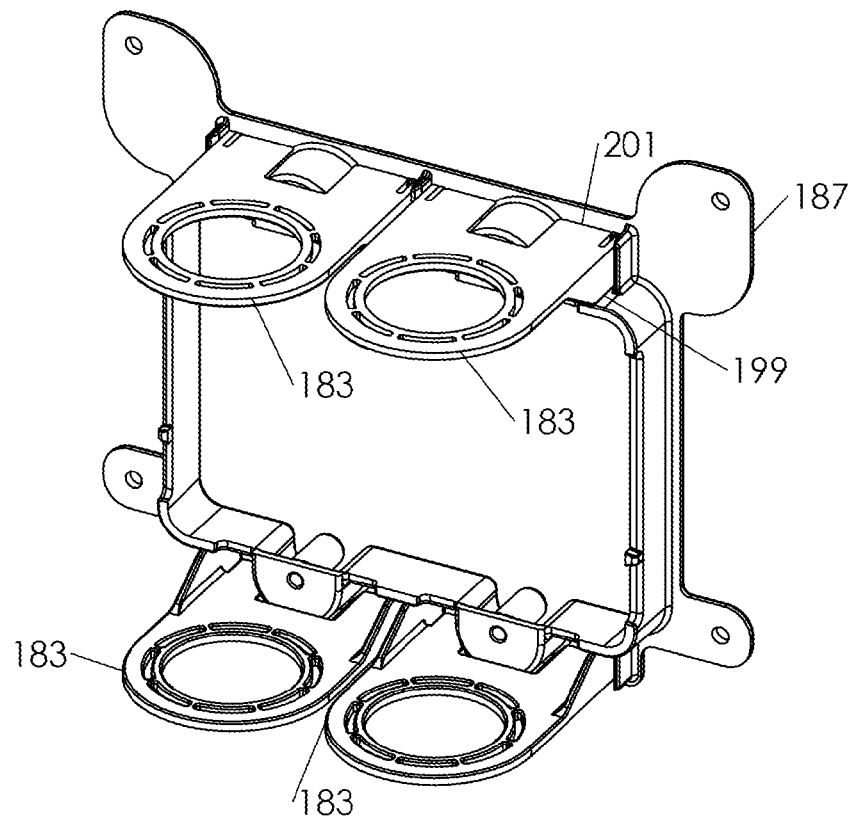
Figure 41A:
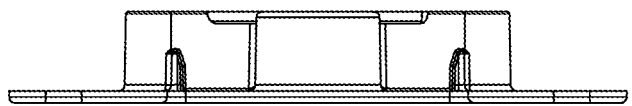
FIGS. 41a-41c are top, front and side orthographic views, respectively, of the bracket shown in FIGS. 37a-37e in an as-molded state.
Figure 41B:
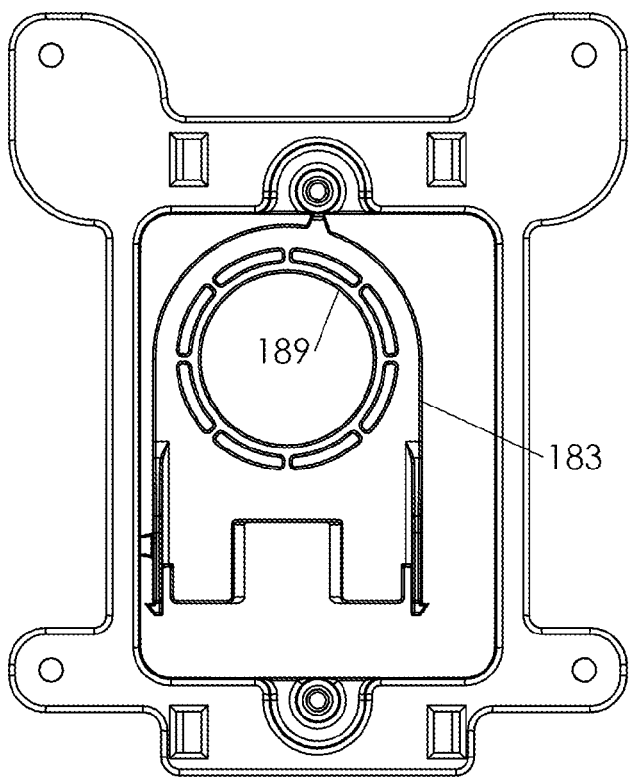
Figure 41C:
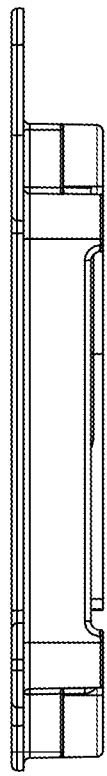
Figure 41D:
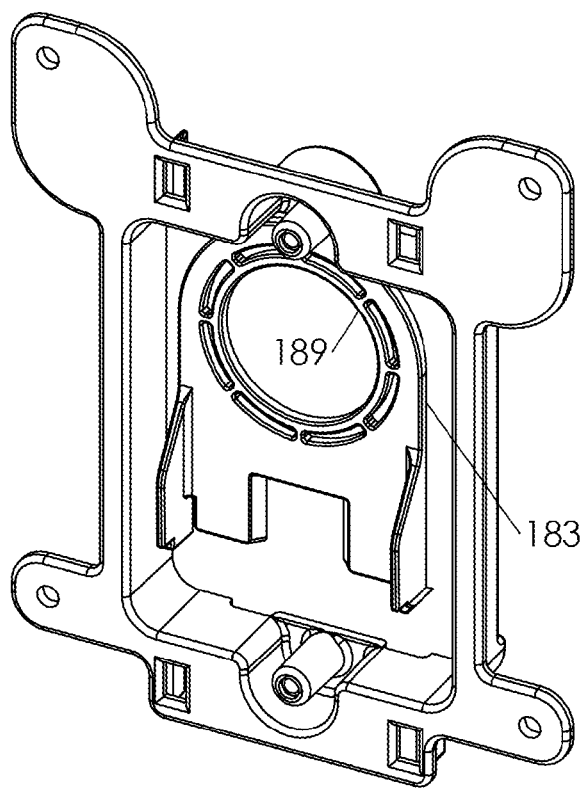
FIGS. 41d-41e are front and back isometric views, respectively, of the bracket shown in FIGS. 41a-41c.
Figure 41E:
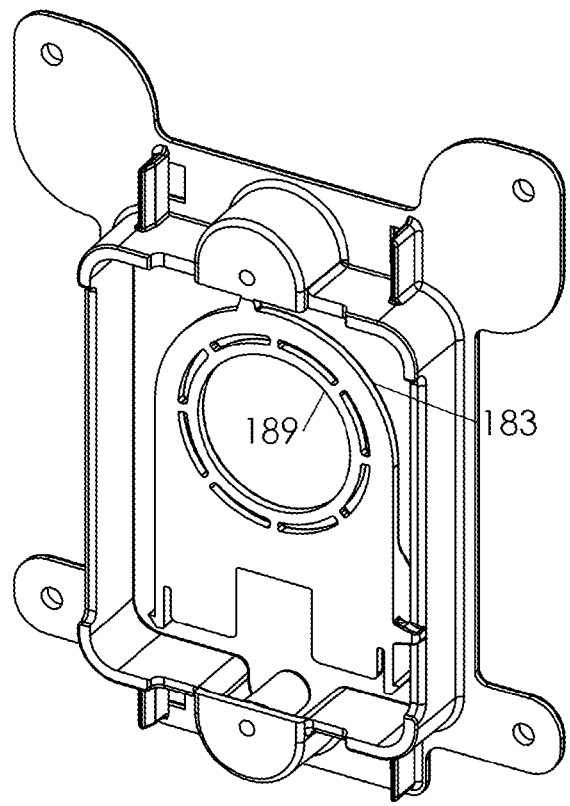
Figure 42A:
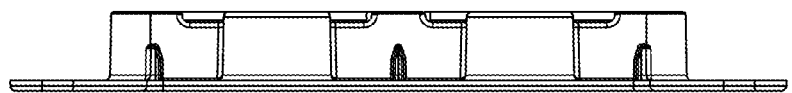
FIGS. 42a-42c are top, front and side orthographic views, respectively, of the two gang embodiment of the bracket shown in FIGS. 41a-41e.
Figure 42B:
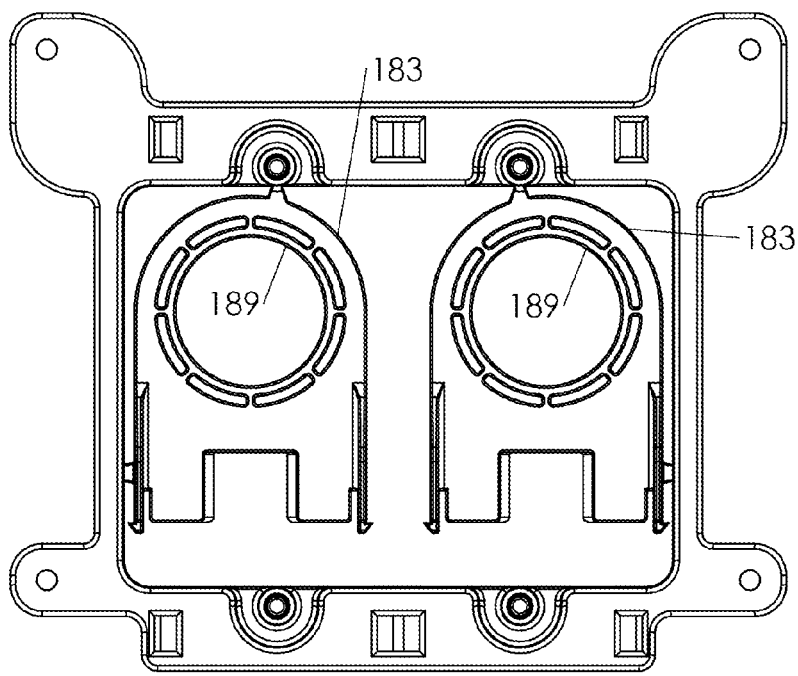
Figure 42C:
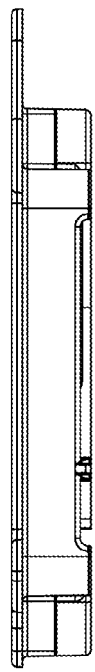
Figure 42D:
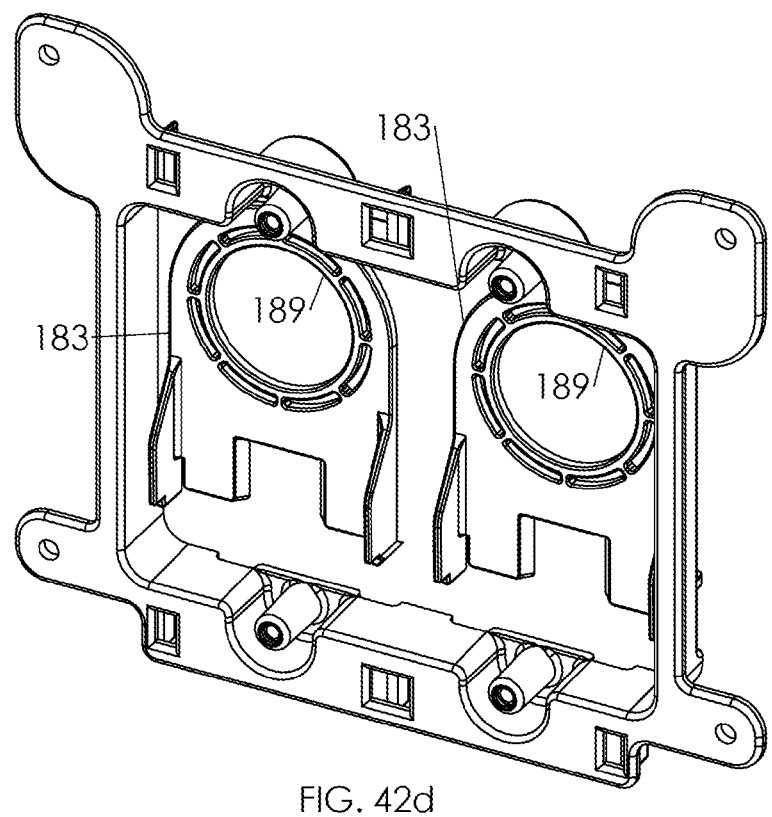
FIGS. 42d-42e are front and back isometric views, respectively, of the bracket shown in FIGS. 42a-42c.
Figure 42E:
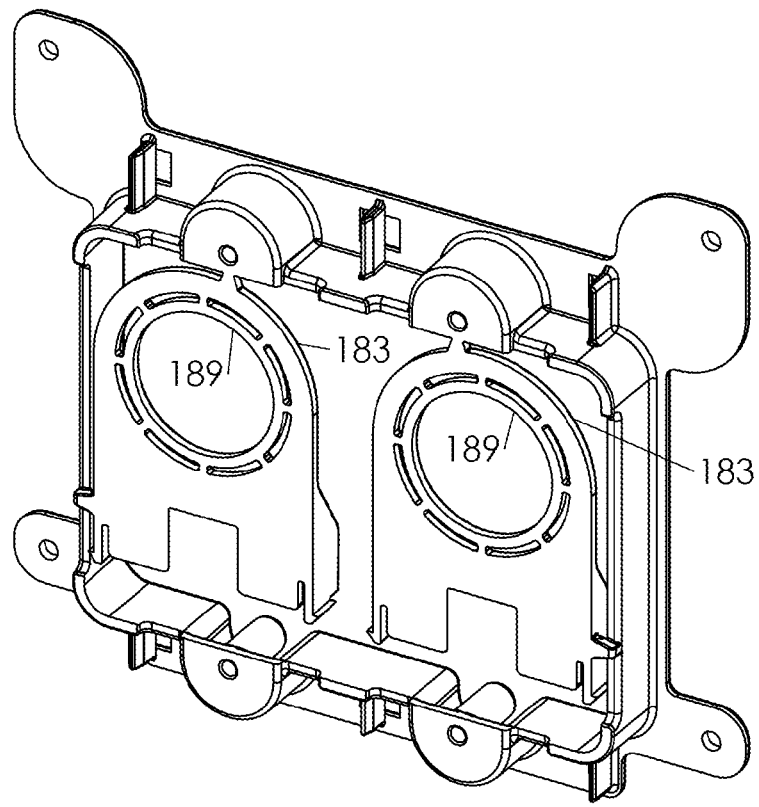
Figure 46A:
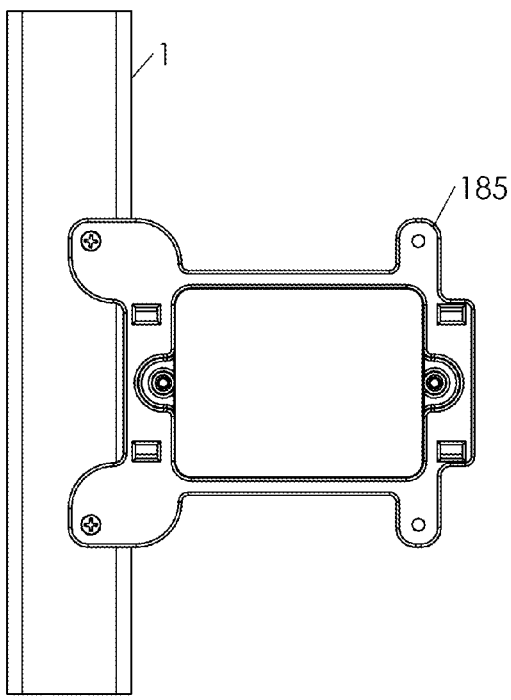
FIGS. 46a-46c are front, side and back views, respectfully, of the bracket from FIG. 37a-37e mounted horizontally on a stud.
Figure 46B:
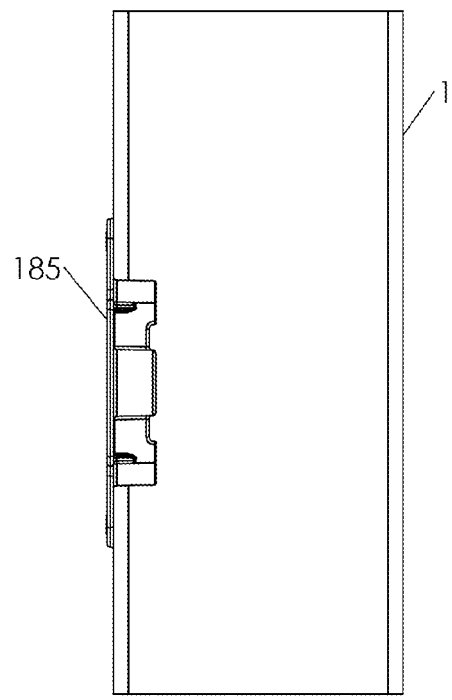
Figure 46C:
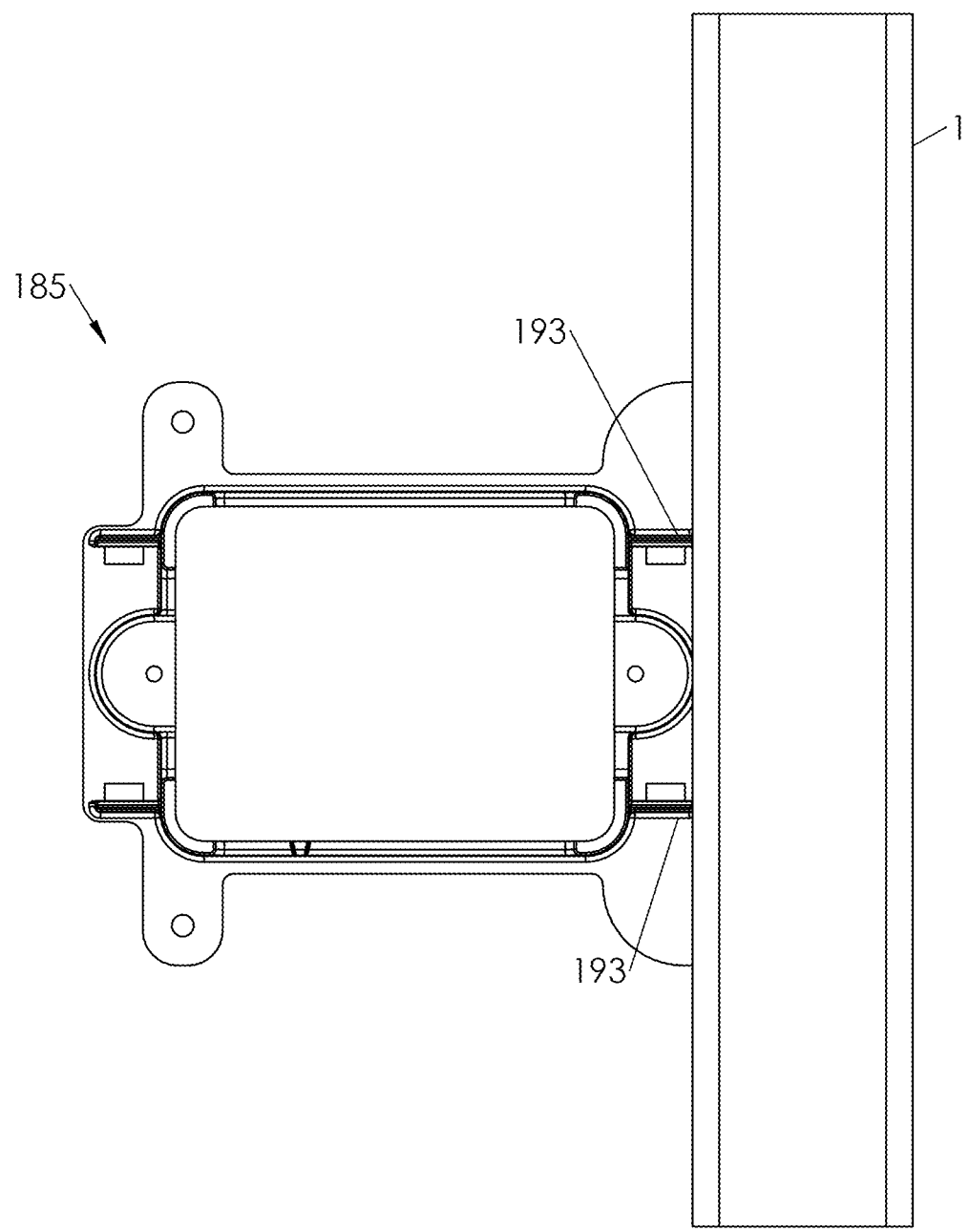
Figure 47A:
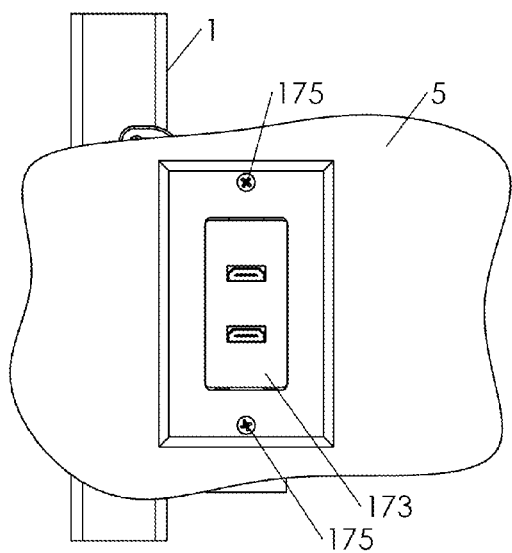
FIGS. 47a-47d are front, side, bottom and back views of the bracket and conduit mount mounted on a stud, behind drywall, assembled with a device and cover plate.
Figure 47B:
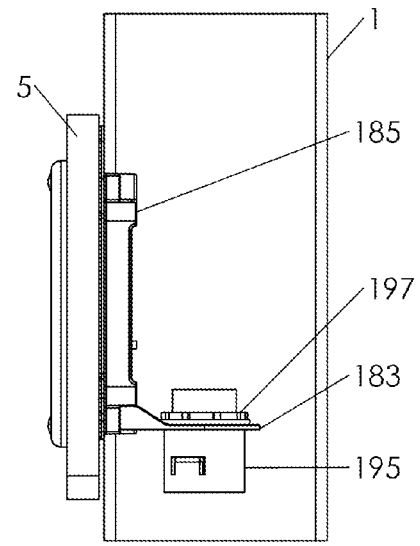
Figure 47C:
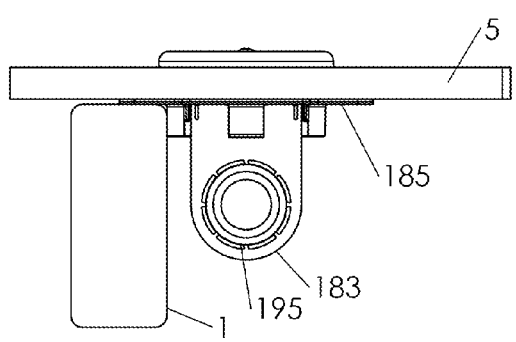
Figure 47D:
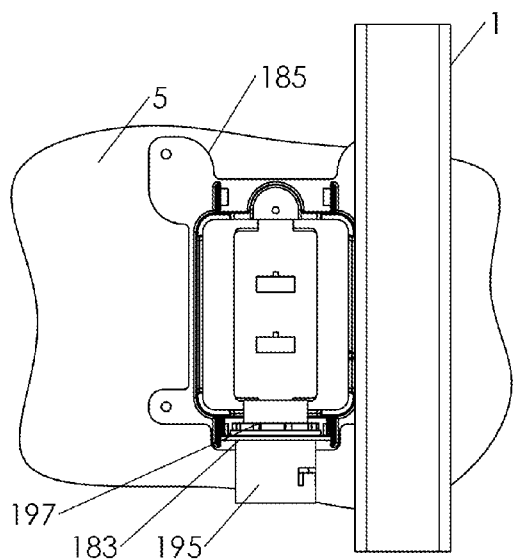
Figure 47E:
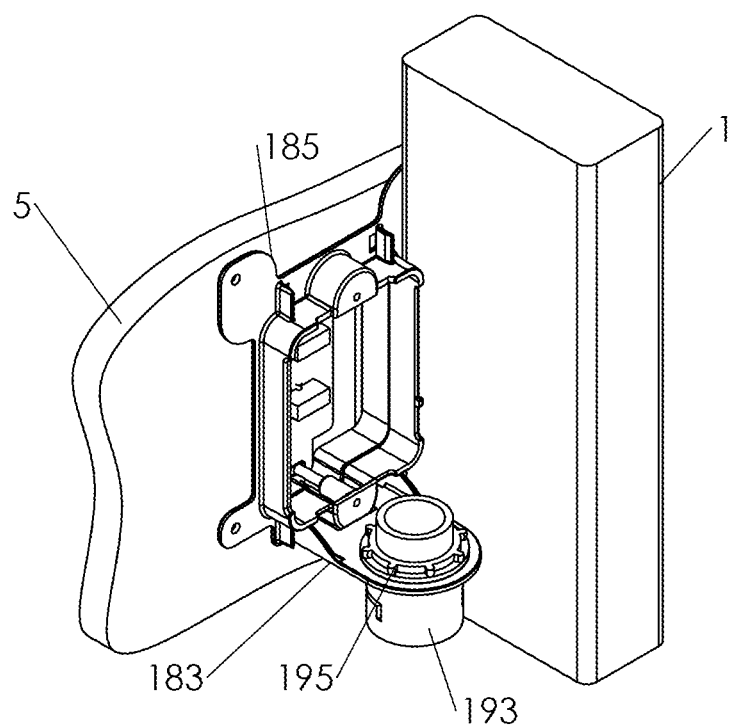

Bracket 185, fitted with conduit mount 183, is shown in FIGS. 39a-39i. Conduit mount 183, shown mounted on the bottom of bracket 185, alternatively may be mounted on the top. Referring specifically to FIGS. 39e and 39g, conduit mount 183 terminates at cantilevered snap beans 205 with barbs 203. Conduit mount 183 can snap into bracket 185 via rectangular holes 191. Snap beams 205 compress when pushed between ribs 193 of bracket 185. Once through rectangular holes 191, snap beams 205 expand, barbs 203 abutting ribs 193 and serving to prevent extraction. To remove conduit mount 183, cantilever snap beams 205 can be flexed from the front of bracket 185 to disengage barb 203. Barb 203 in combination with contact surfaces 199 and 201 between bracket 185 and conduit mount 183 resist torque as seen in FIG. 39c and FIG. 40e. FIG. 39g shows barb 203 after snap beam 205 flexes into the open space above it and slides past rib 193. FIGS. 47a-47e illustrate installation in situ with conduit fitting 195 secured to conduit mount 183 by locknut 197. Ribs 193 of bracket 185 not only allow for compression of cantilever snap beams 205 and installation of conduit mount 183, but also act as stand-offs, providing bearing surfaces for perpendicular alignment of bracket 185 with stud 1 or sill plate if mounting off the narrow side of the bracket as seen in FIGS. 46a-46c.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, while the electrical device has been exemplified with protruding ribs that can mate with cutouts in the flange to center the device, they instead may contain troughs in its housing to mate with protrusions in the flange.

It should be understood that the term "drywall" as used throughout this disclosure is representative of any wall substrate. The term "low voltage device" is representative not only with respect to communication devices but other electrical devices well known in the art that are operable from direct current sources, for example, LED devices. The term "conduit mount" as used throughout this disclosure is intended to be applicable to a mount this operable for conduit connection, electrical wire connection, as well as a means for mounting any object to the device.

Although the disclosure exemplifies installations on wall substrates, the disclosed concepts are applicable to ceiling and floor installations. Similarly, it should be understood that the concepts disclosed herein are applicable to other electrical devices, such as keypads, speakers, display devices, and the like and to supporting other elements or appliance within a building surface. For example, while one and two gang brackets are exemplified, three or more gang embodiments are envisioned.

What is claimed is:

1. A bracket comprising:
   a body having a uniformly planar front surface configured to be flush with an internal surface of a wall substrate, the bracket mountable directly to the wall interior;
   an opening in the body forming an inner perimeter; and
   a flange extending contiguously along the inner perimeter of the body in a direction opposite the front surface to a distal edge, the flange configured as a template guide for cutting an opening in the wall substrate, the wall substrate opening having a boundary that is coincident with the inner perimeter of the body;

wherein the inner perimeter comprises indentations in the flange at opposite sides thereof; and further comprising:

a recessed surface joined to the distal extent of the flange at each perimeter indentation; and a boss extending from each recessed surface toward an end proximal the front surface of the bracket.

2. A bracket as recited in claim 1, wherein the proximal end of the boss is recessed from the front surface of the bracket.

3. A bracket as recited in claim 2, wherein each boss comprises a mounting hole for receiving a connector of an element to be mounted within the wall.

4. A bracket comprising:

a body having a uniformly planar front surface configured to be flush with an internal surface of a wall substrate, the bracket mountable directly to the wall interior;

an opening in the body forming an inner perimeter;

a flange extending contiguously along the inner perimeter of the body in a direction opposite the front surface to a distal edge, the flange configured as a template guide for cutting an opening in the wall substrate, the wall substrate opening having a boundary that is coincident with the inner perimeter of the body; and wherein the body further comprises:

through holes located at opposite sides of the inner perimeter; and a rib member proximate each through hole, the rib member projecting from a surface of the bracket opposite the front surface.

5. A bracket as recited in claim 4, further comprising a detachable conduit mount engageable with the through holes.

6. A bracket as recited in claim 5, wherein the conduit mount comprises a flexible cantilevered beam configured to mate with each through hole.

7. A bracket as recited in claim 6, wherein each cantilevered beam comprises a barbed end abutting the rib member upon mating the respective through hole.

8. A bracket as recited in claim 5, wherein the bracket is formed of a moldable plastic material and the conduit mount is frangibly attached to the bracket body in an as-molded state.

9. A bracket as recited in claim 8, wherein the conduit mount comprises a detachable frangible ring compatible to a plurality of conduit fitting sizes.

* * * * *